United States Patent
Shiomi et al.

(10) Patent No.: US 7,876,337 B2
(45) Date of Patent: *Jan. 25, 2011

(54) DISPLAY PROCESSING METHOD AND DISPLAY PROCESSING APPARATUS

(75) Inventors: Takakazu Shiomi, Osaka (JP); Shigeaki Watanabe, Mount Laurel, NJ (US); Satoshi Terao, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/416,481

(22) Filed: Apr. 1, 2009

(65) Prior Publication Data

US 2009/0184963 A1    Jul. 23, 2009

Related U.S. Application Data

(63) Continuation of application No. 10/891,300, filed on Jul. 15, 2004, now Pat. No. 7,551,190.

(60) Provisional application No. 60/487,938, filed on Jul. 18, 2003.

(30) Foreign Application Priority Data

Jun. 4, 2004    (JP) .............................. 2004-167726

(51) Int. Cl.
G09G 5/00    (2006.01)
(52) U.S. Cl. .................. 345/660; 345/428; 345/698
(58) Field of Classification Search ................. 345/629, 345/698, 699, 660, 428
See application file for complete search history.

(56) References Cited

U.S. PATENT DOCUMENTS

| | | | |
|---|---|---|---|
| 5,220,312 A * | 6/1993 | Lumelsky et al. ........... 345/563 |
| 5,426,723 A | 6/1995 | Horsley | |
| 5,568,165 A | 10/1996 | Kimura | |
| 5,874,937 A | 2/1999 | Kesatoshi | |
| 5,912,710 A * | 6/1999 | Fujimoto .................... 348/445 |
| 6,147,695 A | 11/2000 | Bowen et al. | |
| 6,266,042 B1 | 7/2001 | Aratani | |
| 6,275,267 B1 * | 8/2001 | Kobayashi ................. 348/555 |
| 6,304,245 B1 * | 10/2001 | Groenenboom ............ 345/611 |
| 6,349,154 B1 | 2/2002 | Kleihorst | |
| 6,388,679 B1 | 5/2002 | Kluck et al. | |
| 6,392,642 B1 | 5/2002 | Wu | |
| 6,407,778 B1 | 6/2002 | Shimizu et al. | |

(Continued)

FOREIGN PATENT DOCUMENTS

EP    1328114    7/2003

(Continued)

OTHER PUBLICATIONS

English language Abstract of JP 2000-23061, Jan. 21, 2000.

(Continued)

*Primary Examiner*—Michelle K Lay
(74) *Attorney, Agent, or Firm*—Greenblum & Bernstein, P.L.C.

(57) ABSTRACT

According to the present invention, when video resolution is changed, the TV receiver selects resolution having a priority to the graphics resolution requested by the application depending on the application types, or the TV receiver selects graphics resolution appropriate for video format resolution, thereby the TV receiver enables the clear display of graphics without causing any distortion.

2 Claims, 60 Drawing Sheets

| | Combination | Buffer | Resolution (Width * Height) | Ratio of Width and Height |
|---|---|---|---|---|
| 6001 | 1 | Video Buffer | 640*480 | 4 : 3 |
| | | Still Buffer | 640*480 | 4 : 3 |
| | | OSD Buffer | 640*480 | 4 : 3 |
| 6002 | 2 | Video Buffer | 640*480 | 16 : 9 |
| | | Still Buffer | 640*480 | 16 : 9 |
| | | OSD Buffer | 640*480 | 16 : 9 |
| 6003 | 3 | Video Buffer | 1920*1080 | 4 : 3 |
| | | Still Buffer | 1920*1080 | 4 : 3 |
| | | OSD Buffer | 640*480 | 4 : 3 |
| 6004 | 4 | Video Buffer | 1920*1080 | 16 : 9 |
| | | Still Buffer | 1920*1080 | 16 : 9 |
| | | OSD Buffer | 640*480 | 16 : 9 |

U.S. PATENT DOCUMENTS

| | | |
|---|---|---|
| 6,493,036 B1 | 12/2002 | Fernandez |
| 6,515,678 B1 | 2/2003 | Boger |
| 6,525,742 B2 | 2/2003 | Nonomura et al. |
| 6,538,656 B1 | 3/2003 | Cheung et al. |
| 6,570,579 B1 | 5/2003 | MacInnis et al. |
| 6,573,905 B1 | 6/2003 | MacInnis et al. |
| 6,577,322 B1 | 6/2003 | Fukuda |
| 6,587,120 B2 | 7/2003 | Kasai et al. |
| 6,636,222 B1 | 10/2003 | Valmiki et al. |
| 6,643,416 B1 | 11/2003 | Daniels et al. |
| 6,661,422 B1 | 12/2003 | Valmiki et al. |
| 6,664,977 B1 | 12/2003 | Masumoto |
| 6,693,635 B1 | 2/2004 | Yokomizo |
| 6,710,810 B1 | 3/2004 | Hoshikawa et al. |
| 6,747,671 B1 | 6/2004 | Saito |
| 6,768,774 B1 | 7/2004 | MacInnis et al. |
| 6,774,912 B1 | 8/2004 | Ahmed et al. |
| 6,798,420 B1 | 9/2004 | Xie |
| 6,820,137 B2 | 11/2004 | Nakamura et al. |
| 6,853,385 B1 | 2/2005 | MacInnis et al. |
| 6,922,202 B2 | 7/2005 | Shigeta et al. |
| 6,927,754 B2 | 8/2005 | Lai |
| 6,972,771 B2 | 12/2005 | Nakano et al. |
| 6,975,324 B1 | 12/2005 | Valmiki et al. |
| 2002/0047851 A1 | 4/2002 | Hirase et al. |
| 2002/0089518 A1 | 7/2002 | Shigeta |
| 2002/0093517 A1 | 7/2002 | Cheung |
| 2003/0184457 A1 | 10/2003 | Hsiun |
| 2003/0189571 A1 | 10/2003 | MacInnis et al. |
| 2004/0028141 A1 | 2/2004 | Hsiun et al. |
| 2004/0056864 A1 | 3/2004 | Valmiki et al. |
| 2004/0208245 A1 | 10/2004 | MacInnis et al. |
| 2004/0212730 A1 | 10/2004 | MacInnis et al. |
| 2005/0007264 A1 | 1/2005 | Hsiun |
| 2005/0012759 A1 | 1/2005 | Valmiki et al. |
| 2005/0024369 A1 | 2/2005 | Xie |
| 2005/0044175 A1 | 2/2005 | Cheung |

FOREIGN PATENT DOCUMENTS

| | | |
|---|---|---|
| JP | 331557 | 11/1996 |
| JP | 10-124021 | 5/1998 |
| JP | 2000-23061 | 1/2000 |
| JP | 2002-247465 | 8/2002 |

OTHER PUBLICATIONS

English language Abstract of JP 2002-247465, Aug. 30, 2002.
English language Abstract of JP 10-124021, May 15, 1998.
English language Abstract of JP 331557, Nov. 12, 1996.

\* cited by examiner

FIG. 2

| Frequency Band | Purpose | Modulation Method |
|---|---|---|
| 5~130MHz | Out Of Band (OOB) Data exchange between Head End and Terminal | QPSK |
| 130~864MHz | In-band Normal TV Broadcasting including video and audio | QAM |

FIG. 3

| Frequency Band | Purpose |
|---|---|
| 70~74MHz | Data transmission from Head End 101 to Terminal Apparatus |
| 10.0~10.1MHz | Data transmission from Terminal Apparatus A111 to Head End 101 |
| 10.1~10.2MHz | Data transmission from Terminal Apparatus B112 to Head End 101 |
| 10.2~10.3MHz | Data transmission from Terminal Apparatus C113 to Head End 101 |

FIG. 4

| Frequency Band | Purpose |
|---|---|
| 150~156MHz | TV Channel 1 |
| 156~162MHz | TV Channel 2 |
| ⋮ | ⋮ |
| 310~311MHz | Radio Channel 1 |
| ⋮ | ⋮ |

FIG. 14
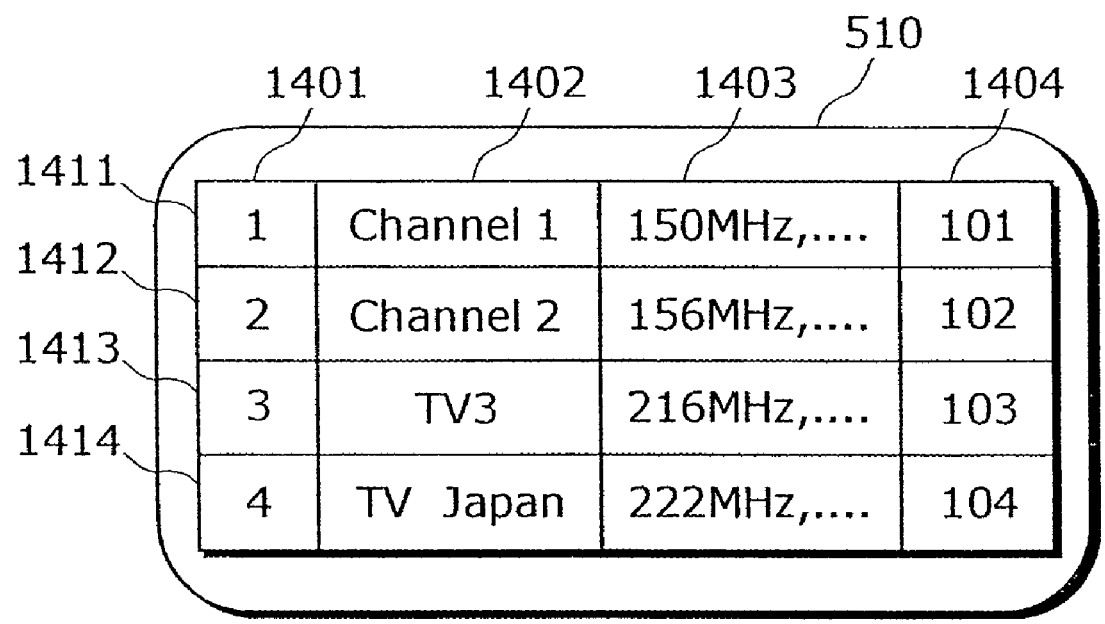
FIG. 15
(1)
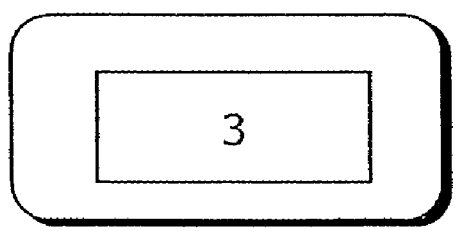
(2)
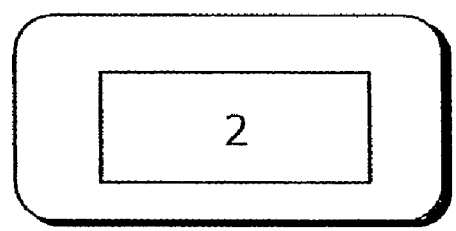
(3)
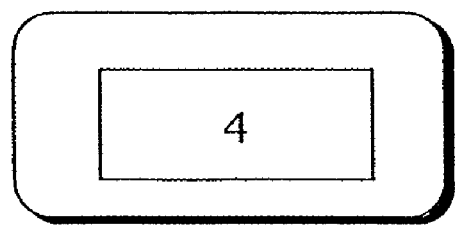

FIG. 20

| Java Program Identifier 2001 | Control Information 2002 | DSMCC Identifier 2003 | Program Name 2004 | Priority 2005 |
|---|---|---|---|---|
| 701 | autoselect | 1 | /a/Banner1Xlet | 200 |
| 702 | present | 1 | /b/Banner2Xlet | 201 |

2011 → (row 1)
2012 → (row 2)

| Combination | First Plane | Second Plane | Third Plane |
|---|---|---|---|
| 1 | OSD Plane | Video Plane | Still Plane |
| 2 | OSD Plane | Still Plane | Video Plane |
| 3 | Video Plane | OSD Plane | Still Plane |
| 4 | Video Plane | Still Plane | OSD Plane |
| 5 | Still Plane | OSD Plane | Video Plane |
| 6 | Still Plane | Video Plane | OSD Plane |

FIG. 28
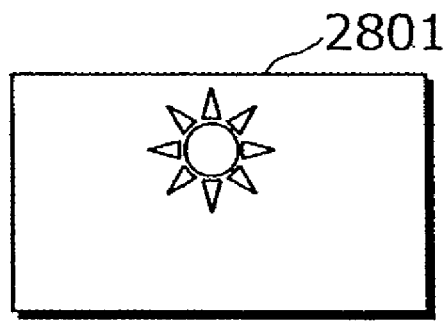
Width:720
Height:480
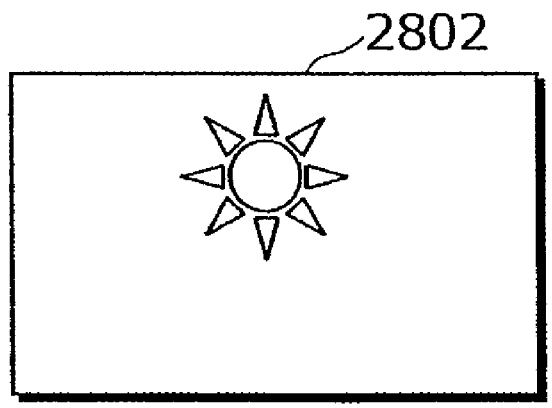
Width:960
Height:540

FIG. 29
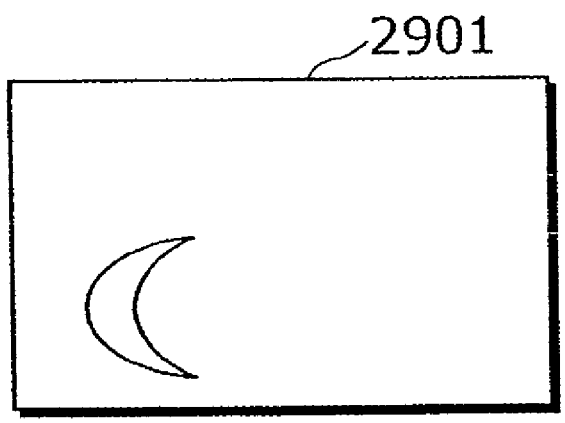
Width:960
Height:540
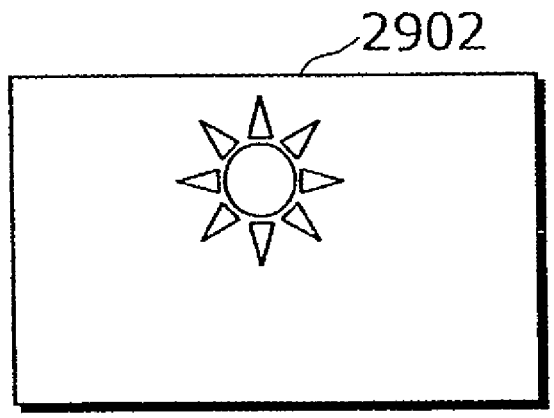
Width:960
Height:540
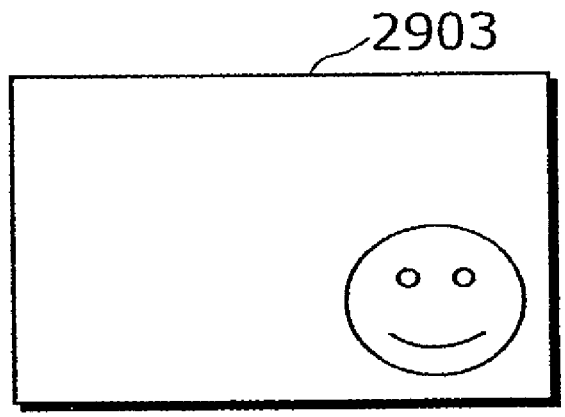
Width:960
Height:540

FIG. 30
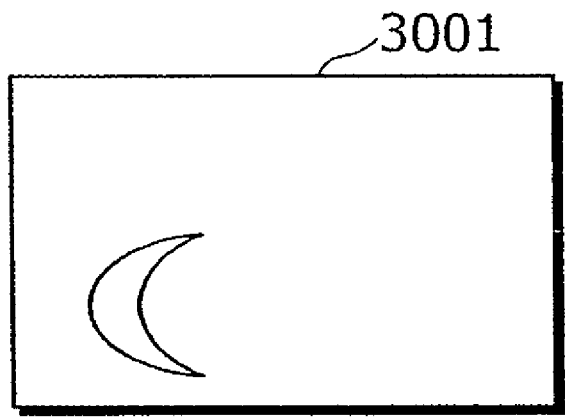
3001
Width:960
Height:540
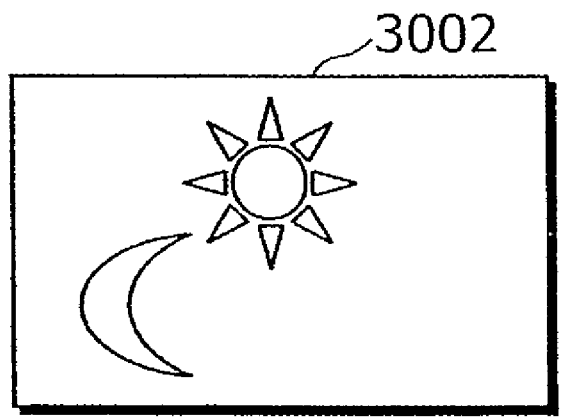
3002
Width:960
Height:540
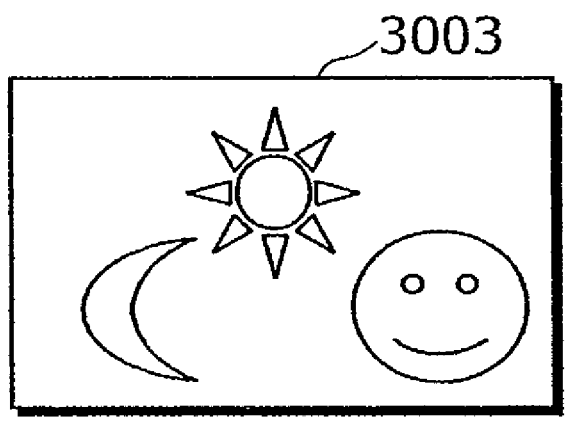
3003
Width:960
Height:540

FIG. 32

| Combination | Plane | Screen Resolution (Width * Height) | Screen Ratio of Width and Height |
|---|---|---|---|
| 1 | Video Plane | 720*480 | 4 : 3 |
| | Still Plane | 720*480 | 4 : 3 |
| | OSD Plane | 720*480 | 4 : 3 |
| 2 | Video Plane | 720*480 | 16 : 9 |
| | Still Plane | 720*480 | 16 : 9 |
| | OSD Plane | 720*480 | 16 : 9 |
| 3 | Video Plane | 960*540 | 16 : 9 |
| | Still Plane | 960*540 | 16 : 9 |
| | OSD Plane | 960*540 | 16 : 9 |
| 4 | Video Plane | 1920*1080 | 16 : 9 |
| | Still Plane | 1920*1080 | 16 : 9 |
| | OSD Plane | 960*540 | 16 : 9 |

3201
3202
3203
3204

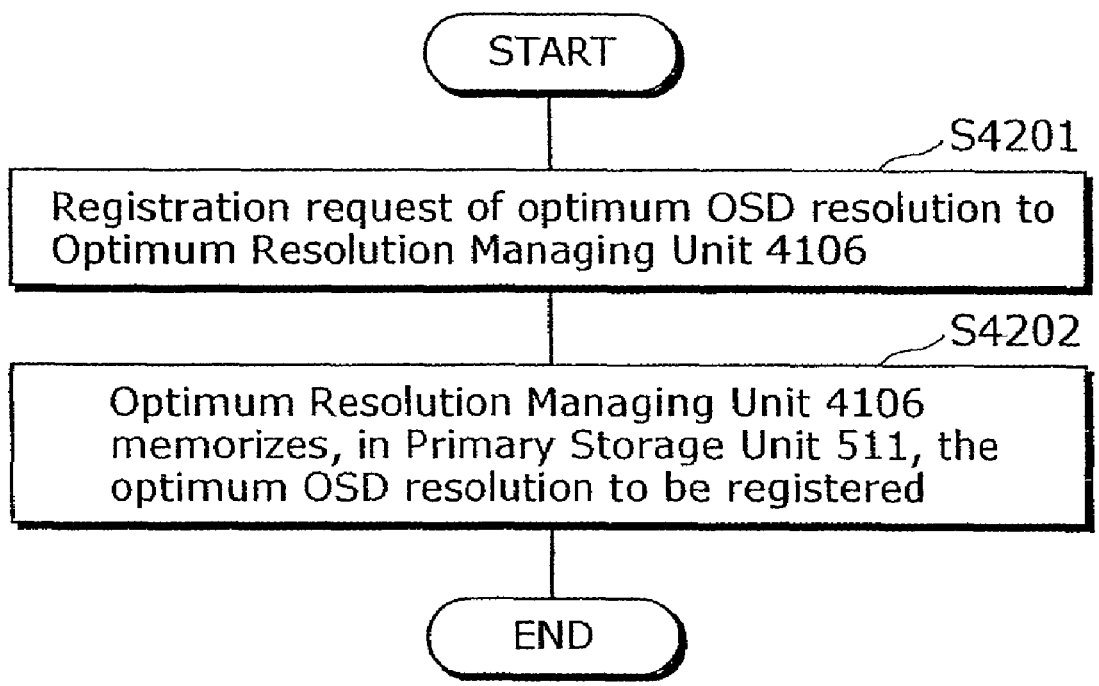
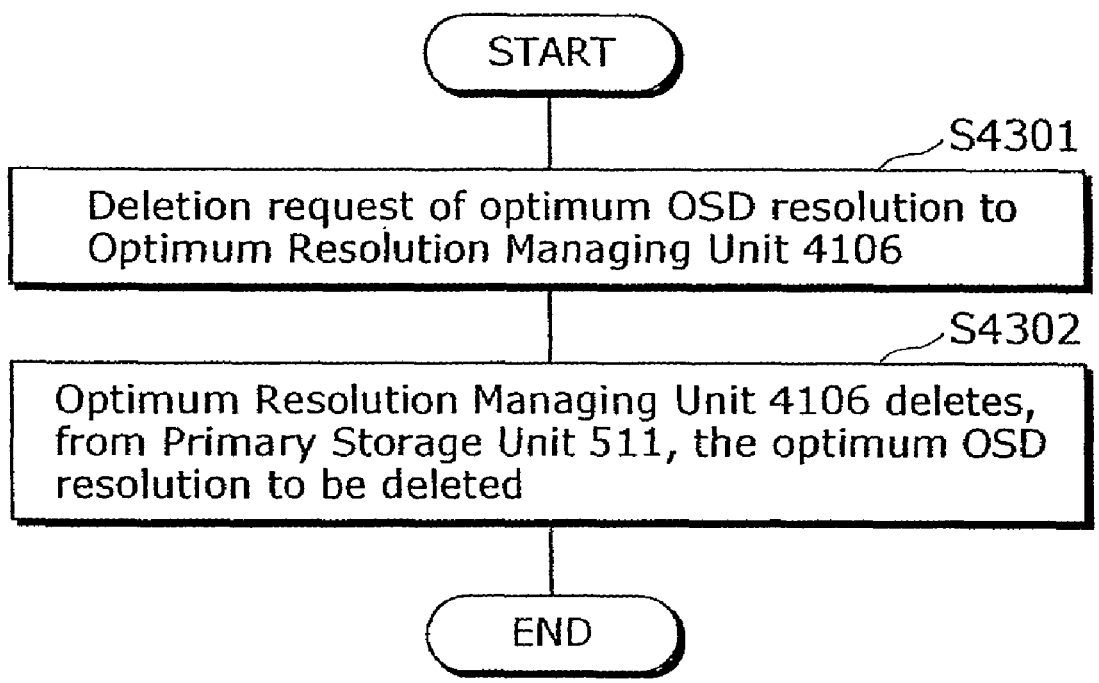

FIG. 49

Java Program
Identifier 4900

| Identifier | Optimum OSD Resolution | |
|---|---|---|
| | Width * Height | Ratio of width and height |
| 701 | 720*480 | 4 : 3 |
| 701 | 720*480 | 16 : 9 |
| 702 | 960*540 | 16 : 9 |

4901
4902
4903

| Combination | First Buffer | Second Buffer | Third Buffer |
|---|---|---|---|
| 1 | OSD Buffer | Video Buffer | Still Buffer |
| 2 | OSD Buffer | Still Buffer | Video Buffer |
| 3 | Video Buffer | OSD Buffer | Still Buffer |
| 4 | Video Buffer | Still Buffer | OSD Buffer |
| 5 | Still Buffer | OSD Buffer | Video Buffer |
| 6 | Still Buffer | Video Buffer | OSD Buffer |

FIG. 60

| Combination | Buffer | Resolution (Width * Height) | Ratio of Width and Height |
|---|---|---|---|
| 1 | Video Buffer | 640*480 | 4:3 |
|   | Still Buffer | 640*480 | 4:3 |
|   | OSD Buffer | 640*480 | 4:3 |
| 2 | Video Buffer | 640*480 | 16:9 |
|   | Still Buffer | 640*480 | 16:9 |
|   | OSD Buffer | 640*480 | 16:9 |
| 3 | Video Buffer | 1920*1080 | 4:3 |
|   | Still Buffer | 1920*1080 | 4:3 |
|   | OSD Buffer | 640*480 | 4:3 |
| 4 | Video Buffer | 1920*1080 | 16:9 |
|   | Still Buffer | 1920*1080 | 16:9 |
|   | OSD Buffer | 640*480 | 16:9 |

FIG. 61

| Combination | Buffer | Resolution (Width * Height) | Ratio of Width and Height |
|---|---|---|---|
| 5 | Video Buffer | 640*480 | 4 : 3 |
|   | Still Buffer | 640*480 | 4 : 3 |
|   | OSD Buffer | 960*540 | 4 : 3 |
| 6 | Video Buffer | 640*480 | 16 : 9 |
|   | Still Buffer | 640*480 | 16 : 9 |
|   | OSD Buffer | 960*540 | 16 : 9 |
| 7 | Video Buffer | 1920*1080 | 4 : 3 |
|   | Still Buffer | 1920*1080 | 4 : 3 |
|   | OSD Buffer | 960*540 | 4 : 3 |
| 8 | Video Buffer | 1920*1080 | 16 : 9 |
|   | Still Buffer | 1920*1080 | 16 : 9 |
|   | OSD Buffer | 960*540 | 16 : 9 |

6101, 6102, 6103, 6104

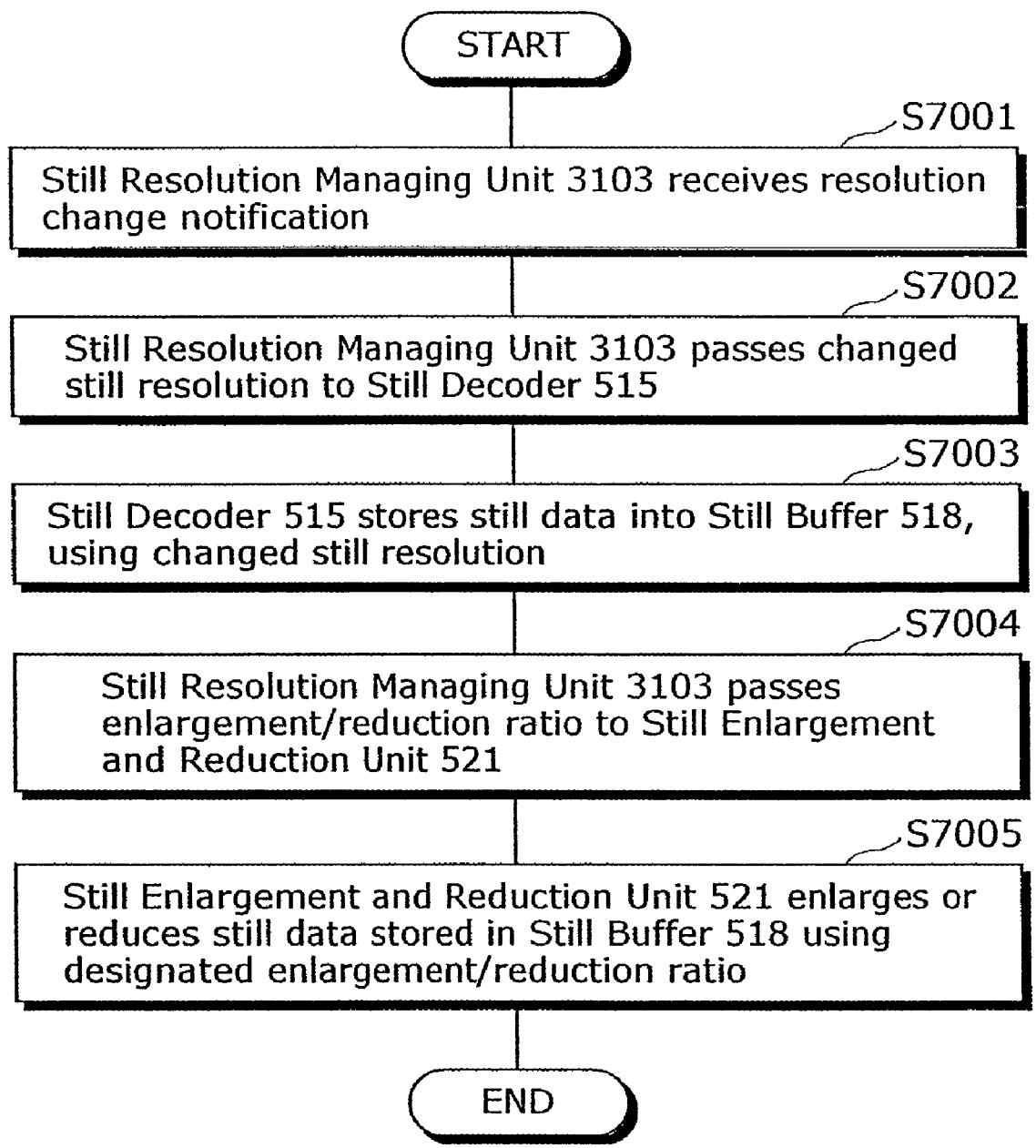

DISPLAY PROCESSING METHOD AND DISPLAY PROCESSING APPARATUS

CROSS-REFERENCE TO RELATED APPLICATION

This application is a continuation of U.S. patent application Ser. No. 10/891,300, filed Jul. 15, 2004, which claims priority to U.S. Provisional Patent Application No. 60/487,938, filed Jul. 18, 2003, and Japanese Application No. 2004-167726, filed Jun. 4, 2004, the contents of which are expressly incorporated by reference herein in their entirety.

BACKGROUND OF THE INVENTION (1) Field of the Invention

The present invention relates to a processing method and the like for displaying video and graphics, and particularly to a control for switching image resolutions in a TV receiver and the like that receives an interactive program through a digital broadcasting.

(2) Description of the Related Art

In recent years, a program called an interactive program has been broadcasted as practical usage of digital technologies. When the interactive program is provided on air, an application described in Java™, HTML, etc. is usually included in the program. Then, this application superposes information on video using graphics and/or texts for creating one content. To execute the application, the application is delivered to a TV receiver either through a digital wave that distributes the program or through a different delivery route such as the Internet. This function is called as application download or upload.

Also, the application may be the one that displays an advertisement, etc., which is unrelated to the program or content, at a corner of a screen on the TV receiver. Such an application is created by a vender different from a vender who creates an application for content, and the application here is independently downloaded from the content and executed on a TV receiver.

In general, in the interactive broadcasting like this, it is preferable that the application provides information along with graphics resolution corresponding to video resolution. This is because, if graphics resolution different from the resolution for the video is used, an enlargement and reduction process needs to be executed to unify both resolution when the information is output on a display apparatus. However, when this process is executed, pixel dithering, etc. occur, which make it difficult to keep a beautiful display.

In the meantime, in compression technologies for digital video, such as an MPEG technology, there is a huge difference in a bandwidth necessary for data transfer if video resolution varies. Because of this, in the digital broadcasting, it is necessary, from a viewpoint of saving the band for data transfer, to broadcast a program with appropriate video resolution according to its program content.

Then, a combination of the video resolution and the graphics resolution becomes an issue at this point.

That is to say, if the video resolution of a channel that has been selected up to a certain point is different from the video resolution of another channel that is newly selected, a beautiful picture can not be expected unless these graphics are displayed with the graphics resolution respectively corresponding to each of the video resolution. The most preferable selection is to use the graphics resolution equivalent to the video resolution. However, depending on a TV receiver, such graphics resolution can not be used due to some reasons such as a cost. If that is the case, it is supposed to select the graphics resolution that can provide a display as beautiful as possible.

As one of conventional technologies for realizing selection of the graphics resolution, there is a HAVi specification. HAVi (http://www.havi.org/) stands for Home Audio Video Interoperability. It stipulates a specification that allows an application operated on a TV receiver controlling the graphics resolution and the video resolution. In the HAVi specification, an API is provided to control the graphics resolution in a class called HGraphicsDevice. When the application designates ideal graphics resolution to be used, it is possible to provide and use the resolution closest to it from the graphics resolution available in the TV receiver.

In the meantime, graphics display materials with resolution according to an image format are made available in advance. And, when the video resolution is changed, its image format is determined from video packets, and graphics display materials according to the image format are displayed. By doing so, the display materials with the same quality and in the same size can be consistently shown (See Japanese Laid-Open Patent application No. 2000-23061, Japanese Laid-Open Patent application No. 2002-247465, Japanese Laid-Open Patent application No. 10-124021, and Japanese Patent No. 3315557, for example).

However, in the HAVi specification, graphics resolution, which is the closest to the desired one, is simply selected from the graphics resolution available in the TV receiver. It does not take account of an ideal combination of the graphics resolution with the video resolution received currently.

Also, in the above patent documents and the like, when the video resolution is changed, it is possible to show the display material with the same quality and in the same size on the TV receiver. However, it does not consider a layout of the application display.

SUMMARY OF THE INVENTION

The present invention aims at providing a display method and the like capable of automatically selecting appropriate graphics resolution, taking account of an ideal combination with video resolution currently received by the TV receiver, notifying and providing it to an application so that a beautiful display can be achieved without causing any distortion of graphics display even if the video resolution is switched.

The present invention also aims at, when the video resolution is changed, providing a display method and the like that prioritizes and selects graphics resolution requested by an application depending on a type of the application or selects graphics resolution according to resolution of a video format so that it can show a beautiful display without causing any distortion of graphics display even if the video resolution is switched.

In order to solve the above problem, the present invention is a display processing method comprising: a graphics resolution change request accepting step of accepting, from an application, a resolution change request for changing a resolution of graphics; a graphics resolution changing step of changing the resolution of the graphics in response to the resolution change request; a video enlarging and reducing step of enlarging or reducing received video so that said video and the graphics whose resolution has been changed in the graphics resolution changing step are composed; and a composing and outputting step of composing the graphics and the video, and outputting a resultant of said composition, wherein in the video enlarging and reducing step, in the case where a resolution of the received video is changed, in order to compose the video whose resolution has been changed and the graphics whose resolution has been changed in the graphics resolution changing step, it is determined whether to enlarge or reduce the received video depending on the change in the resolution of said video, and said video is enlarged or reduced according to said determination, and in the composing and outputting step, the graphics and the video which has been enlarged or reduced in the video enlarging and reducing step are composed, and the resultant of said composition is outputted. Accordingly, in the case where a request for changing the resolution of the graphics is received from the application and where the resolution of the received video has been changed, such video is enlarged or reduced based on the resolution of the graphics. This makes it possible to compose the graphics and video without changing the resolution of the graphics required by the application, and therefore to display the resultant of said composition, with the quality of the graphics maintained.

Here, the display processing method may further comprise a graphics resolution change permitting step of granting permission to change the resolution of the graphics to the application that makes the resolution change request, wherein in the graphics resolution change request accepting step, the resolution change request is accepted from the application that has been granted the permission. Accordingly, since a graphics change request from an application without permission will not be accepted, only an appropriate application is allowed to change the resolution of the graphics.

Moreover, in the graphics resolution change permitting step, in the case where a resolution change request for changing the resolution of the graphics is received from an application that is different from the application that has been granted the permission, permission to change the resolution of the graphics may be granted only to either of said applications. Accordingly, it becomes possible to circumvent the situation in which appropriate processing cannot be performed because of another application making another graphics resolution change request.

Also, in the graphics resolution change permitting step, the permission to change the resolution of the graphics may be granted according to priorities that are given in advance to the respective applications. Accordingly, it becomes possible to grant permission to change the resolution of the graphics to an optimum application.

Furthermore, the display processing method may further comprise a step of enlarging or reducing a still image that is generated based on frame data provided by the application so that said still image and the graphics whose resolution has been changed in the graphics resolution changing step are composed, wherein in the composing and outputting step, the graphics, the video, and the still image are composed, and a resultant of said composition is outputted. Accordingly, it becomes possible to compose the graphics, video and still image without changing the resolution of the graphics required by the application, and therefore to display the resultant of said composition beautifully, with the quality of the graphics maintained.

Also, the present invention is a display processing method comprising: a graphics data storing step of storing graphics data designated by an application into a graphics data storing unit that is assigned a first graphics resolution; a video decoding step of decoding received video; a video data storing step of storing video data into a video data storing unit that is assigned a first video resolution, said video data being obtained by the decoding of the received video performed in the video decoding step; a composing and outputting step of composing the graphics data stored in the graphics data storing unit and the video data stored in the video data storing unit, and outputting a resultant of said composition, a graphics resolution change accepting step of accepting, from the application, a second graphics resolution that is used to change the first graphics resolution assigned to the graphics data storing unit; a graphics resolution changing step of changing the first graphics resolution assigned to the graphics data storing unit to the second graphics resolution that is accepted in the graphics resolution change accepting step; a video resolution determining step of determining a second video resolution to be assigned to the video data storing unit, depending on a current graphics resolution assigned to the graphics data storing unit; and a video resolution changing step of changing the first video resolution assigned to the video data storing unit to the second video resolution determined in the video resolution determining step, wherein said video resolution determining step and video resolution changing step are executed on one of the following occasions: the first graphics resolution assigned to the graphics data storing unit is changed in the graphics resolution changing step; and the first video resolution of the video received in the video decoding step changes. Accordingly, in the case where a request for changing the graphics resolution of the graphics data is received from the application and where the video resolution of the received video data has been changed, the video resolution of the received video is determined based on the graphics resolution. This makes it possible to compose the graphics data and video data without changing the graphics resolution required by the application, and therefore to display the resultant of said composition, with the quality of the graphics data maintained.

Here, the display processing method may further comprise: a still image storing step of storing a still image into a still image storing unit that is assigned a first still resolution; a still resolution determining step of determining a second still resolution to be assigned to the still image storing unit, depending on a current graphics resolution that is assigned to the graphics data storing unit; and a still resolution changing step of changing the first still resolution assigned to the still image storing unit to the second still resolution determined in the still resolution determining step, wherein said still resolution determining step and still resolution changing step are executed on one of the following occasions: the first graphics resolution assigned to the graphics data storing unit is changed in the graphics resolution changing step; and the first video resolution of the video received in the video decoding step changes, and in the composing and outputting step, the graphics data stored in the graphics data storing unit, the video data stored in the video data storing unit, and the still image stored in the still image storing unit are composed, and a resultant of said composition is outputted. Accordingly, it becomes possible to compose the graphics data, video data and still image without changing the graphics resolution required by the application, and therefore to display the resultant of said composition beautifully.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is an example that shows how to use a frequency band used for communications between a head end and a terminal apparatus in the cable TV system according to the present invention;

FIG. 3 is an example that shows how to use a frequency band used for communications between a head end and a terminal apparatus in the cable TV system according to the present invention;

FIG. 4 is an example that shows how to use a frequency band used for communications between a head end and a terminal apparatus in the cable TV system according to the present invention;

FIG. 13 (2) is an example of the display 509 according to the present invention;

FIG. 14 is an example of information stored in a secondary storage unit 510 according to the present invention;

FIG. 15 is an example of information stored in a primary storage unit 511 according to the present invention;

FIG. 20 is a pattern diagram that shows content of XAIT according to the present invention;

FIG. 28 is an example of a display image of enlargement and reduction according to the present invention;

FIG. 29 is an example of a display image before a composing process according to the present invention;

FIG. 30 is an example of a display image after the composing process according to the present invention;

FIG. 32 is an example of a combination available to be displayed between planes according to the present invention;

FIG. 42 is an example of a flowchart of an optimum resolution managing unit 4106 for a case an optimum OSD resolution is registered according to the present invention;

FIG. 43 is an example of a flowchart of the optimum resolution managing unit 4106 for a case an optimum OSD resolution is deleted according to the present invention;

FIG. 49 is an example of a set of Java program identifiers and optimum OSD resolution according to the present invention;

FIG. 60 is a diagram showing exemplary displayable combinations of resolutions of three types of the buffers;

FIG. 61 is a diagram showing exemplary displayable combinations of resolutions of three types of the buffers (continued from FIG. 60);

FIG. 70 is a flowchart in the case where the still resolution managing unit receives a resolution change notification;

DESCRIPTION OF THE PREFERRED EMBODIMENTS

First Embodiment

Figure 1:
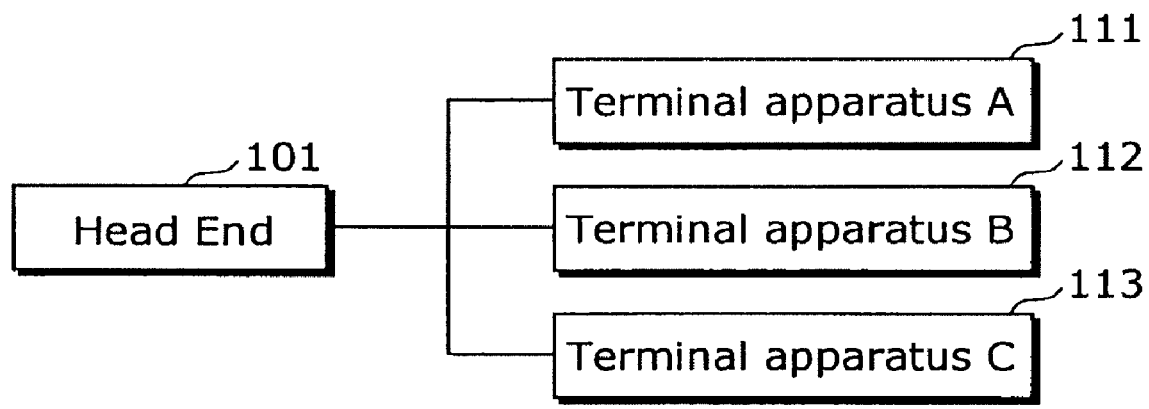
FIG. 1 is a configuration diagram of a cable TV system in an embodiment 1 according to the present invention.

With reference to diagrams, the following describes embodiment of a cable TV system according to the present invention. FIG. 1 is a block diagram that shows a relationship of an apparatus comprising a cable system, which includes a head end 101 and three terminal apparatuses A111, B112 and C113. In the present embodiment, three terminal apparatuses are connected to one head end. However, the present invention may also be embodied by having a designated number of terminal apparatuses that are connected to the head end.

The head end 101 sends a broadcasting signal of video, audio and data, etc. to a plural number of terminal apparatuses, and also receives data sent from the terminal apparatus. In order to realize this, a frequency bandwidth used for transmission between the head end 101 and terminal apparatuses A111, B112 and C113 is divided for use. FIG. 2 is a chart that shows an example of the divided frequency bandwidth. The bandwidth can be roughly divided into two types; Out Of Band (so-called OOB) and In-Band. 5 to 130 MHz are assigned to OOB, and mainly used for data communication between the head end 101 and terminal apparatuses A111, B112 and C113. 130 MHz to 864 MHz are assigned to the In-Band, and mainly used for a broadcasting channel that includes video and audio. A QPSK modulation method is used for OOB, and a QAM64 modulation method is used for In-Band. The modulation technology is a publicly known technology, which is not so closely tied up with the present invention, so that its detailed explanation is omitted here. FIG. 3 is an example of further detailed use of the OOB frequency bandwidth. 70 MHz to 74 MHz are used for data transmission from the head end 101, and all of the terminal apparatuses A111, B112 and C113 are supposed to receive the same data from the head end 101. On the other hand, 10.0 MHz to 10.1 MHz are used for data transmission from the terminal apparatus A111 to the head end 101, 10.1 MHz to 10.2 MHz are used for data transmission from the terminal apparatus B112 to the head end 101, and 10.2 MHz to 10.3 MHz are used for data transmission from the terminal apparatus C113 to the head end 101. By doing so, unique data in each terminal apparatus can be individually sent from each of the terminal apparatuses A111, B112 and C113 to the head end 101. FIG. 4 is an example showing how a frequency bandwidth of the In-Band is used. 150 to 156 MHz and 156 to 162 MHz are respectively assigned to a TV channel 1 and a TV channel 2, and following frequency bandwidths at intervals of 6 MHz are assigned to each corresponding TV channel. A frequency bandwidth of 310 MHz and bigger are respectively assigned to radio channels by each 1 MHz unit. Each of these channels may also used for analogue broadcasting or for digital broadcasting. For a case of the digital broadcasting, data is transmitted in a transport packet format based on MPEG 2 specifications, and also data for various data broadcasting can be sent in addition to audio and video.

The head end 101 contains a QPSK modulation unit and a QAM modulation unit, etc. for sending an appropriate broadcasting signal to these frequency bandwidths. Also, it is considered that the head end 101 has various devices related to these modulation units and demodulation units. However, because the present invention mainly relates to terminal apparatuses, its detailed explanation is omitted here.

The terminal apparatus A111, the terminal apparatus B112 and the terminal apparatus C113 receive and reproduce the broadcasting signal from the head end 101. Also, these apparatuses send unique data of each terminal apparatus to the head end 101. These three terminal apparatuses have the same structure in the present embodiment.

Figure 5:
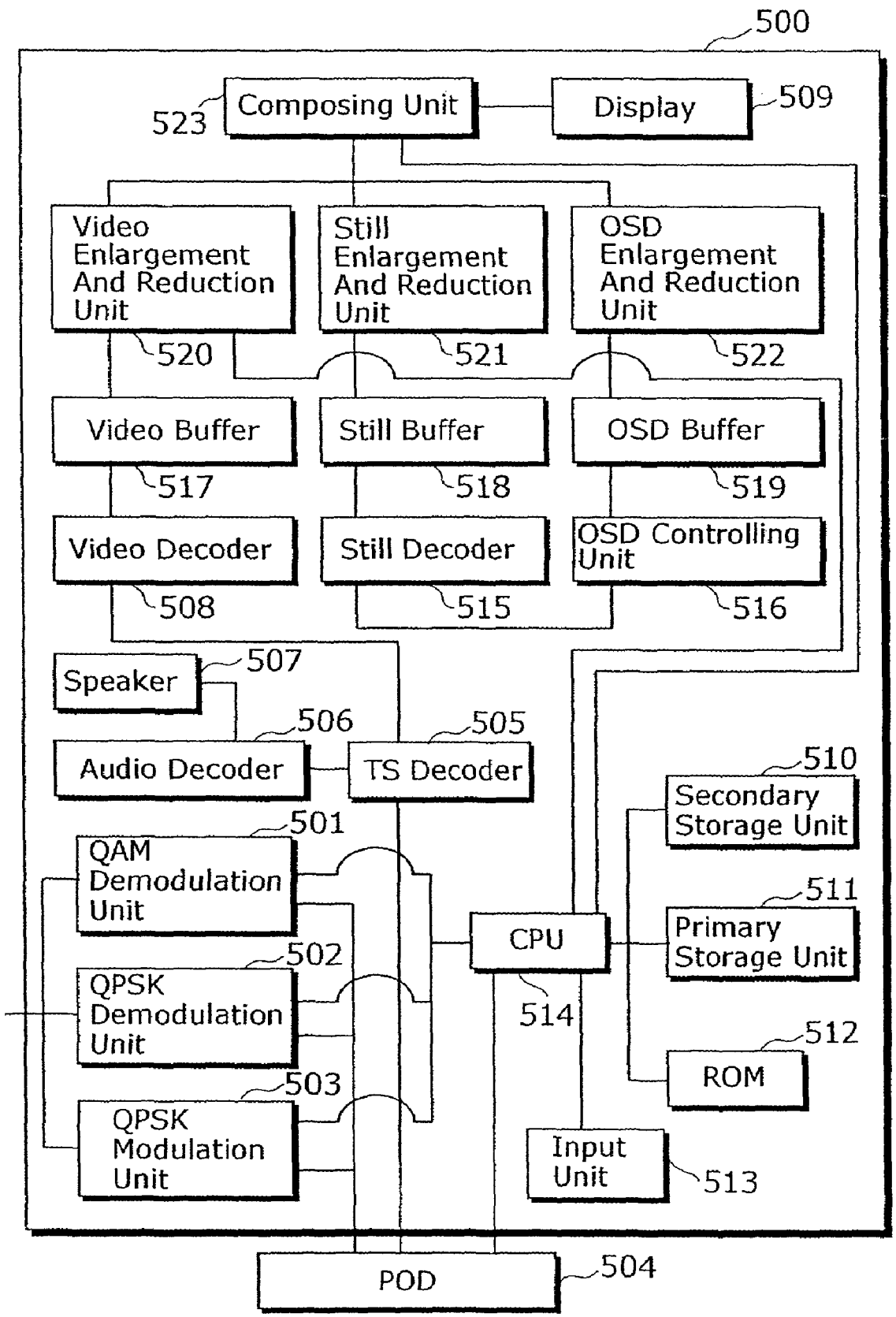
FIG. 5 is a configuration diagram of a terminal apparatus in the cable TV system according to the present invention.

FIG. 5 is a block diagram that shows a hardware configuration of the terminal apparatus. 500 is a terminal apparatus that includes a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, a CPU 514, a still decoder 515, an OSD controlling unit 516, a video buffer 517, a still buffer 518, an OSD buffer 519, a video enlargement and reduction unit 520, a still enlargement and reduction unit 521, an OSD enlargement and reduction unit 522, a composing unit 523. Also, a POD 504 is installed to and detached from the terminal apparatus 500.

Figure 6:
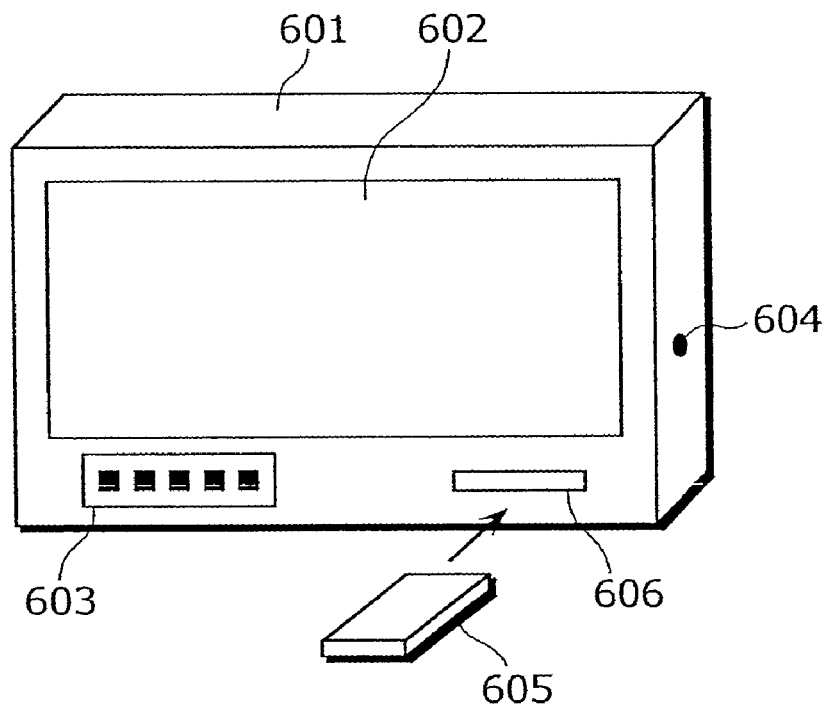
FIG. 6 is an example of an outside view of a terminal apparatus in the cable TV system according to the present invention.

FIG. 6 is a thin shaped television as one of the examples for an outlook of the terminal apparatus 500.

601 is a steel case of the thin shaped television, which has all of structural components of the terminal apparatus 500 in it with an exception of the POD 504.

602 is a display, which is equivalent to the display 509 shown in FIG. 5.

603 is a front panel unit combining of a plural number of buttons, which is equivalent to the input unit 513 in FIG. 5.

604 is a signal input terminal that connects a cable for sending and receiving a signal to/from the head end 101. The signal input terminal is connected to the QAM demodulation unit 501, the QPSK demodulation unit 502 and the QPSK modulation unit 503.

605 is a POD card, which is equivalent to the POD 504 in FIG. 5. Just like the POD card 605 in FIG. 6, the POD 504 has an independent configuration from the terminal apparatus 500 and is attached to and detached from the terminal apparatus 500. Details of the POD 504 will be explained later.

606 is an insertion slot to which the POD card 605 is inserted.

With reference to FIG. 5, the QAM demodulation unit 501 demodulates a signal which has been QAM-modulated in and sent by the head end 101 according to tuning information containing a frequency designated from the CPU 514, and passes it to the POD 504.

The QPSK demodulation unit 502 demodulates a signal which has been QPSK-modulated in and sent by the head end 101 according to tuning information containing a frequency designated from the CPU 514, and passes it to the POD 504.

The QPSK modulation unit 503 QPSK-modulates a signal sent by the POD 504 according to modulation information containing a frequency designated from the CPU 514, and passes it to the head end 101.

The POD 504 has a configuration that is detachable from the terminal apparatus body 500 as shown in FIG. 6. A connection interface between the terminal body 500 and the POD 504 is defined in OpenCable™ HOST-POD Interface Specification (OC-SP-HOSTPOD-IF-I12-030210) and a specification document referred by this specification document. Here, its detail is omitted, and only the part concerned for the present invention is explained.

Figure 7:
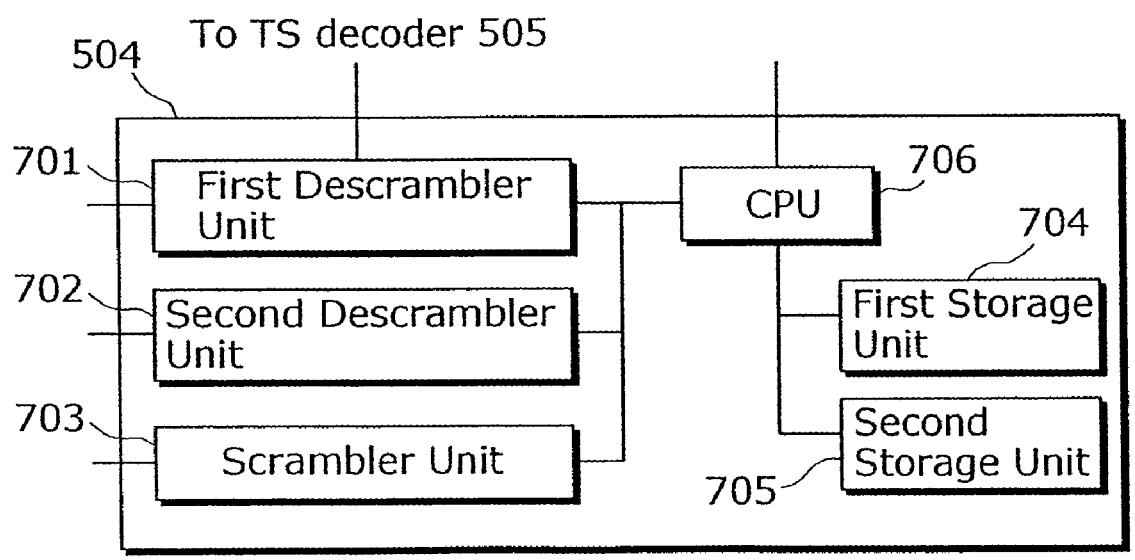
FIG. 7 is a configuration diagram of a hardware configuration of POD504 according to the present invention.

FIG. 7 is a block diagram that shows an internal configuration of the POD 504. The POD 504 includes a first descrambler unit 701, a second descrambler unit 702, a scrambler unit 703, a first storage unit 704, a second storage unit 705 and a CPU 706.

The first descrambler unit 701 receives a signal scrambled from the QAM demodulation unit 501 of the terminal apparatus 500 and descrambles it according to an instruction from the CPU 706. Then, the signal descrambled is sent to the TS decoder 505 of the terminal apparatus 500. Information necessary for decoding, such as a key, is provided from the CPU 706 as needed. To be more specific, the head end 101 broadcasts several paid channels. If a user subscribes this paid channel, the first descrambler unit 701 receives necessary information, such as a key, and descrambles its content so that the user can view the paid channel. If the necessary information, such as a key, is not provided, the first descrambler unit 701 does not execute the descrambling process, and sends the received signal as it is to the TS decoder 505.

According to an instruction from the CPU 706, the second descrambler unit 702 receives a signal scrambled from the QPSK demodulation unit 502 of the terminal apparatus 500 and descrambles it. Then, the second descrambler unit 702 passes the descrambled data to the CPU 706.

According to an instruction from the CPU 706, the scrambler unit 703 scrambles the data received from the CPU 706 and sends it to the QPSK modulation unit 503 of the terminal apparatus 500.

The first storage unit 704 is made up of a primary memory, which is specifically something like a RAM, etc. and is used for temporarily storing data when the CPU 706 executes a process.

The second storage unit 705 is made up of a secondary memory, which is specifically something like a flash ROM, etc., and is used for storing a program executed by the CPU 706, and also for saving data that should not be deleted even if its power is turned off.

Figure 8:
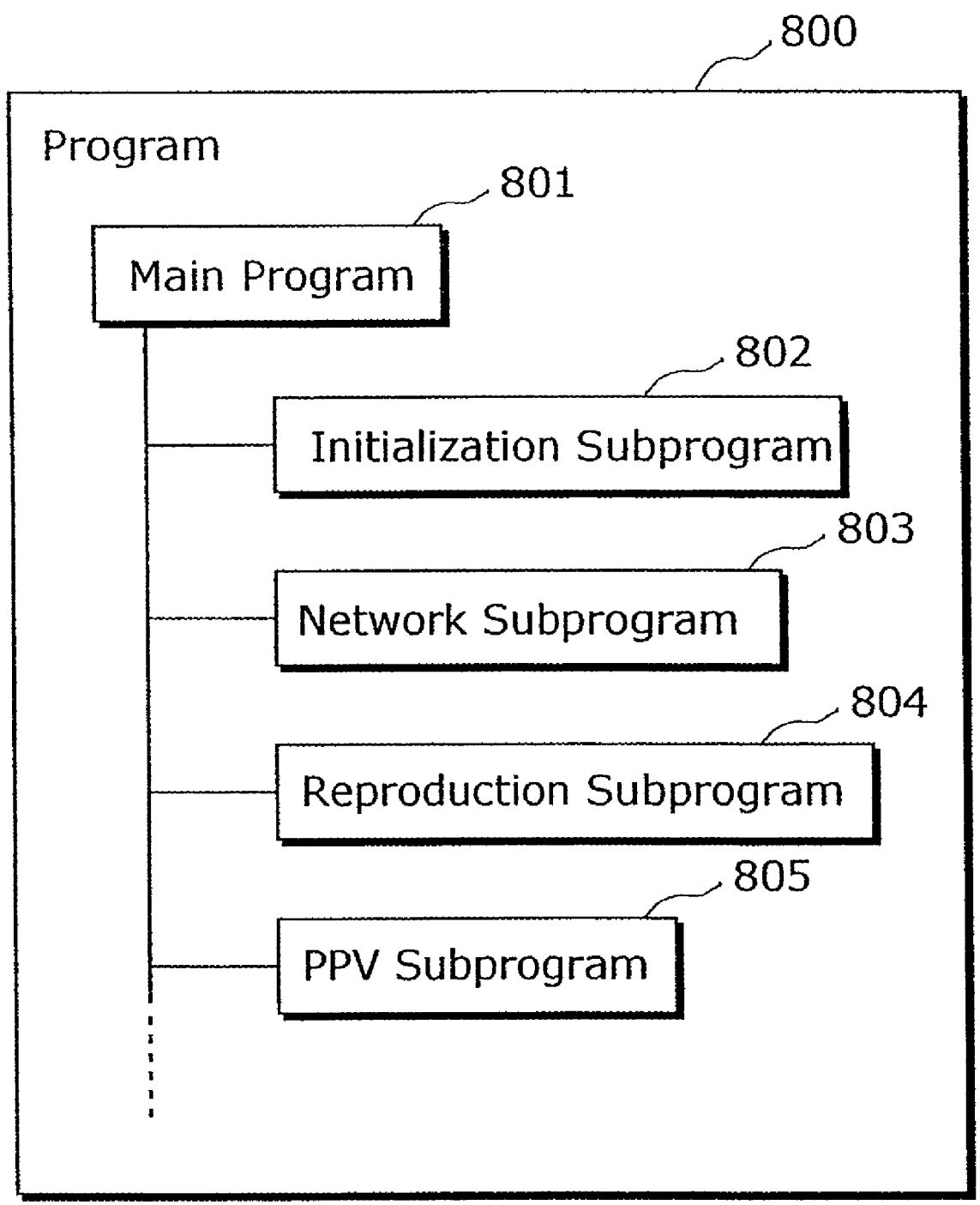
FIG. 8 is a configuration diagram of a program configuration stored in POD504 according to the present invention.

The CPU 706 executes a program memorized in the second storage unit 705. The program is made up of a plural number of subprograms. FIG. 8 is a sample program memorized in the second storage unit 705. In FIG. 8, the program 800 is made up of a main program 801 and a plural number of subprograms such as an initialization subprogram 802, a network subprogram 803, a reproduction subprogram 804, a PPV subprogram 805, etc.

The PPV here is an acronym of Pay Per View, which is a service to allow specific programs such as movies to be viewed with a certain charge. When a user enters a personal identification number, his subscription is notified to the head end 101, and its scramble is removed for viewing. The user will pay the subscription fee later for this view.

The main program 801 is a subprogram started at first by the CPU 706 when the power is turned on, and controls other subprograms.

The initialization subprogram 802 is started by the main program 801 when the power is turned on, exchanges information, etc. with the terminal apparatus 500 and executes an initialization process. Details of the initialization process are defined in OpenCable™, HOST-POD Interface Specification (OC-SO-HOSTPOD-IF-I12-030210) and a specification document referred by this specification document. Also, an initialization process that is not defined in the specification is also executed. Here, a part of it is introduced. When the power is turned on, the initialization subprogram 802 notifies a first frequency memorized in the second storage unit 705 to the QPSK demodulation unit 502 through the CPU 514 of the terminal apparatus 500. The QPSK demodulation unit 502 executes a tuning process with the first frequency provided, and sends a signal to the second descrambler unit 702. Also, the initialization subprogram 802 provides descramble information such as a first key memorized in the second storage unit 705 to the second descrambler unit 702. As a result of it, the second descrambler unit 702 executes descrambling and passes the outcome to the CPU 706 that executes the initialization subprogram 802. Therefore, the initialization subprogram 802 can receive the information. In the present embodiment, the initialization subprogram 802 is supposed to receive the information via the network subprogram 803. Its detail will be explained later.

Additionally, the initialization subprogram 802 notifies the second frequency memorized in the second storage unit 705 to the QPSK demodulation unit 503 via the CPU 514 of the terminal apparatus 500. The initialization subprogram 802 provides scramble information memorized in the second storage unit 705 to the scrambler unit 703. When the information to be sent by the initialization subprogram 802 is provided to the scrambler unit 703 via the network subprogram 803, the scrambler unit 703 scrambles the data using the scramble information provided and passes it to the QPSK demodulation unit 503 of the terminal apparatus 500. The QPSK demodulation unit 503 demodulates the scrambled information provided and sends it to the head end 101.

As a result of this, the initialization subprogram 802 is capable of conducting interactive communications with the head end 101 through the terminal apparatus 500, the second descrambler unit 702, the scrambler unit 703 and the network subprogram 803.

The network subprogram 803 is a subprogram for conducting interactive communications with the head end 101, which is used by a plural number of subprograms such as the main program 801 and the initialization subprogram 802. To be more specific, it acts like having interactive communications with the head end 101 through TCP/IP for other subprograms that use the network subprogram 803. TCP/IP is a well known technology that stipulates a protocol for information exchanges between a plural number of apparatuses, and its detail explanation is omitted here. The initialization subprogram 802 is started when the power is turned on, and the network subprogram 803 notifies a MAC address (an acronym of Media Access Control address), which is an identifier identifying POD 504 memorized by the second storage unit 705 in advance, and request to obtain the IP address. The head end 101 notifies the IP address to the POD 504 via the terminal apparatus 500, and the network subprogram 803 memorizes the IP address in the first storage unit 704. From this point, the head end 101 and the POD 504 use this IP address as an identifier of the POD 504, and conducts communications.

The reproduction subprogram 804 provides descramble information such as a second key, etc., which is memorized in the second storage unit 705, and descramble information such as a third key, etc., which is provided from the terminal apparatus 500, to the first descrambler unit 701, and enables a descrambling process. Also, it receives via the network subprogram 803 information that the signal entered in the first descrambler unit 701 is a PPV channel. When it recognizes that it is PPV channel, it starts the PPV subprogram 805.

When the PPV subprogram 805 is started, it displays a message to prompt subscription of a program on the terminal apparatus 500, and receives the user's input. To be more specific, when information to be displayed on a screen is sent to the CPU 514 of the terminal apparatus 500, a program that activates on the CPU 514 of the terminal apparatus 500 displays a message on the display 509 of the terminal apparatus 500. When the user enters a personal identification number through the input unit 513 of the terminal apparatus 500, the CPU 514 of the terminal apparatus 500 receives it and notifies it to the PPV subprogram 815 that activates on the CPU 706 of the POD 504. The PPV subprogram 805 sends the received personal identification number to the head end 101 via the network subprogram 803. When the personal identification number is correct, the head end 101 notifies descramble information such as a fourth key, which is necessary for descramble, to the PPV subprogram via the network subprogram 803. The PPV subprogram 805 provides the received descramble information such as the fourth key to the first descrambler unit 701, and the first descrambler unit 701 descrambles the entered signal.

Figure 9:
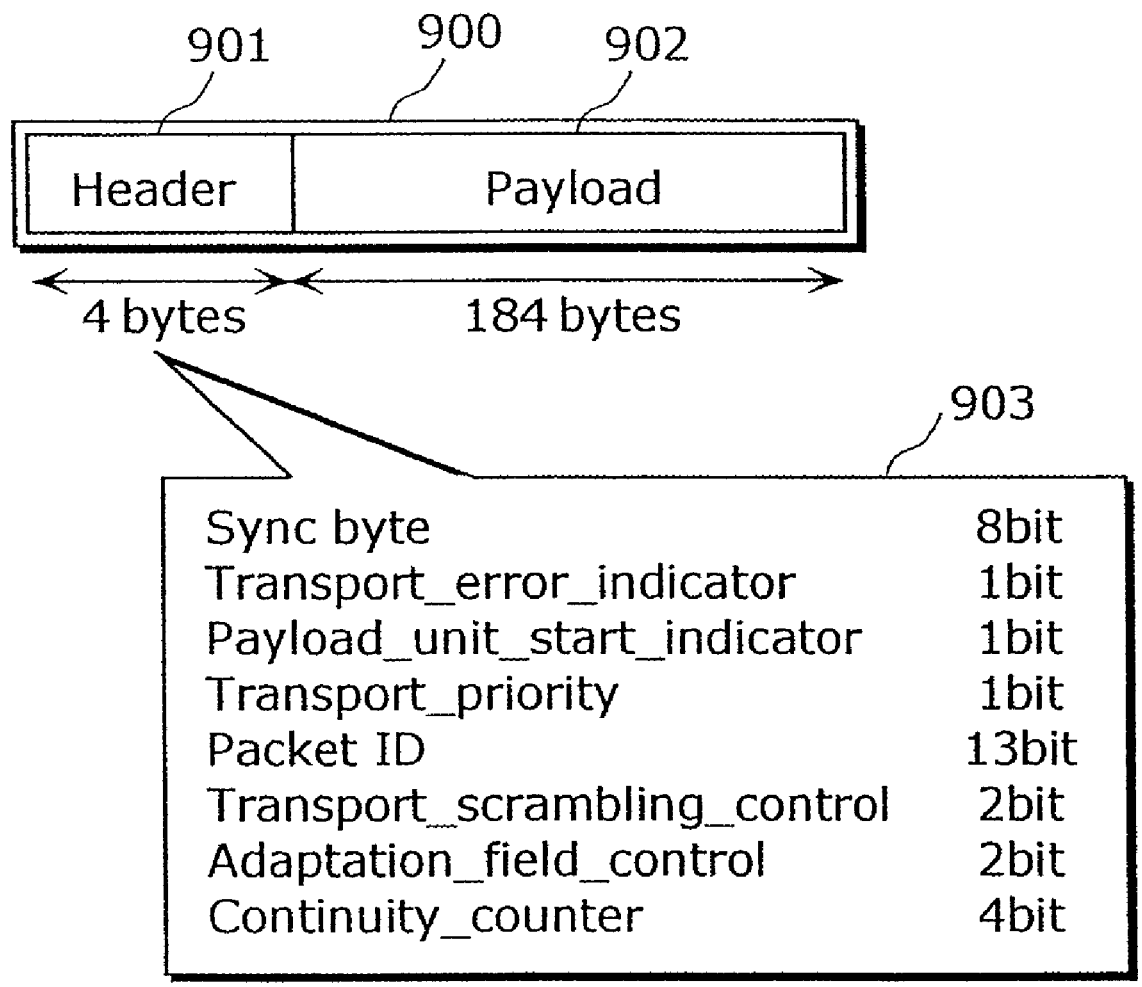
FIG. 9 is a configuration diagram of a packet defined in an MPEG standard.
Figure 10:
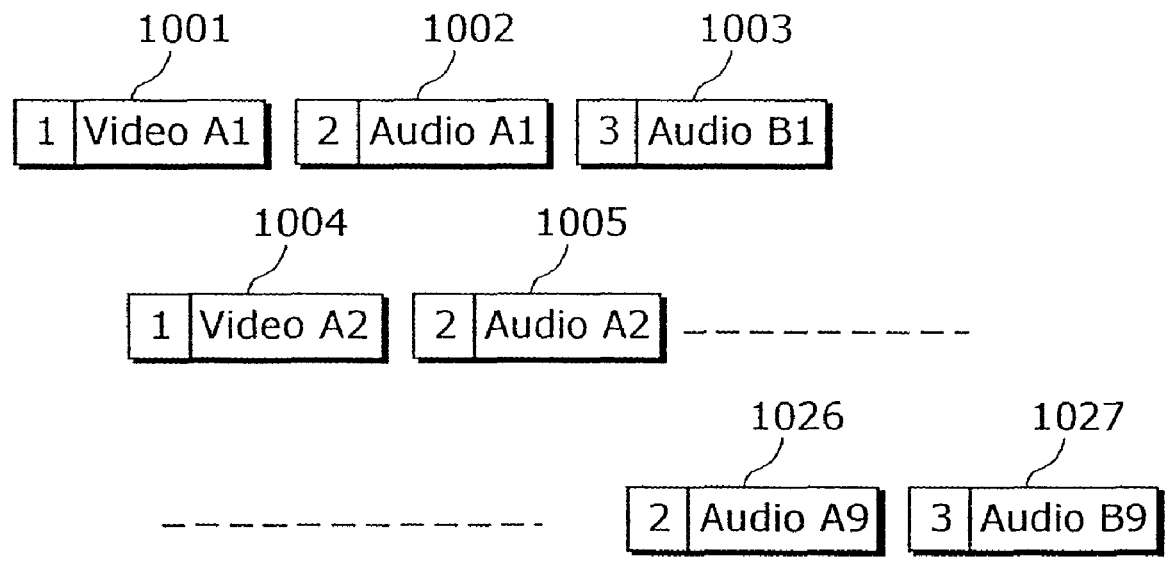
FIG. 10 is an example of an MPEG 2 transport stream.

With reference to FIG. 5, the TS decoder 505 filters the signal received from the POD 504, and provides necessary data to the audio decoder 506, the video decoder 508 and the CPU 514. The signal coming from the POD 504 here is an MPEG2 transport stream. Details of the MPEG2 transport stream are described in the IOS/IEC13818-1 as an MPEG standard document, and their explanation is omitted here in the present embodiment. The MPEG 2 transport stream is made up of a plural number of fixed length packets, and a packet ID is assigned to each packet. FIG. 9 is a packet configuration diagram. 900 is a packet structured in a fixed length of 188 bytes. The first 4 bytes are a header 901 that stores packet identification information, and the remaining 184 bits are a payload 902 that contains information to be sent. 903 is a breakdown of the header 901. The packet ID is contained in 13 bits from the 12th bit to the 24th bit. FIG. 10 is a pattern diagram that expresses a plural number of packet columns to be sent. A packet 1001 has a packet ID "1" in its header and a payload contains first information of video A. A packet 1002 has a packet ID "2" in its header and a payload contains first information of audio A. A packet 1003 has a packet ID "3" in its header and the payload contains first information of audio B.

A packet 1004 has a packet ID "1" in its header, a payload contains second information of the video A, which is the subsequent information of the packet 1001. In a similar way to this, packets 1005, 1026 and 1027 contain subsequent data of other packets. In a way like this, when contents of the packet payloads containing the same packet ID are concatenated, continued video or audio can be reproduced.

With reference to FIG. 10, when the CPU 514 designates the packet ID "1" and a "video decoder 508" as an output destination to the TS decoder 505, the TS decoder 505 extracts a packet with the packet ID "1" from the MPEG 2 transport stream received from the POD 504, and passes it to the video decoder 508. In FIG. 10, only the video data is passed to the video decoder 508. At the same time, when the CPU 514 designates the packet ID "2" and the "audio decoder 506" to the TS decoder 505, the TS decoder 505 extracts a packet with the packet ID "2" from the MPEG2 transport stream received from the POD 504, and passes it to the audio decoder 506. In FIG. 10, only the audio data is passed to the audio decoder 506.

A process to extract only a necessary packet according to this packet ID is a filtering process conducted by the IS decoder 505. The TS decoder 505 can executes a plural number of filtering processes designated from the CPU 514 at the same time.

With reference to FIG. 5, the audio decoder 506 concatenates audio data embedded in the packets of MPEG2 transport stream provided from the TS decoder 505, executes digital-analog conversion, and outputs it to a speaker 507.

The speaker 507 outputs a signal provided from the audio decoder 506 as audio.

The video decoder 508 decodes the video data, which is embedded in the packet of the MPEG2 transport stream provided from the TS decoder 505, into a video buffer 517. Also, it reads video information such as data resolution of the video and a ratio of height and width of the video, e.g. 4 to 3 or 16 to 9, and detects any changes in the video information. The information detected is notified to a video format resolution change detecting unit 3104, which is explained later.

A still decoder 515 decodes MPEG-I frame data, which is designated from the CPU 514, into a still buffer 518. Because details of the MPEG2-I frame are described in ISO/IEC13818-2 as an MPEG standard document, its detailed explanation is omitted here in the present embodiment.

The OSD controlling unit 516 decodes graphics data, which is designated from the CPU 514, into an OSD buffer 519.

According to an enlargement and reduction command designated from the CPU 514, the video enlargement and reduction unit 520 enlarges or reduces the data stored in the video buffer 517, and passes it to a composing unit 523.

According to an enlargement and reduction command designated from the CPU 514, the still enlargement and reduction unit 521 enlarges or reduces the data stored in the video buffer 518, and passes it to the composing unit 523.

According to an enlargement and reduction command designated from the CPU 514, the OSD enlargement and reduction unit 522 enlarges or reduces the data stored in the video buffer 519, and passes it to the composing unit 523.

The composing unit 523 follows a Z order of each plane designated from the CPU 514, and superposes the data passed from the video enlargement and reduction unit 520, the data passed from the still enlargement and reduction unit 521 and the data passed from the OSD enlargement and reduction unit 522, and outputs it to the display 509. In order to explain the Z order of each plane designated from the CPU 514, a general TV receiver has three layered structure, which has an OSD plane displaying characters and graphics, a video plane displaying a video, and a still plane displaying a still image, and its order of the superposition is called as Z order. For example, with reference to FIG. 22, if 2201 is a first plane viewed at a front side from a viewer, 2202 is a second plane that is located at a back side of 2201, and 2203 is a third plane that is located at the furthest back, there are six possible combinations as described in FIG. 23.

The display 509 is, to be more specific, made up of a cathode-ray tube, a liquid crystal display, etc., which outputs a video signal provided from the video decoder 508, and displays a message designated from the CPU 514.

The secondary memory 510, to be more specific, is made up of a flash memory, hard disk, etc., which stores and deletes data or programs designated from the CPU 514. Also, the data and the programs stored are referred to by the CPU 514. The data and the programs stored remain to be stored even if the power of the terminal apparatus 500 is turned off.

The primary storage unit 511 is, to be more specific, made up of RAM, etc., which temporarily stores and deletes data and programs designated by the CPU 514. Additionally, the data and the programs stored are referred by the CPU 514. The data and the programs stored are cleared when the power of the terminal apparatus 500 is turned off.

ROM 512 is a memory device that cannot be rewritten, which is, to be more specific, made up of ROM, CD-ROM, DVD, etc. The ROM 512 stores a program executed by the CPU 514.

Figure 11:
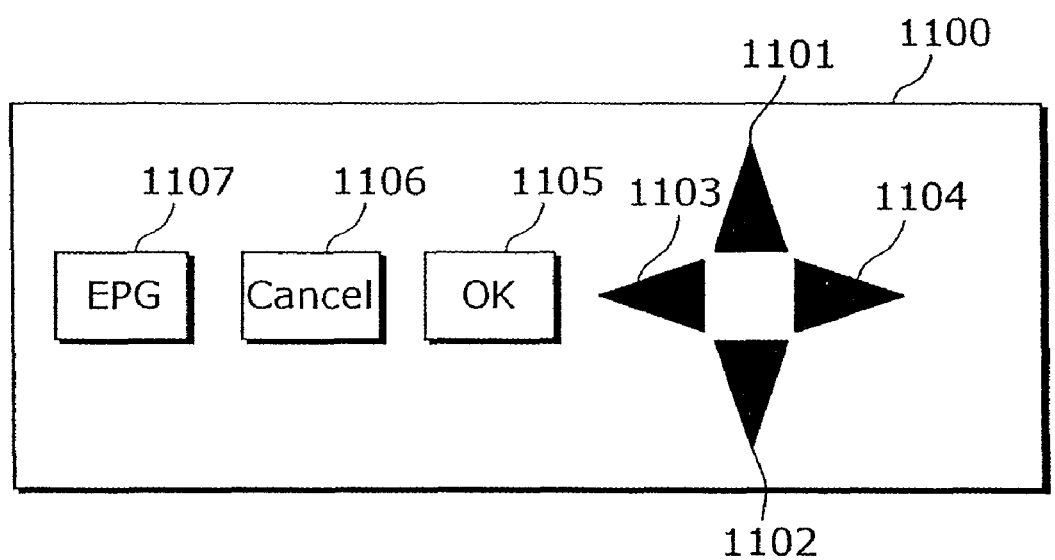
FIG. 11 is an example of an outside view for a case that an input unit 513 is realized on a front panel.

The input unit 513 is, to be more specific, made up of a front panel and a remote controller, which accepts an input from the user. FIG. 11 is an example for a case that the input unit 513 is made up of the front panel. 1100 is a front panel, which is equivalent to the front panel 603 in FIG. 6. The front panel 1100 includes 7 buttons, an up cursor button 1101, a down cursor button 1102, a left cursor button 1103, a right cursor button 1104, an OK button 1105, a cancel button 1106 and an EPG button 1107. When the user presses one of the buttons, an identifier of the pressed button is notified to the CPU 514.

The CPU 514 executes a program memorized in the ROM 512. According to the program executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511 and the ROM 512.

Figure 12:
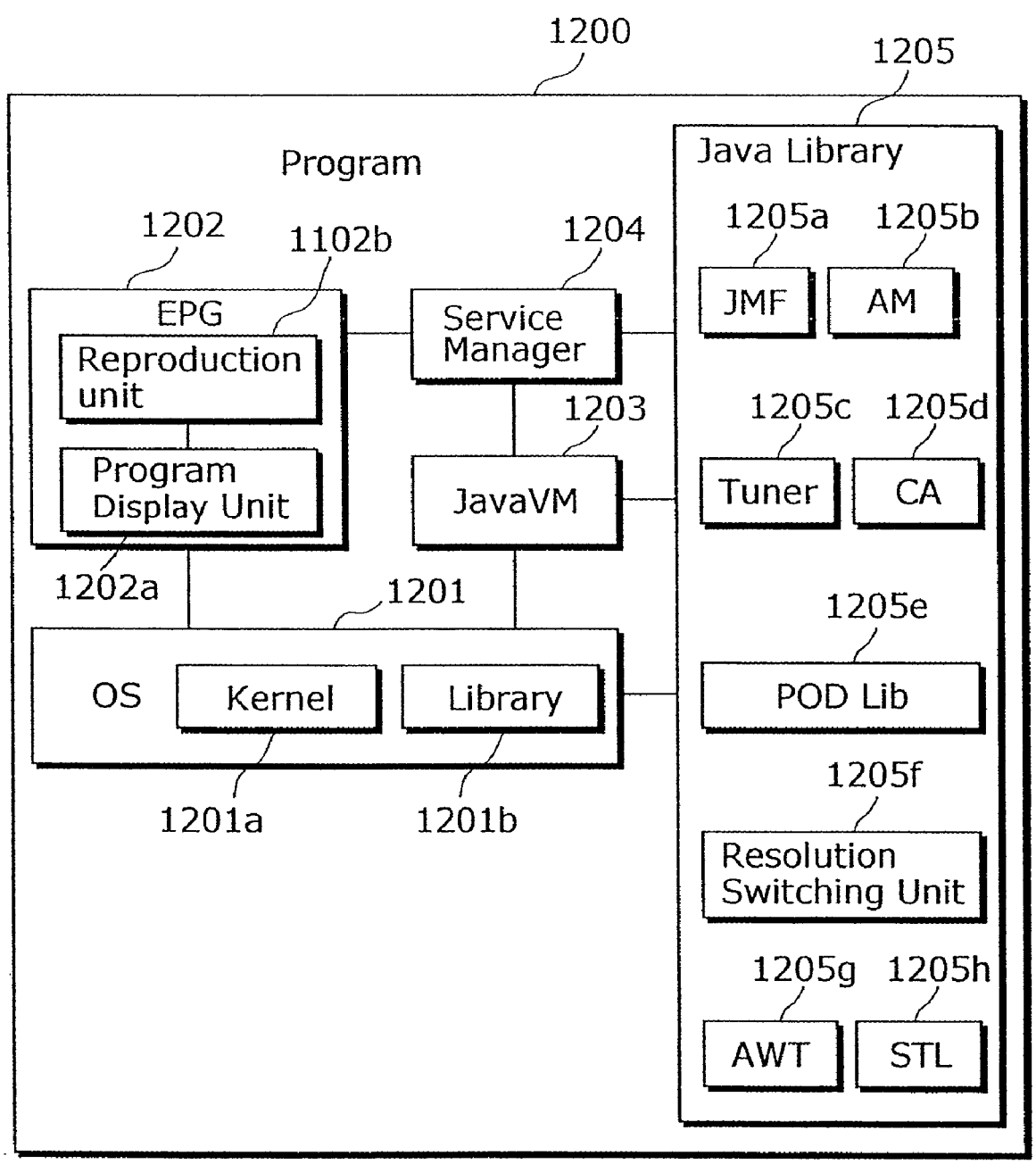
FIG. 12 is a configuration diagram of a program configuration stored in a terminal apparatus 500 according to the present invention.

FIG. 12 is an example of a configuration diagram for the program memorized in the ROM 512 and executed by the CPU 514.

A program 1200 is made up of a plural number of subprograms, which is, to be more specific, made up of an OS 1201, an EPG 1202, a Java VM 1203, a service manager 1204 and a Java library 1205.

The OS 1201 is a subprogram that is started by the CPU 514 when the power of the terminal apparatus 500 is turned on. The OS 1201 is an abbreviation of Operation System, and its example is Linux, etc. The OS 1201 is a generic name for a publicly well-known technology made up of a kernel 1201a, which concurrently executes other subprograms, and a library 1201b, and its detailed explanation is omitted here. In the present embodiment, the kernel 1201a of the OS 1201 executes the EPG 1202 and the Java VM 1203 as a subprogram. Also, the library 1201b provides a plural number of functions for controlling structural elements held by the terminal apparatus 500 for these subprograms.

As one of the functions, a tuning function is introduced here. With the tuning function, tuning information that includes a frequency is received from other subprograms, and passed to the QAM demodulation unit 501. Accordingly, it becomes possible for the QAM demodulation unit 501 to execute a demodulation process based on the provided tuning information, and to pass the demodulated data to the POD 504. As a result of this, other subprogram can control the QAM demodulator via the library 1201b.

The EPG is made up of a program display unit 1202a that displays a list of programs to the user and accepts an input from the user, and a reproduction unit 1202b that select a channel. The EPG stated here is an acronym of Electric Program Guide.

Figure 13:
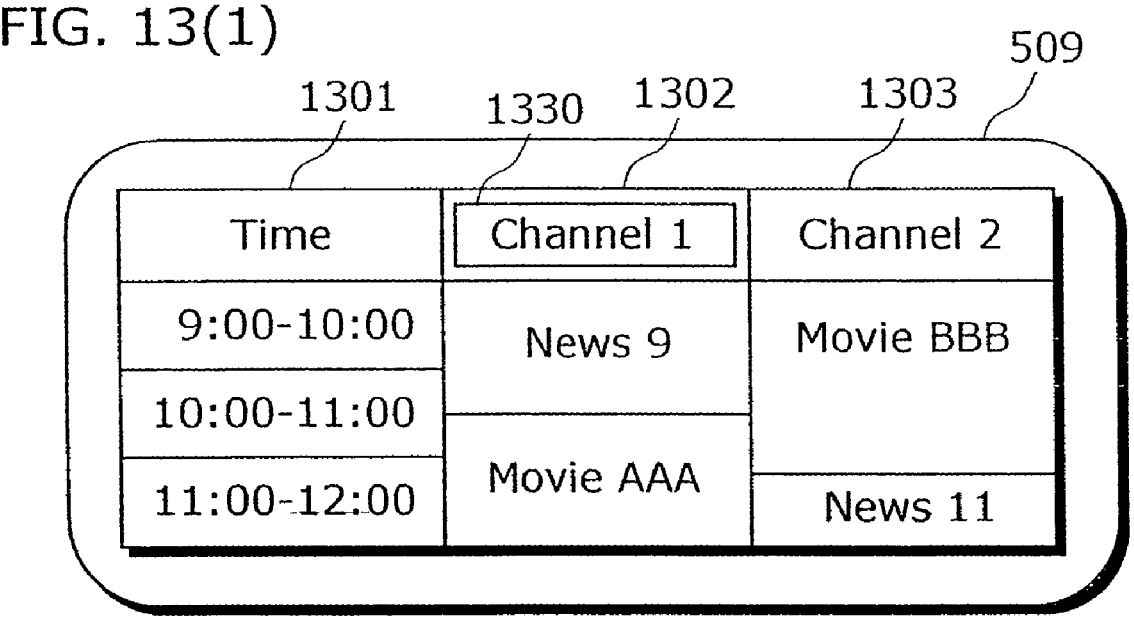
FIG. 13 (1) is an example of a display 509 according to the present invention.
Figure 13:
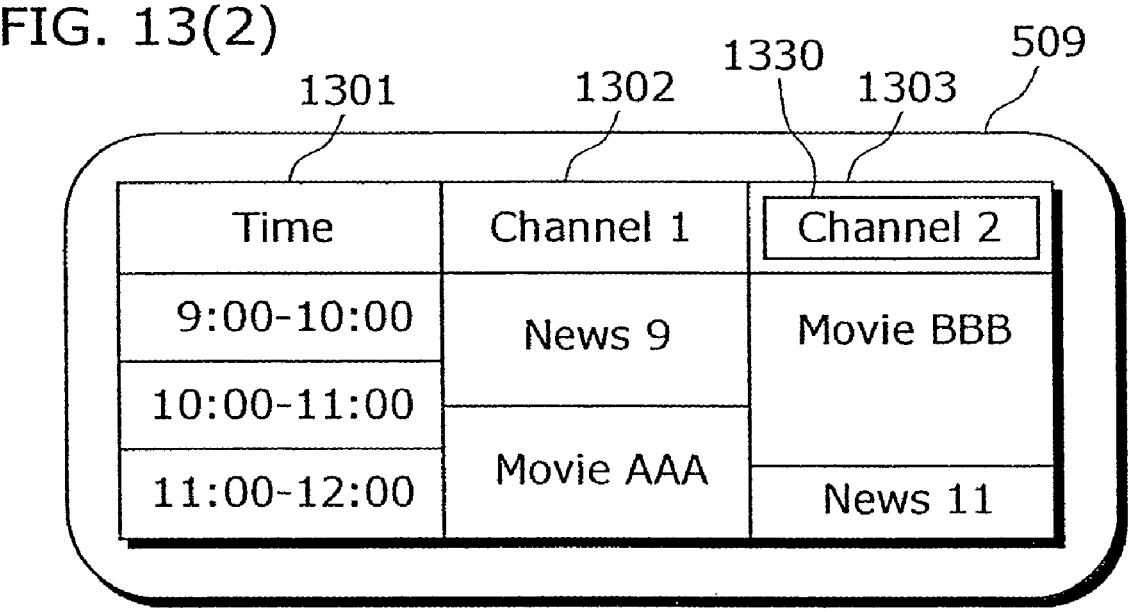

When the power of the terminal apparatus 500 is turned on, the EPG 1202 is started by the kernel 1201a. Within the EPG 1202 started, the program display unit 1202a waits for an input from the user via the input unit 513 of the terminal apparatus 500. When the input unit 513 is made up of a front panel indicated in FIG. 11 and the user presses the EPG button 1107 of the input unit 513, an identifier of the EPG button is notified to the CPU 514. The program display unit 1202a of the EPG 1202, which is a subprogram activated on the CPU 514, receives this identifier, and displays program information on the display 509. FIG. 13 (1) and FIG. 13 (2) are examples of program charts displayed on the display 509. With reference to FIG. 13 (1), the display 509 displays the program information in a grid pattern. Time schedule information is displayed in a column 1301. A channel name "Channel 1" and a program shown in a time zone corresponding to the time schedule in the column 1301 are displayed in a column 1302. It shows that a program called "News 9" is televised from 9:00 to 10:30 and a program called "Movie AAA" is televised from 10:30 to 12:00 on the "Channel 1". In the same way as the column 1302, a channel name "Channel 2" and a program shown in a time zone corresponding to the time schedule in the column 1301 are shown in a column 1303. It shows that a program called "Movie BBB" is televised from 9:00 to 11:00 and a program called "News 11" is televised from 11:00 to 12:00. 1330 is a cursor. The cursor 1330 is moved by pressing the left cursor 1103 and the right cursor 1104 on the front panel 1100. In a situation of FIG. 13 (1), the cursor 1330 is moved to a right side when the right cursor 1104 is pressed down, which is as shown in FIG. 13 (2). Also, in a situation of FIG. 13 (2), the cursor 1330 is moved to a left side when the left cursor 1103 is pressed down, which is as shown in FIG. 13 (1).

In a situation of FIG. 13 (1), when an OK button 1105 of the front panel 1100 is pressed down, the program display unit 1202*a* notifies an identifier of the "Channel 1" to the reproduction unit 1202*b*. In a situation of FIG. 13 (2), when the OK button 1105 of the front panel 1100 is pressed down, the program display unit 1202*a* notifies an identifier of the "Channel 2" to the reproduction unit 1202*b*.

Also, the program display unit 1202*a* memorizes the displaying program information in the primary storage unit 511 from the head end 101 on a regular basis via the POD 504. Generally speaking, acquirement of the program information from the head end takes time. When the EPG button 1107 of the input unit 513 is pressed down, a program chart can be quickly displayed by displaying the program information pre-stored in the primary storage unit 511.

The reproduction unit 1202*b* reproduces a channel using the received identifier of the channel. Relationship between the channel identifier and the channel is pre-stored in the secondary storage unit 510 as channel information. FIG. 14 is an example of channel information stored in the secondary storage unit 510. The channel information is stored in a tabular form. A column is a channel identifier. A column 1402 is a channel name. A column 1403 is tuning information. The tuning information here includes frequencies, transmission rates, coding rates, etc., which are values provided to the QAM demodulation unit 501. A column 1404 is a program number. The program number here is a number that identifies PMT stipulated in the MPEG2 standard. PMT will be explained later. Each line from the line 1411 to the line 1414 is a set of each channel identifier, channel name and tuning information. The line 1411 is a set that includes "1" as the identifier, "Channel 1" as the channel name, a frequency "150 MHz" for the tuning information and "101" as the program number. For reproducing the channel, the reproduction unit 1202*b* passes the received channel identifier to the service manager as it is.

Also, when the user presses down the up cursor 1101 and the down cursor 1102 during reproduction, the reproduction unit 1202*b* receives the pressed notification via the CPU 514 from the input unit 513 and changes the channel being reproduced. At first, the reproduction unit 1202*b* memorizes, in the primary storage unit 511, an identifier of the channel currently being reproduced. FIG. 15 (1), FIG. 15 (1) and FIG. 15 (3) are examples of identifiers of channels stored in the primary storage unit 511. FIG. 15 (1) shows an identifier "3" is memorized, and with reference to FIG. 14, it shows that a channel of a channel name called "TV 3" is being reproduced. In a situation of FIG. 15 (1), when the user presses down the up cursor 1101, the reproduction unit 1202*b* refers to the channel information of FIG. 14 and passes an identifier "2" of a channel name "Channel 2" to the service manager for switching the channel to reproduce a channel name called "Channel 2", which is a previous channel in the chart. At the same time, the channel identifier "2" memorized in the primary storage unit 511 is rewritten. FIG. 15 (2) shows a situation that the channel identifier is rewritten. Also, in a state of FIG. 15 (1), when the user presses down the down cursor 1102, the reproduction unit 1202*b* refers to channel information in FIG. 14, and passes an identifier "4" of a channel name called "TV Japan" to the service manage for switching the channel to reproduce the channel name called "TV Japan", which is a next channel in the chart. At the same time, the channel identifier "4" memorized in the primary storage unit 511 is rewritten. FIG. 15 (3) shows a state when the channel identifier is rewritten.

Java VM 1203 is a Java virtual machine that consecutively analyzes and executes a program described in a Java™ language. The program described in the Java language is compiled into intermediate codes called as byte codes, which are not depended on hardware. The Java virtual machine is an interpreter that executes these byte codes. Also, a part of the Java virtual machine translates the byte codes into an execution format, which is comprehensive to the CPU 514, and passes it to the CPU 514, which executes it. Java VM 1203 is started when the kernel 1201*a* specifies the Java program to be executed. In the present embodiment, the kernel 1201*a* specifies the service manager 1204 as a Java program to be executed. Details of the Java language are described in many books such as a book called "Java Language Specification (ISBN 0-201-63451-1)". Its details are omitted here. Also, detailed actions taken by Java VM itself are described in many books such as a book called "Java Virtual Machine Specification (ISBN 0-201-63451-X). Its details are omitted here.

The service manager 1204 is a Java program written in the Java language, and consecutively executed by the Java VM 1203. It is possible for the service manager 1204 to call up or to be called by other subprograms that are not described in the Java language, via JNI (Java Native Interface). JNI is also described in many books such as a book called "Java Native Interface". Its details are omitted here.

The service manager 1204 receives a channel identifier from the reproduction unit 1202*b* via the JNI.

The service manager 1204 at first passes the channel identifier to a tuner 1205*c* located in the Java library 1205 and requests for tuning. The tuner 1205*c* refers to channel information memorized in the secondary storage unit 510 and acquires tuning information. Now, when the service manager 1204 passes a channel identifier "2" to the tuner 1205*c*, the tuner 1205*c* refers to a line 1412 in FIG. 14, and acquires corresponding tuning information "156 MHz". The tuner 1205*c* passes the tuning information to the QAM demodulation unit 501 via the library 1201*b* of the OS 1201. According to the provided tuning information, the QAM demodulation unit 501 demodulates a signal sent from the head end 101, and passes it to the POD 504.

Next, the service manager 1204 requests descrambling to CA 1205*d* in the Java library 1205. The CA 1205*d* provides information necessary for descramble to the POD 504 via the library 1201*b* of OS 1201. Based on the information provided, the POD 504 descrambles the signal provided from the QAM demodulation unit 501 and passes it to the TS decoder 505.

Next, the service manager 1204 provides an identifier of the channel to JMF 1205*a* in the Java library 1205, and requests reproduction of video and audio.

Figure 16:
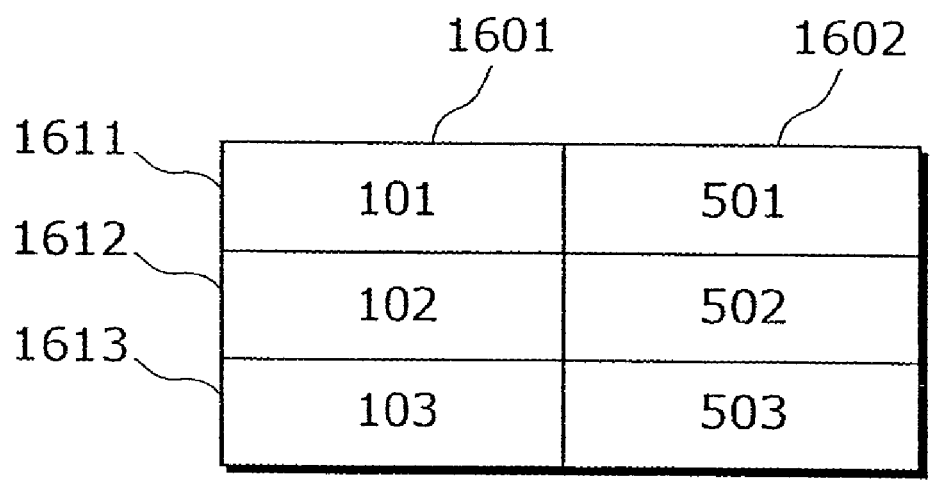
FIG. 16 is a pattern diagram that shows content of PAT stipulated by an MPEG 2 standard according to the present invention.
Figure 17:
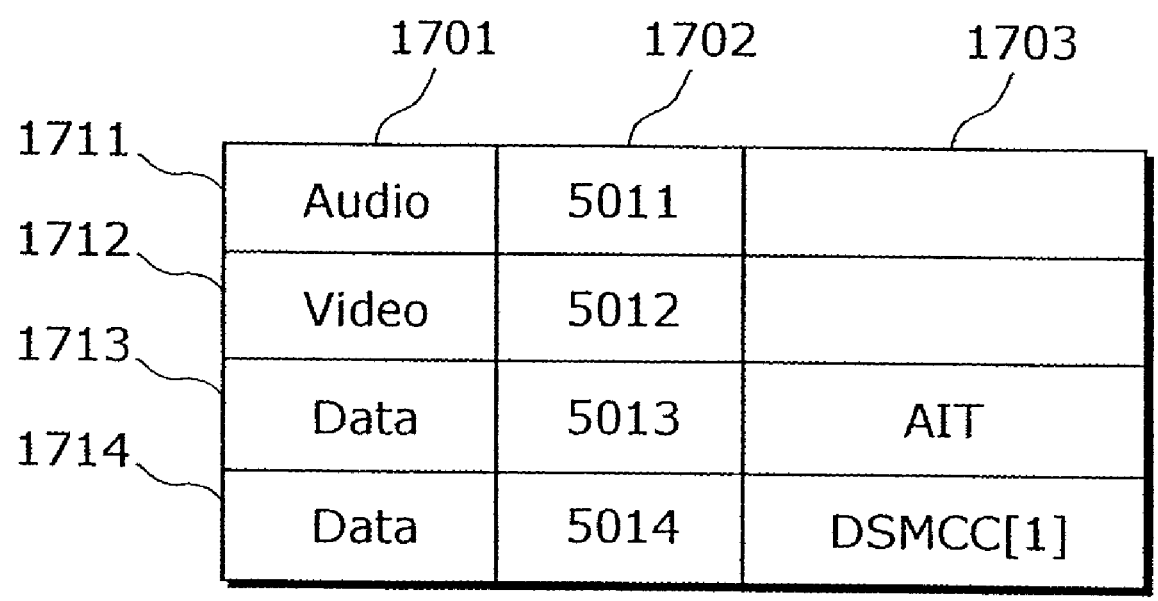
FIG. 17 is a pattern diagram that shows content of PMT stipulated by the MPEG 2 standard according to the present invention.

At first, the JMF 1205*a* acquires a packet ID from PAT and PMT for specifying the video and the audio to be reproduced. PAT and PMT are tables describing program structure in the MPEG2 transport stream, which is stipulated in the MPEG2 standards. They are embedded in the payload of the packet included in the MPEG2 transport stream, and sent with the audio and the video. Please see the standard manual for its details. Only the outline is explained here. PAT is an acronym of Program Association Table, stored in the packet of the packet ID "0" and sent. To acquire PAT, the JMF 1205*a* designates the packet ID "0" and the CPU 514 to the TS decoder 505 via the library 1201*b* of OS 1201. The JMF 1205*a* collects packets of PAT by having the TS decoder 505 execute a filtering process with the packet ID "0" and pass it to the CPU 514. FIG. 16 is a table describing a typical example of PAT information collected. A column 1601 is a program number. A column 1602 is a packet ID. The packet ID in the column 1602 is used to acquire PMT. Lines 1611 to 1613 are a set of a program number of the channel and its corresponding packet ID. Three channels are defined here in this table. A set of a program number "101" and a packet ID "501" is defined in a line 1611. Suppose the channel identifier provided to the JMF 1205*a* is "2", the JMF 1205*a* acquires "102" as its corresponding program number with reference to a line 1412 in FIG. 14, and then acquires a packet ID "502" corresponding to the program number "102" with reference to the line 1612 in the PAT described in FIG. 14. The PMT is an abbreviation of Program Map Table, which is stored in the packet of the packet ID stipulated by the PAT and sent. To acquire the PMT, the JMF 1205*a* designates the packet ID and the CPU 514 to the TS decoder 505 via the library 1201*b* of OS 1201. Suppose the packet ID designated here is "502". The JMF 1205*a* collects packets of PMT by having the TS decoder 505 execute a filtering process with the packet ID "502" and pass it to the CPU 514. FIG. 17 is a table describing a typical example of PMT information collected. A column 1701 is a stream type, and a column 1702 is a packet ID. In a packet of the packet ID designated by the column 1702, information designated by the stream type is stored in a payload and sent. A column 1703 is supplemental information. Columns 1711 to 1714 are a set of a packet ID called as an elementary stream and a type of information being sent. The column 1711 is a set of a stream type "audio" and a packet ID "5011", which shows that audio is stored in a payload of the packet ID "5011". The JMF 1205*a* acquires packet IDs of video and audio reproduced from the PMT. With reference to FIG. 17, the JMF 1205*a* acquires a packet ID "5011" for audio from the line 1711, and a packet ID "5012" for video from the line 1712.

Next, the JMF 1205*a* provides a set of the acquired audio packet ID and an audio decoder 506 as its output destination and the acquired video packet ID and a video decoder 508 as its output destination to the TS decoder 505 via the library 1201*b* of the OS 1201. The TS decoder 505 executes a filtering process based on the provided packet IDs and their output destinations. Here, the packet of the packet ID "5011" is provided to the audio decoder 506, and the packet of the packet ID "5012" is provided to the video decoder 508. The audio decoder 506 executes digital-analogue conversion for the packet provided, and reproduces the audio via a speaker 507. The video decoder 508 decodes the video data, which is embedded in the packet of the MPEG2 transport stream provided from the TS decoder 505, into a video buffer 517.

According to an enlargement and reduction command directed from the CPU 514, the video enlargement and reduction unit 520 enlarges or reduces the data stored in the video buffer 517 and passes it to the composing unit 523.

According to the Z order directed from the CPU 514, the composing unit 523 superposes the data provided from the video enlargement and reduction unit 520, the data provided from the still enlargement and reduction unit 521, and the data provided from the OSD enlargement and reduction unit 522, and outputs it to the display 509.

Finally, the service manager 1204 provides a channel identifier to the AM 1205*b* located in the Java library 1205, and requests data broadcasting reproduction. The data broadcasting reproduction here means to extract a Java program contained in the MPEG2 transport stream and to have the JavaVM 1203 execute the program. Regarding a method to embed a Java program into the MPEG2 transport stream, a method called as DSMCC described in an MPEG standard document ISO/IEC 13818-6 is used. Its detailed explanation for DSMCC is omitted here. The DSMCC method stipulates a method for encoding a file system, which is made up of a directory and a file used in a computer, into a packet of the MPEG2 transport stream. Also, the information of the Java program executed in a style called AIT is embedded into the packet of the MPEG2 transport stream and sent. The AIT is an abbreviation of Application Information Table, which is defined in Chapter 10 of DVB-MHP standard (formally, ETSI TS 101 812 DVB-MHP specifications V1.0.2).

The AM 1205*b* at first acquires the PAT and the PMT in the same way as the JMF 1205*a* for acquiring the AIT, and then acquires the packet ID of the packet where the AIT is stored. Suppose an identifier of the provided channel is "2" now, and the PAT in FIG. 16 and the PMT in FIG. 17 are sent, it acquires the PMT in FIG. 17 in the same procedures as the one for the JMF 1205*a*. The AM 1205*b* extracts a packet ID, which has "data" as its stream type and "AIT" as its supplemental information, from the elementary stream. With reference to FIG. 17, the AM 1205*b* acquires the packet ID "5013" since the elementary stream in the line 1713 is applicable.

Figure 18:
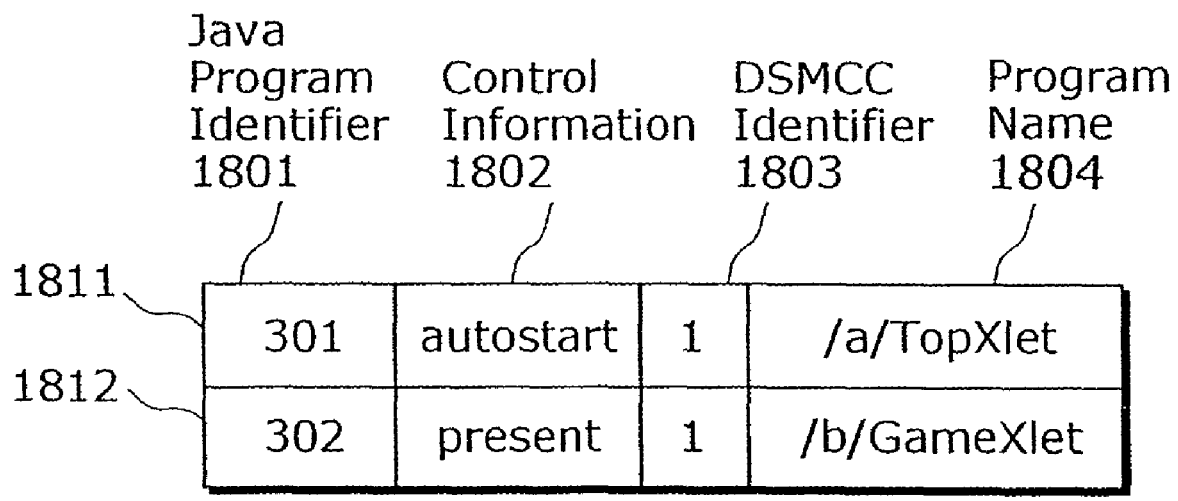
FIG. 18 is a pattern diagram that shows content of AIT stipulated by a DVB-MHP standard according to the present invention.

The AM 1205*b* provides the packet ID of the AIT and the CPU 514 as its output destination to the TS decoder 505 via the library 1201*b* of the OS 1201. A filtering process is executed with the TS decoder 505 and the provided packet ID, and a processed outcome is passed to the CPU 514. As a result of this, the AM 1205*b* can collect the packet of the AIT. FIG. 18 is a table, which describes a typical example of the AIT information collected. A column 1801 is an identifier of the Java program. A column 1802 is control information of the Java program. There are "autostart", "present", "kill", etc. as the control information. The "autostart" means that a terminal apparatus 500 automatically and immediately executes this program, the "present" means that the terminal apparatus 500 does not automatically execute the program, and the "kill" means that the terminal apparatus 500 stops the program. A column 1803 is a DSMCC identifier for extraction a packet ID containing the Java program in a DSMCC method. A column 1804 is a program name of the Java program. The lines 1811 and 1812 are a set of the Java program information. The Java program defined in the line 1811 is a set of an identifier "301", control information "autostart", a DSMCC identifier "1", and a program name "a/TopXlet". The Java program defined in the line 1812 is a set of an identifier "302", control information "present", a DSMCC identifier "1", and a program name "b/GameXlet". These Java programs here contain the same DSMCC identifier. It means that two Java programs are contained in a file system that is encoded in one DSMCC method. Although only four types of information are stipulated for the Java program here, there will be more information defined in practice. Please see DVB-MHP standards for details.

The AM 1205*b* finds out the Java program of "autostart" within the AIT, and extracts its corresponding DSMCC identifier and Java program name. With reference to FIG. 18, the AM 1205b extracts the Java program in the line 1811, and acquires the DSMCC identifier "1" and the Java program name "a/TopXlet".

Next, the AM 1205b acquires the packet ID of the packet, which stores the Java program in the DSMCC method, from the PMT using the DSMCC identifier acquired from the AIT, To be more specific, the AM 1205b acquires the packet ID of the elementary stream, which has "data" as its stream type and a matching DSMCC identifier in the supplemental information.

Suppose that the DSMCC identifier is now "1", and the PMT is just as described in FIG. 17, the elementary stream in a line 1714 is matched with the condition so that the packet ID "5014" is extracted.

The AM 1205b designates a packet ID of the packet, where data is embedded into the TD decoder 505 in the DSMCC method, and the CPU 514 as its output destination via the library 1201b of the OS 1201. The packet ID "5014" is provided here. A filtering process is executed with the TS decoder 505 and the provided packet ID and its processed outcome is passed to the CPU 514. As a result of this, the AM 1205b can collect necessary packets. The AM 1205b restores a file system according to the DSMCC method from the collected packets, and stores it in the primary storage unit 511. Hereinafter, actions to take out the data such as file systems from the packet in the MPEG2 transport stream and to store it in a memorizing mean such as the primary storage unit 511 are referred to as "download".

Figure 19:
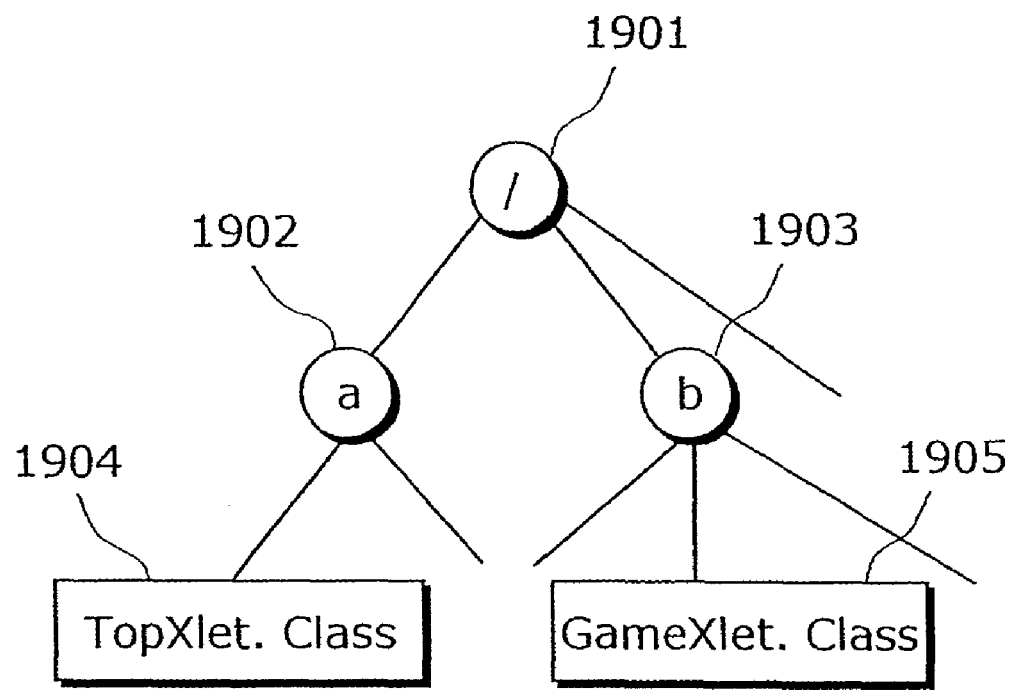
FIG. 19 is a pattern diagram that shows a file system transmitted in a DSMCC method according to the present invention.

FIG. 19 is an example of a file system downloaded. In the figure, a circle indicates a directory, a square indicates a file, 1901 is a root directory, 1902 is a directory "a", 1903 is a directory "b", 1904 is a file "TopXlet.class", and 1905 is a file "GameXlet.class".

Next, the AM 1205b passes the Java program executed from the file system downloaded to the primary storage unit 511 to the JavaVM 1203. Suppose the Java program name executed now is "a/TopXlet", a file "a/TopXlet.class" where ".class" is added to an end of the Java program name is the file to be executed. "/" is a delimiter of a directory and/or a file name, which is the Java program that should be executed by the file 1904 with reference to FIG. 19. Next, the AM 1205b provides the file 1904 to the Java VM 1203.

The Java VM 1203 executes the provided Java program.

Once the service manager 1204 receives an identifier of another channel, it stops execution of the Java program and video and audio, which are being reproduced through each library contained in the Java library 1205, and via each library contained in the same Java library 1205, conducts the Java program and reproduced video and audio based on the newly received channel identifier.

The Java library 1205 is a set of a plural number of Java libraries stored in a ROM 512. In the present embodiment, the Java library 1205 here contains JMF 1205a, AM 1205b, Tuner 1205c, CA 1205d, POD Lib 1205e, a resolution switching unit 1205f, AWT 1205g, STL 1205h, etc.

The POD Lib 1205e provides functions to acquire information from the POD 504 and to control the POD 504 via the library 1201b and the CPU 514.

The resolution switching unit 1205f provides a function to control the video decoder 508, the video enlargement and reduction unit 520, the still decoder 515, the still enlargement and reduction unit 521, the OSD enlargement and reduction unit 516, and the OSD enlargement and reduction unit 522 through the CPU 514. Details are described later.

The AWT 1205g accepts a rendering instruction from the Java program. Based on the accepted instruction, the AWT 1205g draws characters and graphics in the OSD buffer by sending necessary information to the OSD controlling unit 516. As a specific example for a rendering process, there is a process for rendering a line or rendering a square, which is a publicly known technology realized in a class and interface specifications stipulated in a Java.awt package. Therefore, its detailed explanation is omitted here.

The STL 1205h accepts MPEG-I frame data displayed from the Java program and its display position. The STL 1205h passes the accepted MPEG-I frame data and its display position to the still decoder 515. The still decoder 515 decodes the MPEG-I frame data to the provided display position, and stores it into the still buffer 518. By doing so, the Java program can draw pictures in the still buffer.

Figure 24:
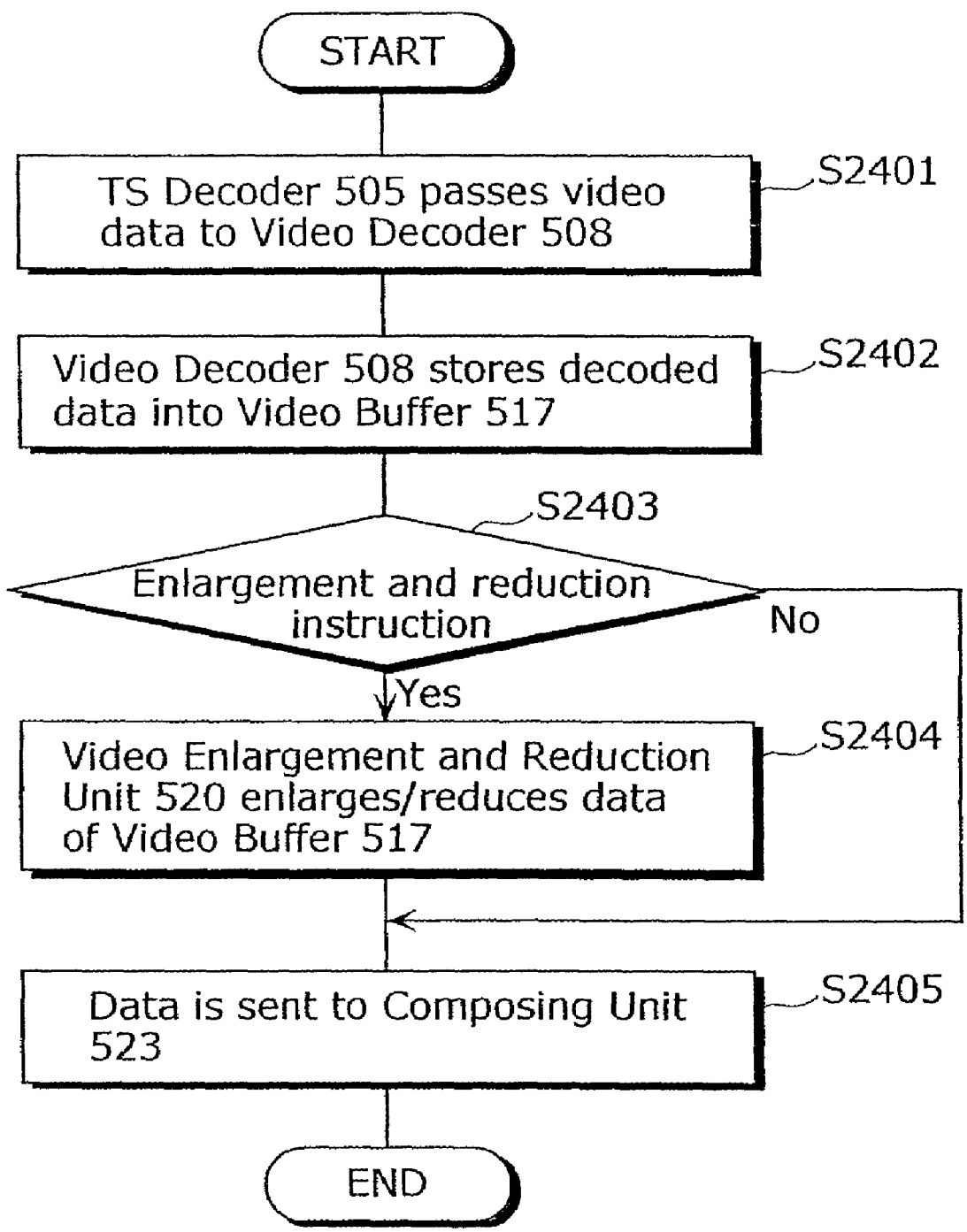
FIG. 24 is an example of a flowchart related to a display process for a video according to the present invention.

FIG. 24 is a flowchart related to a video display process. The TS decoder 505 transfers video data to the video decoder 508 (S2401). The video decoder 508 decodes the transferred video data, and stores its outcome into the video buffer 517 (S2402). The video decoder 508 decides whether there is an instruction of enlargement and reduction regarding the video display from the CPU 514 or not (S2403). If there is the instruction of enlargement and reduction, the video enlargement and reduction unit 520 executes the enlargement and reduction process to the data being stored in the video buffer 517 (S2404), and transfers it to the composing unit 523 (S2405). If there is no instruction of enlargement and reduction, the video enlargement and reduction unit 520 transfers the data being stored in the video buffer 517 to the composing unit 523 (S2405).

Figure 25:
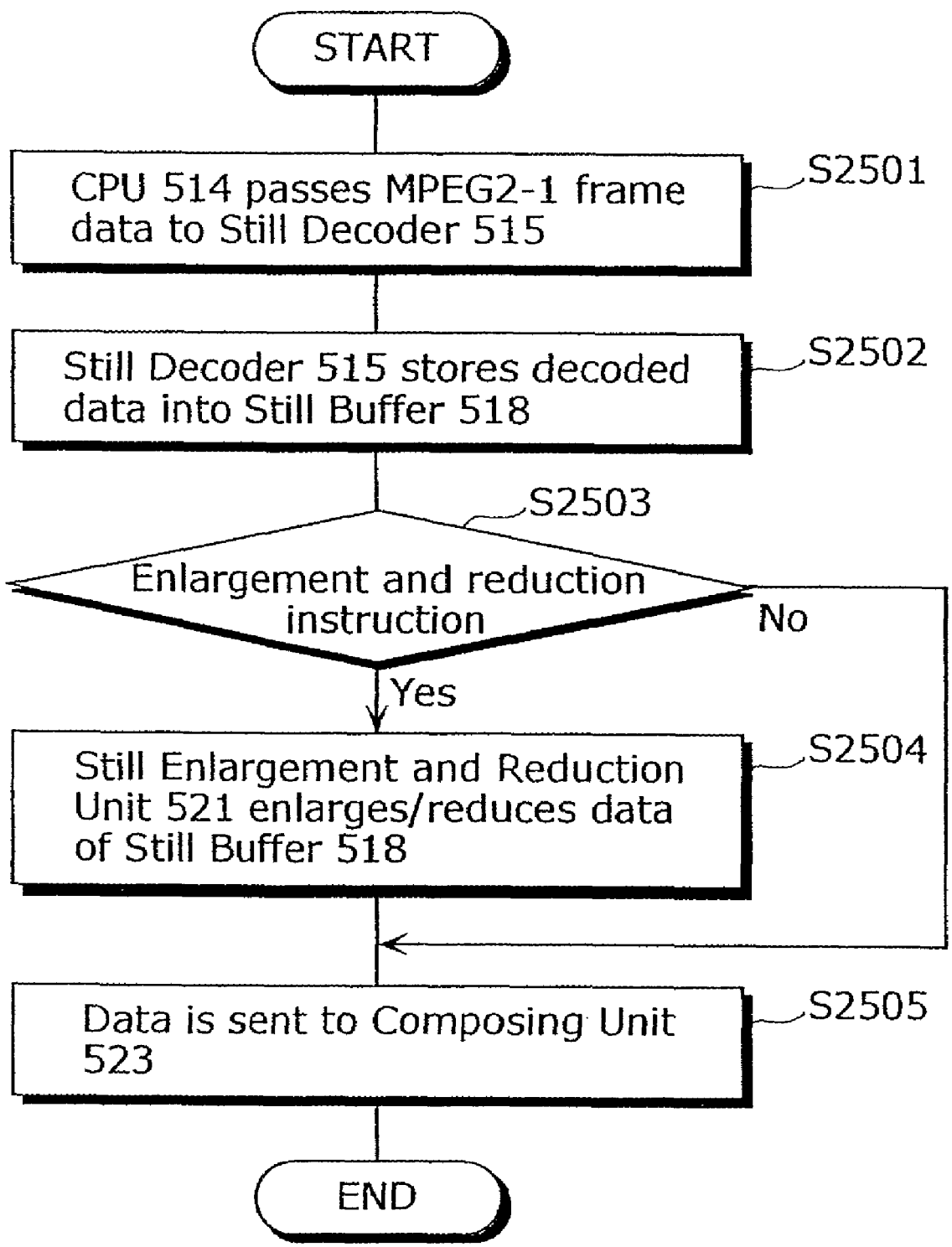
FIG. 25 is an example of a flowchart related to a display process for a still according to the present invention.

FIG. 25 is a flowchart related to a still display process. MPEG2-I frame data is provided from the CPU 514 to the still decoder 515 (S2501). The still decoder 515 decodes the provided MPEG2-I frame data, and stores the outcome into the still buffer 518 (S2502). The still decoder 515 decides whether there is an instruction of enlargement and reduction regarding the still display from the CPU 514 (S2503). When there is the instruction of enlargement and reduction, the still enlargement and reduction unit 521 executes the enlargement and reduction process to the data being stored in the still buffer 518 (S2504), and it transfers it to the composing unit 523 (S2505). When there is no instruction of enlargement and reduction, the still enlargement and reduction unit 521 transfers the data being stored in the still buffer 518 to the composing unit 523.

Figure 26:
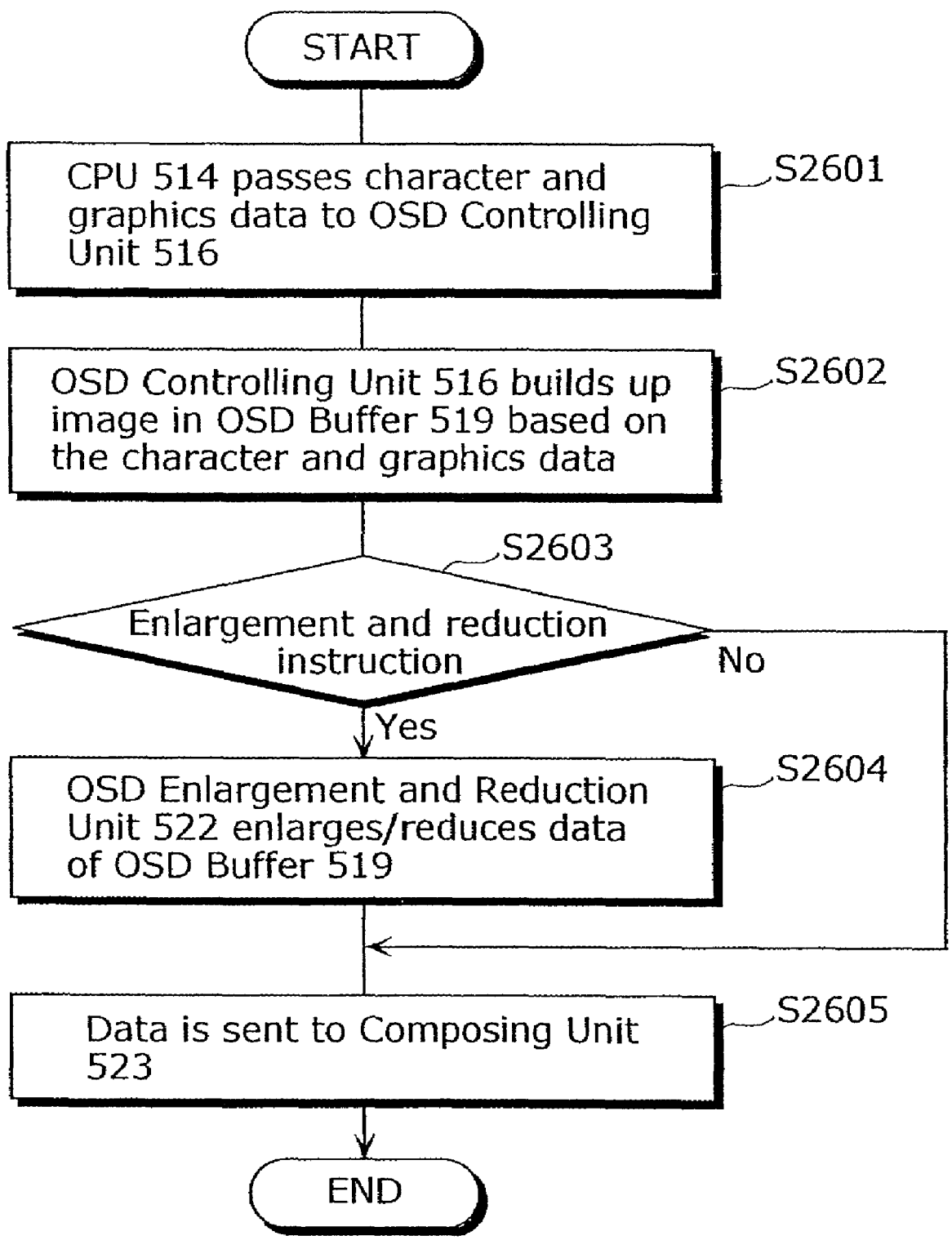
FIG. 26 is an example of a flowchart related to a display process for an OSD according to the present invention.

FIG. 26 is a flowchart related to the display process of OSD. Character and graphics data is provided from the CPU 514 to the OSD controlling unit 516 (S2601). The OSD controlling unit 516 builds up the video in the OSD buffer 519 based on the provided characters and graphics data (S2602). The OSD controlling unit 516 decides whether there is an instruction of enlargement and reduction related to the display of OSD from the CPU 514 (S2603). If there is the instruction of enlargement and reduction, the OSD enlargement and reduction unit 522 executes the enlargement and reduction process to the data being stored in the OSD buffer 519 (S2604), and transfers it to the composing unit 523 (S2605). If there is no instruction of enlargement and reduction, the OSD enlargement and reduction unit 522 transfers the data being stored in the OSD buffer 519 to the composing unit 523.

Here, the video of enlargement and reduction is explained with reference of an example. Like 2801 of FIG. 28, when data of 720 pixels in width and 480 pixels in height is enlarged in size, i.e. enlarged to 960 pixels in width and 540 pixels in height, it becomes just as shown in 2802 of FIG. 28.

Figures 22, 23:
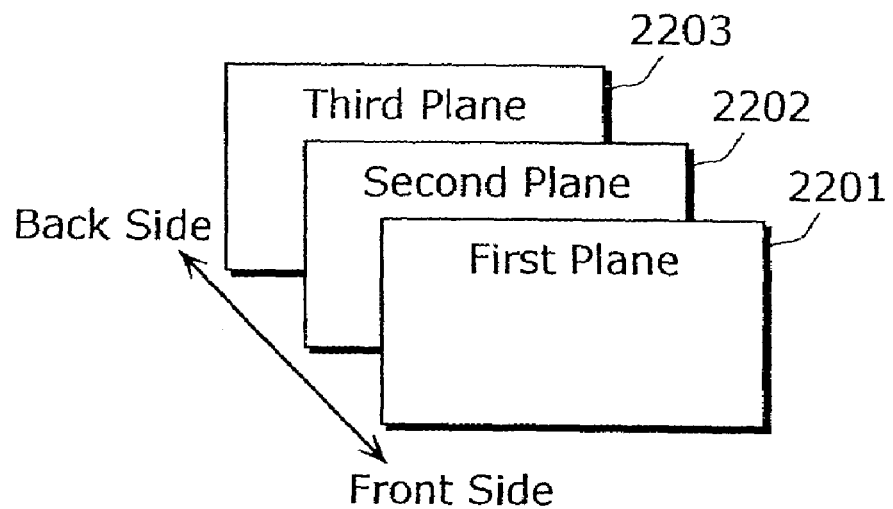
FIG. 22 is an example of a Z order of planes according to the present invention.
FIG. 23 is a combination example of the Z order of planes according to the present invention.
Figure 27:
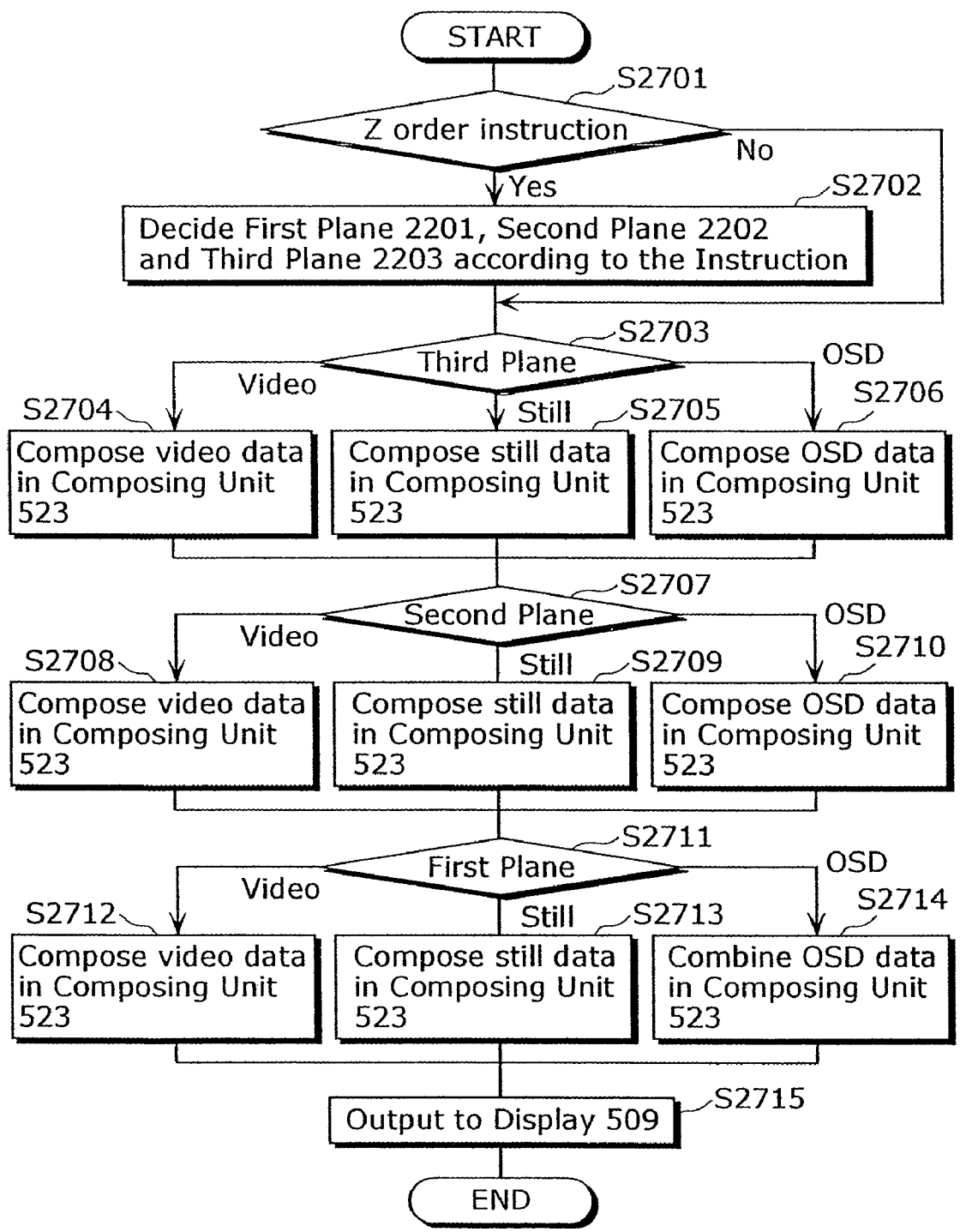
FIG. 27 is an example of a flowchart related to a composing process for a video, a still and an OSD according to the present invention.

FIG. 27 is a flowchart related to a composing process for a video generated in the flowchart shown in FIG. 24, a still generated in the flowchart shown in FIG. 25 and an OSD generated in the flowchart shown in FIG. 26. The composing unit 523 decides whether there is a change instruction of Z order from the CPU 514 (S2701) or not. If there is the change instruction, it decides which of planes, a video plane, a still plane or an OSD plane is applicable to a first plane 2201, a second plane 2202 and a third plane 2203 according to the change instruction (S2702). Here, the video plane means to be a video generated through the flowchart shown in FIG. 24, the still plane means to be a still generated through the flowchart shown in FIG. 25, and the OSD plane means to be an OSD generated through the flowchart shown in FIG. 26. If there is no change instruction, the previous Z order is followed. A combination of the Z order is one of fix pattern combinations as indicated in FIG. 23. Next, the composing unit 523 decides which of the planes, the video plane, the still plane or the OSD plane is applicable to the plane relevant to the third plane, which is located at the furthest back (S2703). When the plane is the video plane, video data is composed in the composing unit 523 (S2704). When the plane is the still plane, still data is composed in the composing unit 523 (S2705). When the plane is the OSD plane, OSD data is composed in the composing unit 523 (S2706). For example, for a case that the video of composed data is 2901 of FIG. 29, the video after the composing process is just as 3001 of FIG. 30. Next, the composing unit 523 decides which of the planes, the video plane, the still plane or the OSD plane is applicable to the plane relevant to the second plane (S2707). When the plane is the video plane, video data is composed in the composing unit 523 (S2708). When the plane is the still plane, still data is composed in the composing unit 523 (S2709). When the plane is the OSD plane, OSD data is composed in the composing unit 523 (S2710). For example, when the video of the composed data is 2902 of FIG. 29, the video after the composing process is just as shown in 3002 of FIG. 30.

Next, the composing unit 523 decides which of the planes, the video plane, the still plane or the OSD plane is applicable to the plane relevant to the first buffer, which is located at the foreground (S2711). When the plane is the video plane, video data is composed in the composing unit 523 (S2712). When the plane is the still plane, still data is composed in the composing unit 523 (S2713). When the plane is the OSD plane, OSD data is composed in the composing unit 523 (S2714). For example, for a case that the video of composed data is 2903 of FIG. 29, the video after the composing process is just as shown in 3003 of FIG. 30. Finally, a result of the composing process is output and displayed on the display 509 (S2715).

The following explains downloading and saving the Java program as well as display actions of the Java program.

The service manager 1204 conducts interactive communications with the head end 101 through the POD Lib 1205e contained in the Java library 1205. This interactive communication is realized by using the QPSK demodulation unit 502 and the QPSK modulation unit 503 via the library 1201b and the POD 504 of the OS 1201.

The service manager 1204 receives Java program information, which should be saved by the terminal apparatus 500 in the secondary storage unit 510, from the head end 101 by using this communication. This information called as XAIT information. The XAIT information is sent in a discretional form between the head end 101 and the POD 504. Whatever the sending form is chosen, the present invention is executable as long as the information necessary for the XAIT is contained.

FIG. 20 is a chart describing a typical example of the XAIT information obtained from the head end 101. A column 2001 is a Java program identifier. A column 2002 is control information of the Java program. There is "autoselect", "present" and so on as the control information, and "autoselect" means to execute this program automatically when the terminal apparatus 500 is powered on, and "present" means not to execute this program. A column 2003 is a DSMCC identifier for extracting a packet ID containing the Java program in the DSMCC method. A column 2004 is a program name of the Java program. A column 2005 is a priority of the Java program. Lines 2011 and 2012 are a set of Java program information. The Java program defined in the line 2011 is a set of the identifier "701", the control information "autoselect", the DSMCC identifier "1", the program name "a/Banner1Xlet". Here, there are five types of information stipulated for the Java program. However, the present invention is executable even if more information is defined.

Figure 21:
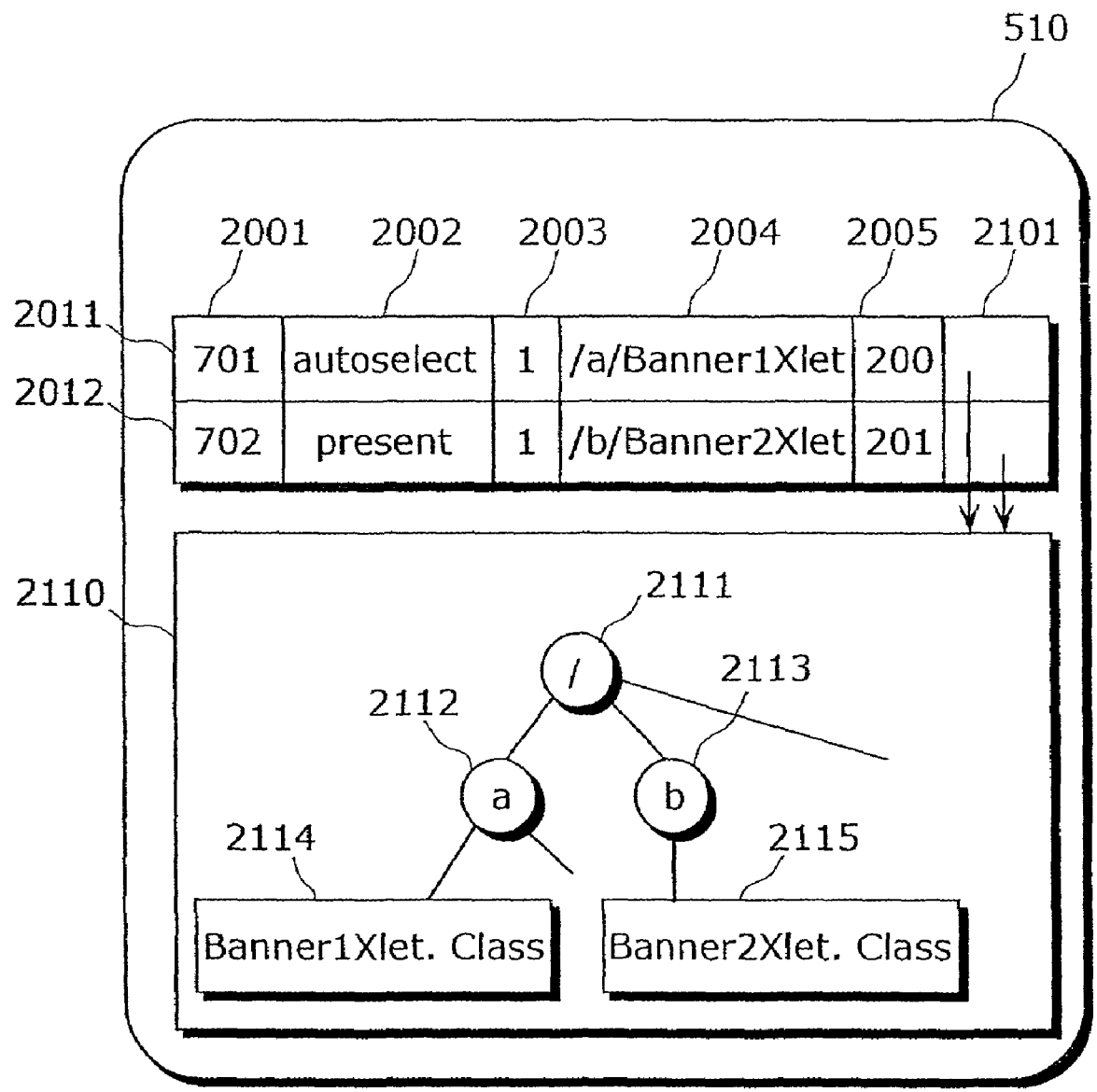
FIG. 21 is an example of information stored in the secondary storage unit 510 according to the present invention.

When the service manager 1204 receives the XAIT information, it saves a file system in the primary storage unit 511 from the MPEG2 transport stream in the same procedure as the procedure to download the Java program from the AIT information. And then, the file system saved is copied to the secondary storage unit 510. However, it is also possible to download the file system directly to the secondary storage unit 510 without having the process done through the primary storage unit 511. Next, the service manager 1204 saves XAIT information in the secondary storage unit 510 by linking it to a storage location of the downloaded file system. FIG. 21 shows an example of how the XAIT information and the downloaded file system are linked and saved in the secondary storage unit 510. Explanation for elements in FIG. 21 having the same number as those elements in FIG. 20 is omitted here. A column 2101 stores a saving location of the corresponding file system downloaded. In the diagram, the saving location is indicated with a column. 2110 is the downloaded file system, which internally holds a top directory 2111, a directory "a" 2112, a directory "b" 2113, a file "Banner1Xlet.class" 2114 and a file "Banner2Xlet.class" 2115.

Here, the XAIT information is saved after the Java program is saved. However, the XAIT information may be saved before the Java program is saved.

After the terminal 500 is turned on, the OS 1201 designates the service manager 1204 to the JavaVM 1203. After the JavaVM 1203 activates the service manager 1204, the service manager 1204 at first refers to the XAIT information saved in the secondary storage unit 510. Here, the service manager 1204 refers to the control information of each Java program, provides the program of "autoselect" to the JavaVM 1203 and activates it. With reference to FIG. 21, the Java program "Banner1Xlet" defined in the line 2011 is activated.

Once the Java program "Banner1Xlet" is activated, the Java program "Banner1Xlet" designates to display an OSD to the CPU 514 when the Java program "Banner1Xlet" displays characters and graphics. The CPU 514 provides the characters and the graphics to the OSD controlling unit 516, and the OSD display process is executed, and finally an OSD plane is composed with a video plane and a still plane and displayed on the display 509.

Figure 31:
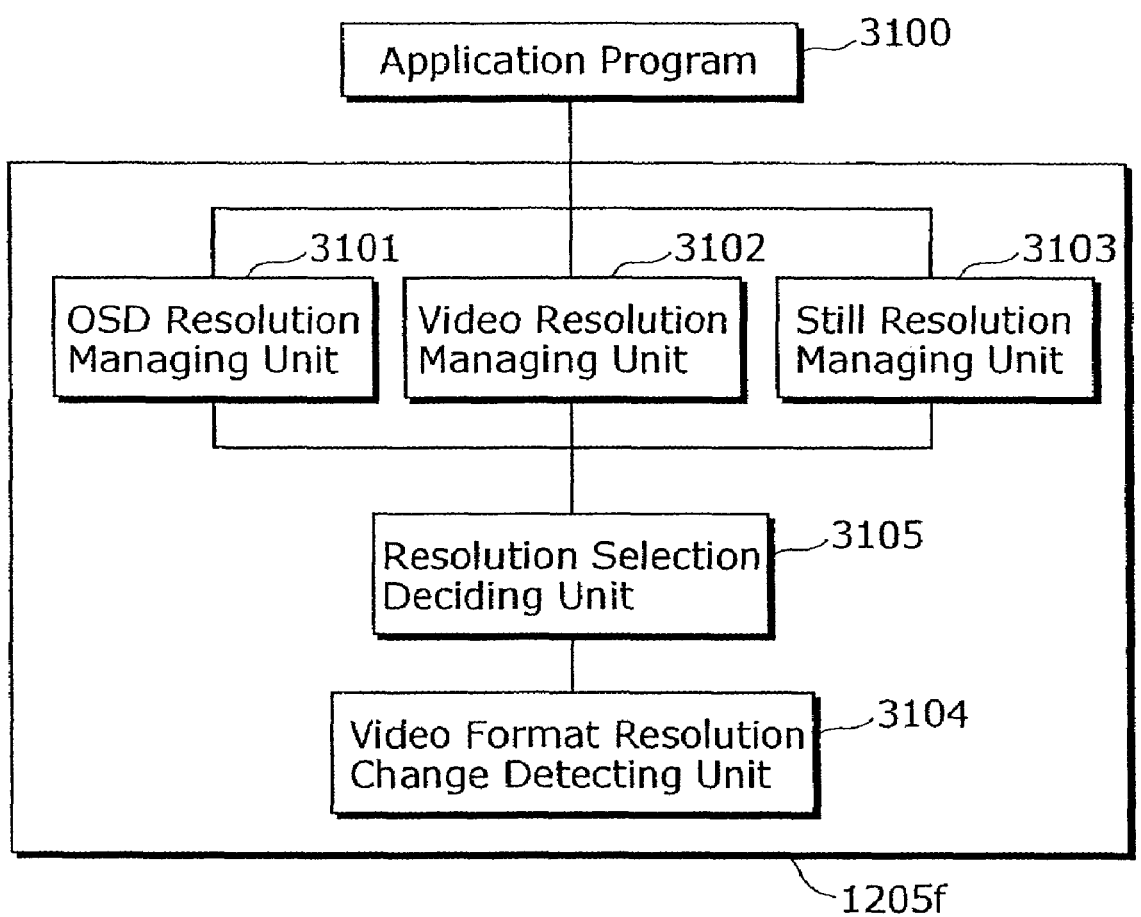
FIG. 31 is an example of a configuration diagram of a resolution switching unit 1205*f* according to the present invention.

Next, the following describes a video resolution switching function, which is the main function of the present invention. FIG. 31 is a configuration diagram of the video resolution switching function.

An application program 3100 is, for example, an application such as a Java program called "Banner1Xlet".

A resolution switching unit 1205f contains an OSD resolution managing unit 3101, a video resolution managing unit 3102, a still resolution managing unit 3103, a video format resolution change detecting unit 3104 and a resolution selection deciding unit 3105, and serves as a video resolution switching function.

The OSD resolution managing unit 3101 manages resolution of an OSD plane. The OSD resolution managing unit 3101 has a function to accept a change request of the current OSD plane resolution from the application program 3100, and a function to notify a change in the resolution of the OSD plane to the application program 3100. When the change request of the OSD plane resolution is accepted, the OSD resolution managing unit 3101 notifies it to the resolution selection deciding unit 3105.

The video resolution managing unit 3102 manages resolution of a video plane. The video resolution managing unit 3102 has a function to accept a change request of the current video plane resolution from the application program 3100, and a function to notify a change in the resolution of the video plane to the application program 3100. When the change request of the video plane resolution is accepted, the video resolution managing unit 3102 notifies it to the resolution selection deciding unit 3105.

The still resolution managing unit 3103 manages resolution of a still plane. The still resolution managing unit 3103 has a function to accept a change request of the current still plane resolution from the application program 3100, and a function to notify a change in the resolution of the still plane to the application program 3100. When the change request of the still plane resolution is accepted, the still resolution managing unit 3103 notifies it to the resolution selecting unit 3105.

When the resolution of the video format received by the video decoder 508 is different from the resolution of the video format previously decoded, the video format resolution change detecting unit 3104 notifies it to the resolution selection deciding unit 3105.

The resolution selection deciding unit 3105 selects resolution of each plane considering a combination of planes that can be displayed on the TV receiver when one of the following cases occurs: a case there is a change request for the current resolution of the OSD plane to the OSD resolution managing unit 3101; a case there is a change request for the current resolution of the video plane to the video resolution managing unit 3102; a case there is a change request for the current resolution of the still plane to the still resolution managing unit 3103; or a case there is a change request of the resolution of the video format from the video format resolution change detecting unit 310. The following explains the combinations that can be displayed. The TV receiver is in three layered structure, i.e. an OSD plane that displays characters and graphics, a video plane that displays videos, and a still plane that displays still images, and there are displayable combinations of these planes. For example, combinations such as those described in FIG. 32 are available. While the TV receiver displays each of the planes in a combination of 1 (3201) indicated in FIG. 32, the video resolution of the video format received by the video decoder 508 may be changed to 960 pixels in width and 540 pixels in height and the screen ratio of that may be changed to 16:9. If that is the case, the resolution of each plane may be changed to a combination 3 (3203) according to the video format. The combinations of each plane indicated in this FIG. 32 are memorized in the secondary storage unit 510, the primary storage unit 511 or the ROM 512. Suppose that the combinations of each plane are now stored in the ROM 512, it means that the resolution selection deciding unit 3105 refers to the ROM 512 when considering the best combination to be displayed, and selects the most optimum combination according to a specific set of rules from the available combinations.

Figure 33:
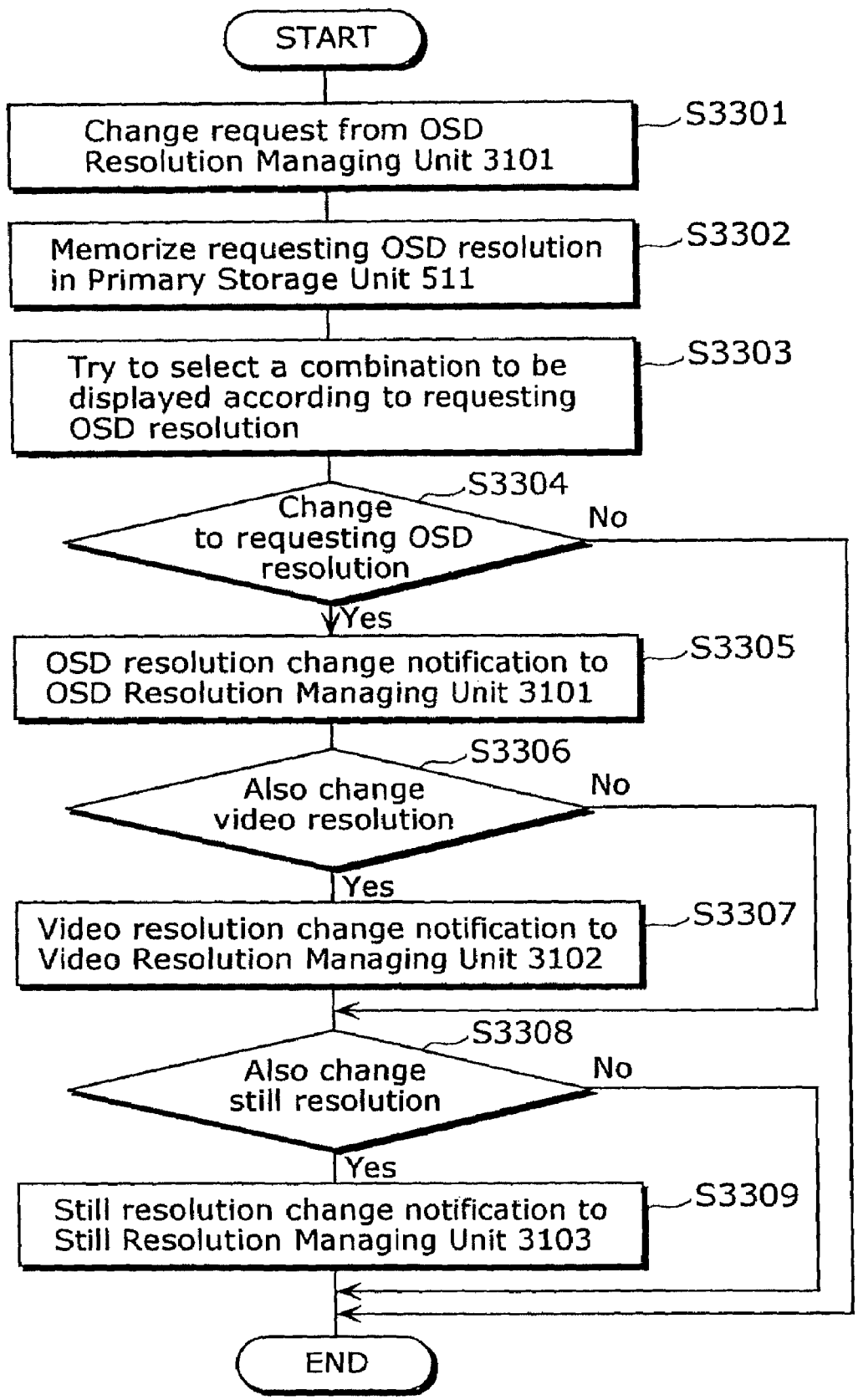
FIG. 33 is an example of a process flowchart of a resolution selection deciding unit 3105 for a case there is a resolution change request of an OSD plane according to the present invention.

FIG. 33 is a flowchart of the resolution selection deciding unit 3105 for a case that there is a resolution change request of the current OSD plane to the OSD resolution managing unit 3101. The OSD resolution managing unit 3101 provides the OSD resolution to the resolution selection deciding unit 3105 and makes the change request (S3301). The resolution selection deciding unit 3105 memorizes the requested OSD resolution in the primary storage unit 511 (S3302). The resolution selection deciding unit 3105 tries to select a combination possible to be displayed according to the requested OSD resolution (S3303). As a result of it, the resolution selection deciding unit 3105 decides whether it can be changed to the requested OSD resolution or not (S3304), and conducts an OSD resolution change notification to the OSD resolution managing unit 3101 if it is changed (S3305). In accordance with this OSD resolution change, the resolution selection deciding unit 3105 also decides whether the video resolution is changed or not (S3306), and conducts a video resolution change notification to the video resolution managing unit 3102 if it is changed (S3307). In accordance with this OSD resolution change, the resolution selection deciding unit 3105 also decides whether the still resolution is changed or not (S3308), and conducts a still resolution change notification to the video resolution managing unit 3103 if it is changed (S3309).

Figure 34:
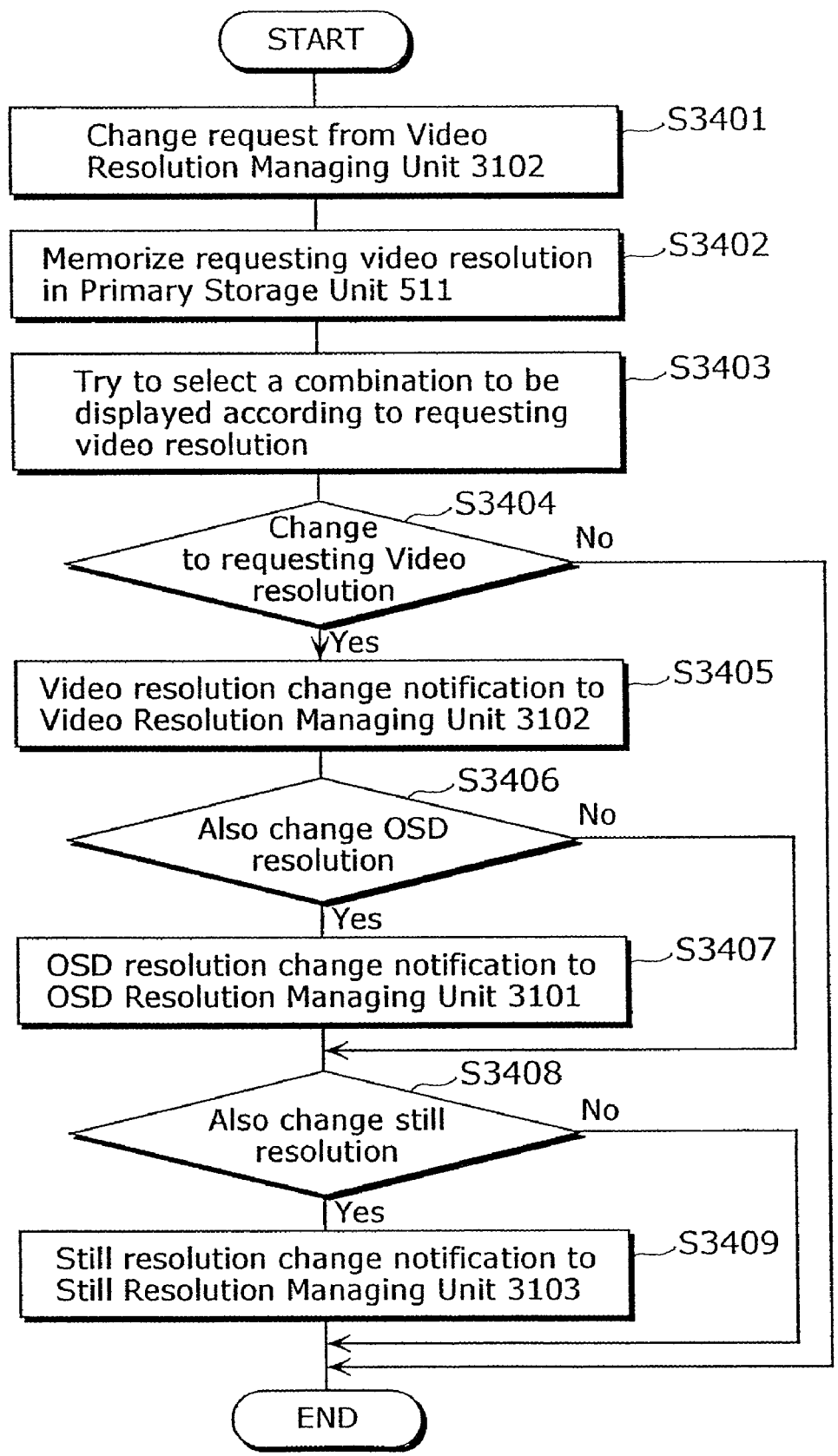
FIG. 34 is an example of a process flowchart of the resolution selection deciding unit 3105 for a case there is a resolution change request of a video plane according to the present invention.

FIG. 34 is a flowchart of the resolution selection deciding unit 3105 for a case there is a resolution change request of the current video plane to the video resolution managing unit 3102. The video resolution managing unit 3102 provides the video resolution to the resolution selection deciding unit 3105 and makes the change request (S3401). The resolution selecting deciding unit 3105 memorizes the requested video resolution in the primary storage unit 511 (S3402). The resolution selecting deciding unit 3105 tries to select a combination possible to be displayed according to the requested video resolution (S3403). As a result, the resolution selecting deciding unit 3105 decides whether it can be changed to the requested video resolution or not (S3404), and conducts a video resolution change notification to the video resolution managing unit 3102 if it is changed (S3405). In accordance with this video resolution change, the resolution selecting deciding unit 3105 also decides whether the OSD resolution is changed or not (S3406), and conducts an OSD resolution change notification to the OSD resolution managing unit 3101 if the resolution is changed (S3407). In accordance with this video resolution change, the resolution selecting deciding unit 3105 also decides whether the still resolution is changed or not (S3408), and conducts a still resolution change notification to the still resolution managing unit 3103 if the resolution is changed (S3409).

Here, when the selected video plane resolution is different from the resolution of the video decoded by the video decoder 508, the video enlargement and reduction unit 520 realizes the selected video plane resolution by enlargement or reduction the video stored in the video buffer 517 to the selected video plane resolution.

Also, displayable combinations of resolutions for a video plane, a still plane and an OSD plane include combinations assuming enlargement and reduction of the video plane, the still plane and the OSD plane. For example, when the combination is "4", i.e. 3204 in FIG. 32, the OSD plane resolution is 960*540, and the video plane and the OSD plane resolutions are respectively 1920*1080. In this case, the composing unit 523 can compose three planes by having the OSD enlargement and reduction unit 522 enlarge characters and graphics rendering stored in the OSD buffer 519 to horizontally and vertically twice as big as its original size. In the way like this, the displayable combinations of resolutions for the video plane, the still plane and the OSD plane contain enlargement and reduction information that stipulates actions of the video enlargement and reduction unit 520, the still enlargement and reduction unit 521 and the OSD enlargement and reduction unit 522. Or, the enlargement and reduction information may be memorized clearly in the secondary storage unit 510, the primary storage unit 511, the ROM 512, etc. by corresponding the information to the displayable combinations of resolutions for the video plane, the still plane, and the OSD plane. The enlargement and reduction information may be specifically defined respectively for each the video enlargement and reduction unit 520, the still enlargement and reduction unit 521 and the OSD enlargement and reduction unit 522. Or, it may be stipulated as common resolution that should be output to the composing unit 523 by the video enlargement and reduction unit 520, the still enlargement and reduction unit 521 and the OSD enlargement and reduction unit 522. Also, by adding a common resolution designating unit that designates this common resolution, the resolution of the video, the OSD and the still, which are output to the composing unit 523, may be easily changed. For the common resolution designating unit here, the resolution may be designated by an application program or designated by the resolution selection deciding unit 3105.

Also, the resolution selection deciding unit 3105 directs enlargement and reduction to the video enlargement and reduction unit 520, the still enlargement and reduction unit 521 and the OSD enlargement and reduction unit 522.

Figure 35:
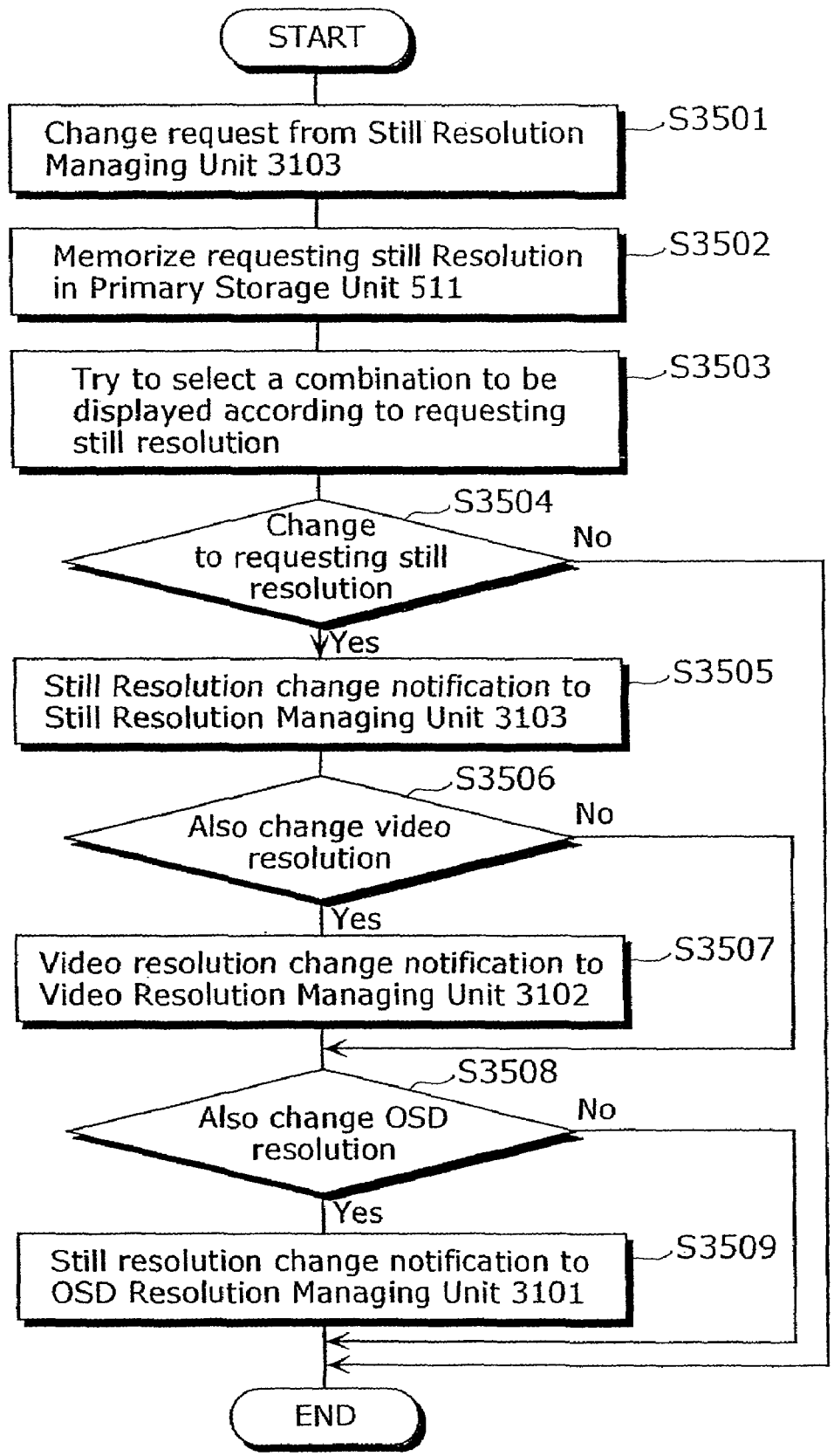
FIG. 35 is an example of a flowchart of the resolution selection deciding unit 3105 for a case there is a resolution change request of a still image plane according to the present invention.

FIG. 35 is a flowchart of the resolution selection deciding unit 3105 for a case there is a change request for the current still plane resolution to the still resolution managing unit 3103. The still resolution managing unit 3103 provides the still resolution to the resolution selection deciding unit 3105 and makes the change request (S3501). The resolution selecting deciding unit 3105 memorizes the requested still resolution in the primary storage unit 511 (S3502). The resolution selecting deciding unit 3105 tries to select a combination that can be displayed according to the requested still resolution (S3503). As a result of it, the resolution selecting deciding unit 3105 decides whether the resolution is changed to the requested still resolution or not (S3504), and conducts a still resolution change notification to the still resolution managing unit 3103 if the resolution is changed (S3505). In accordance with this still resolution change, the resolution selecting deciding unit 3105 also decides whether the video resolution is changed or not (S3506), and conducts a video resolution change notification to the video resolution managing unit 3102 if the resolution is changed (S3507). In accordance with this still resolution change, the resolution selecting deciding unit 3105 also decides whether an OSD resolution is changed or not (S3508), and conducts a still resolution change notification to the OSD resolution managing unit 3101 if the resolution is changed (S3509).

Figure 36:
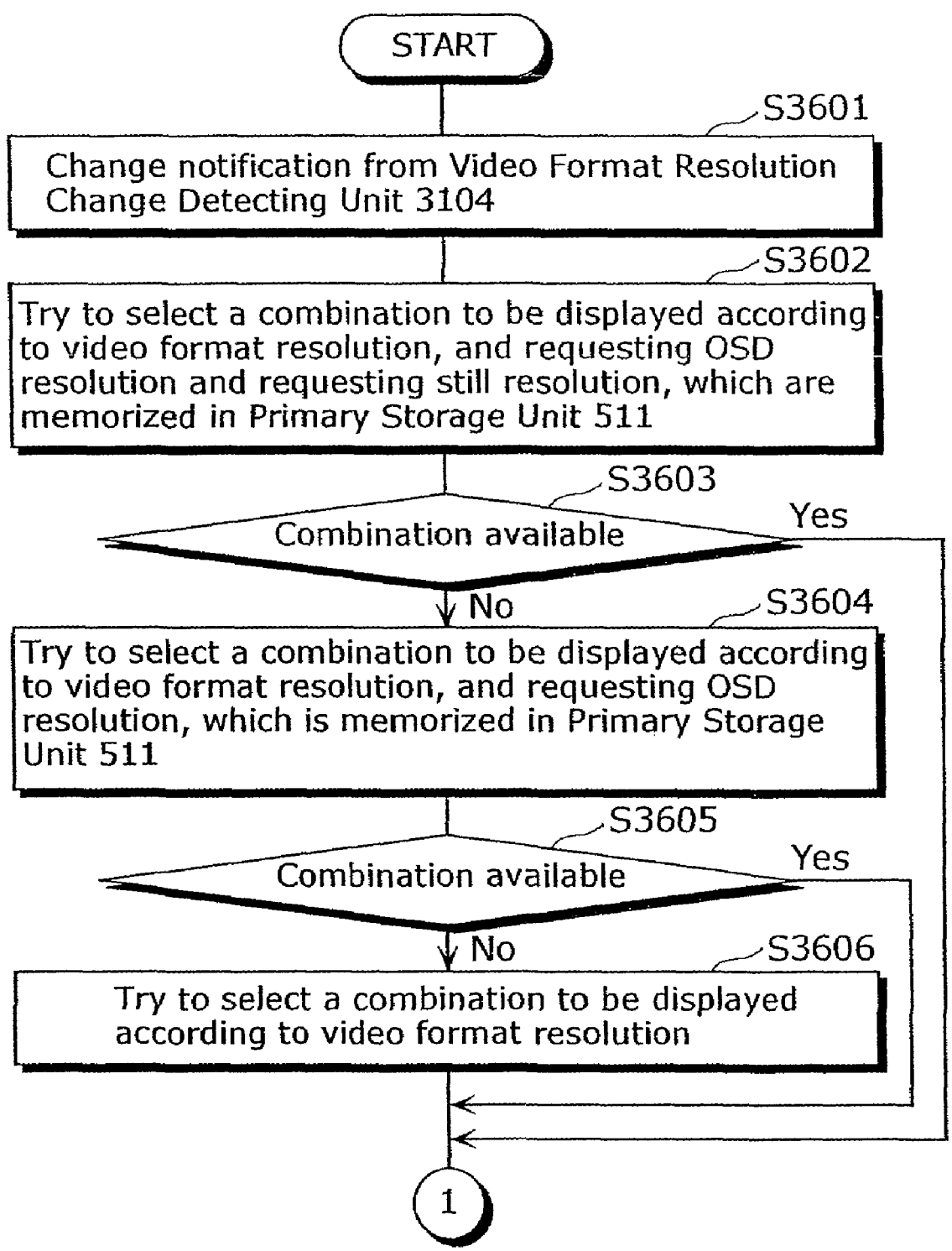
FIG. 36 is an example of a flowchart of the resolution selection deciding unit 3105 for a case resolution is different from the one of a video format that has been previously decoded according to the present invention.
Figure 37:
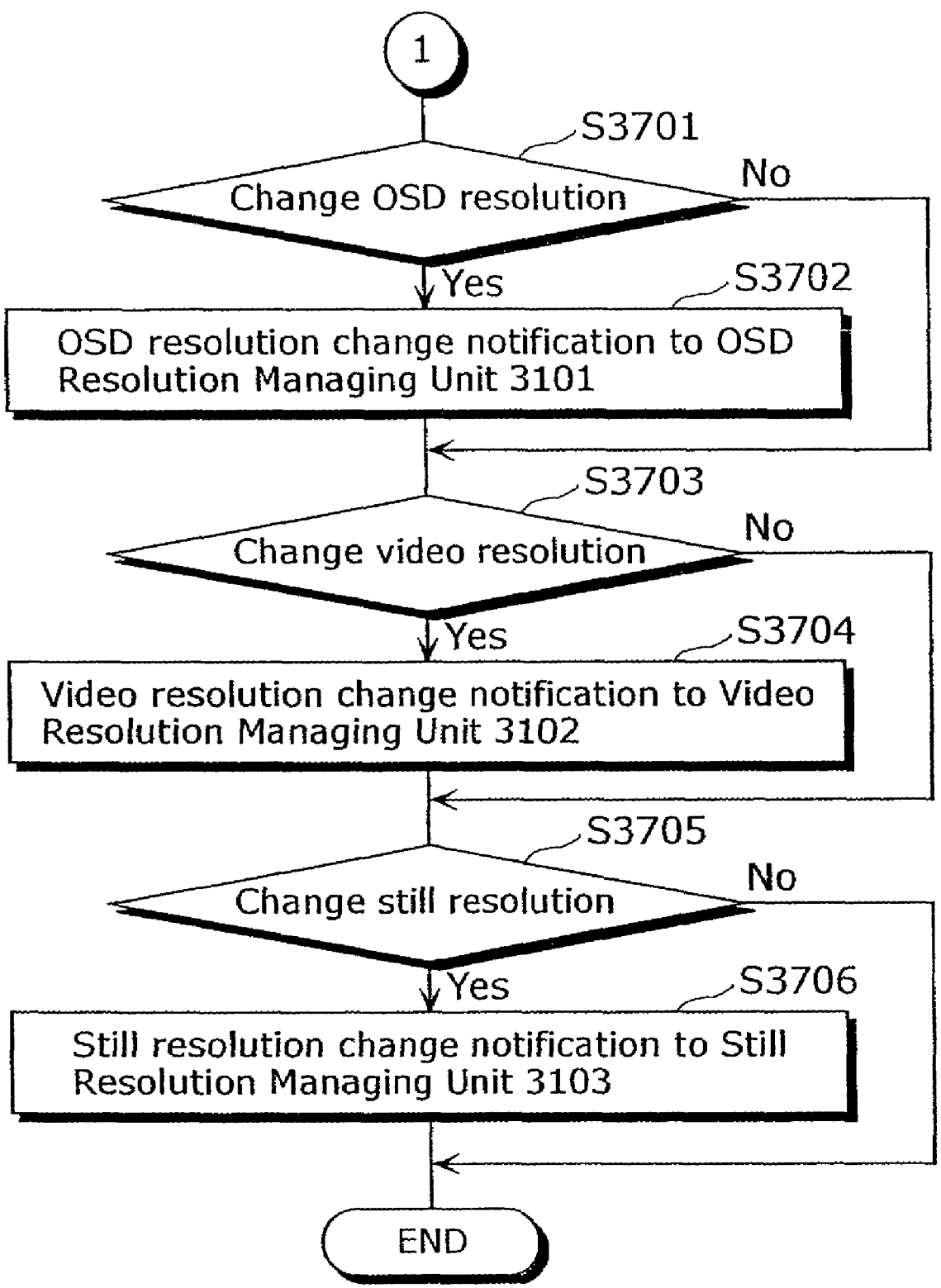
FIG. 37 is an example of a flowchart of the resolution selection deciding unit 3105 for a case resolution is different from the one of a video format that has been previously decoded according to the present invention.

FIG. 36 and FIG. 37 are flowcharts of the resolution selection deciding unit 3105 for a case that the resolution of the video format received by the video decoder 508 is different from the resolution of the video format that has been decoded before. The video format resolution change detecting unit 3104 notifies the video format resolution change to the resolution selection deciding unit 3105 (S3601). According to the video format resolution, the requested OSD resolution and the requested still resolution, which are memorized in the primary storage unit 511, it tries to select a combination that can be displayed (S3602). As a result of it, if there is no combination that can be displayed (S3603), it tries to select a combination that can be displayed according to the video format resolution and the requested OSD resolution memorized in the primary storage unit 511(S3604). As a result of it, if there is no combination that can be displayed (S3605), it tries to select a combination that can be displayed according to the video format resolution (S3606). As a result of it, it decides whether the OSD resolution is changed or not (S3701). If it is changed, the OSD resolution change notification is made to an OSD resolution managing unit 3101 (S3702). It decides whether the video resolution is changed or not (S3703). If it is changed, the video resolution change notification is made to the video resolution managing unit 3101 (S3704). It decides whether the still resolution has been changed or not (S3705). If it is changed, a still resolution change notification is made to the still resolution managing unit 3101 (S3706).

Figure 38:
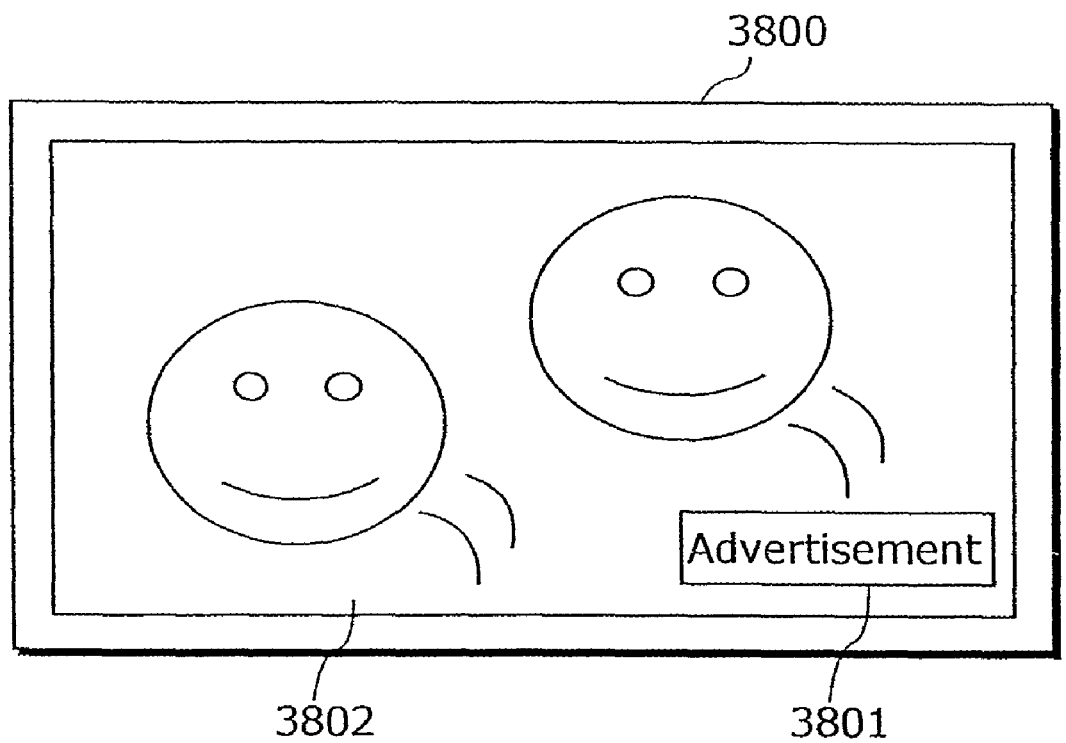
FIG. 38 is an example of a screen for an application program where a video format change is preceded according to the present invention.

For example, the application program 3100 is an application that displays program contents, channel names and advertisements, etc. at a corner of the screen using the OSD plane regardless of details of the program and/or contents. In this case, as shown in FIG. 38, a video display area 3802 occupies the main portion of a display screen 3800, whereas the OSD display area 3801 that displays the above application in a small portion. In this case, when its video format is changed, it is desirable that the resolution selection deciding 3105 changes it to a combination that can be displayed according to the video format. Here, suppose that the video resolution is changed to 1920*1080 when both of the video plane and the OSD plane are being displayed with the resolution of 720*480. In this case, if the OSD plane resolution is prioritized, the video enlargement and reduction unit 520 needs to reduce the video of 1920*1080 stored in the video buffer 517 to 720*480. It apparently deteriorates its video quality. This application aims at displaying supplemental information. It is not desirable to deteriorate the video, which is the main information just for displaying the supplemental information. Therefore, if the application program 3100 does not issue a change request of the OSD resolution to the OSD resolution managing unit 3101, or does not issue a change request of the still resolution to the still resolution managing unit 3102, it means that the video format change is prioritized. Then, the application program 3100 recognizes that the OSD plane resolution has been changed, and redraws characters and graphics suitable to the OSD resolution. By doing so, it becomes possible to provide a beautiful screen display.

Figure 39:
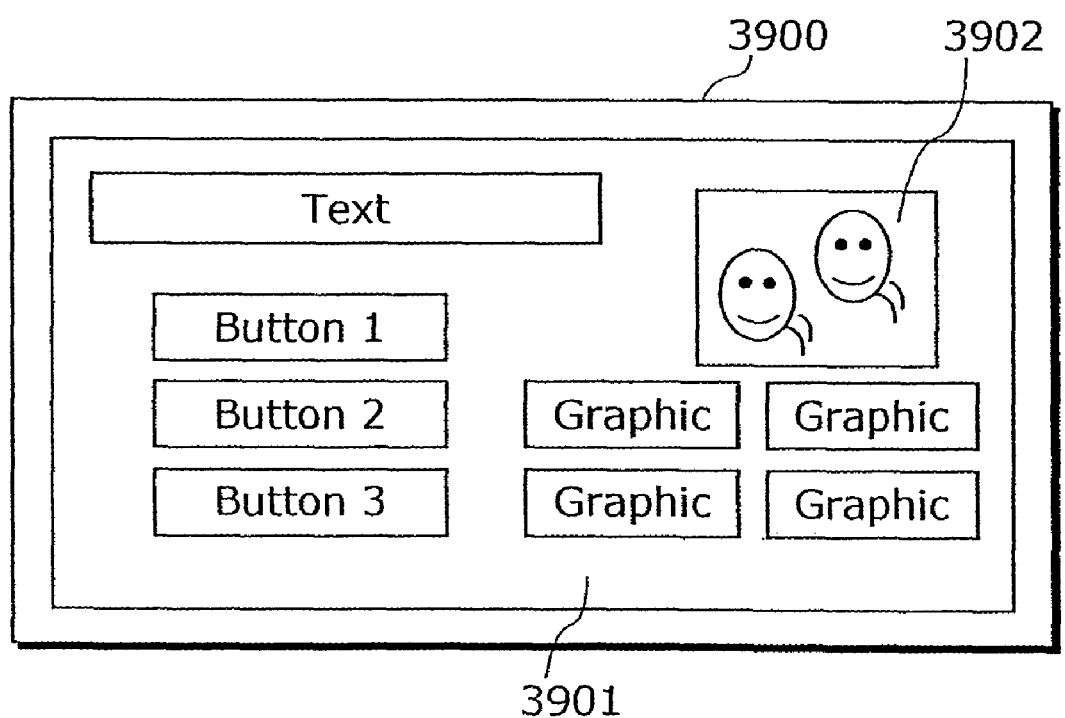
FIG. 39 is an example of a screen for an application program where an OSD resolution is preceded according to the present invention.

On the other hand, suppose that the application program 3100 is an application that displays a video display in a small area and displays an application display in its entire display area. To be more specific, JMF 1205a provides functions to enlarge and reduce the video and designate its display location, and the application program 3100 uses these functions. In this case, as shown in FIG. 39, an OSD display area 3901, which is the display of the application, occupies the major portion of a display screen 3900, and a video display area 3902 is small. The size and ideographic location of the video display area 3901 are decided according to the functions provided by the JMF1205a. In this case, when the video format is changed, it is desirable that the resolution selection deciding unit 3105 changes the combination according to the currently displayed OSD resolution. The reason is because the video has already been reduced and displayed in the application of which video quality is apparently deteriorated. Even if the OSD resolution is changed according to the change in the video plane resolution, it is inevitable to deteriorate the quality of the video. On the other hand, it is necessary for the application program 3100 to redraw the OSD display area 3901 according to the change in the OSD plane resolution. In general, a rendering process for a larger display area takes time. Also, it is necessary to prepare a plural number of characters and graphics information according to the OSD plane resolution, which requires a lot of memories. In addition to it, the application program 3100 must be well-functioned to deal with complicated processes. Therefore, if the application program 3100 issues a change request of desired OSD resolution to the OSD resolution managing unit 3101, it means that the OSD resolution is prioritized. As a result of this, there would be issues such as complications of the application program 3100 and how to retain extra characters and graphics data. Also, when the OSD plane resolution is prioritized, the video enlargement and reduction unit 520 enlarges and reduces the video stored in the video buffer 517 to meet with the resolution retained.

Second Embodiment

In the first embodiment, for a case the video format is changed under a situation that the application program 3100 issues a change request of the OSD resolution to the OSD resolution managing unit 3101, the OSD resolution is prioritized. Therefore, there are some cases that the video format resolution change request may not be made in the application program 3100.

Figure 40:
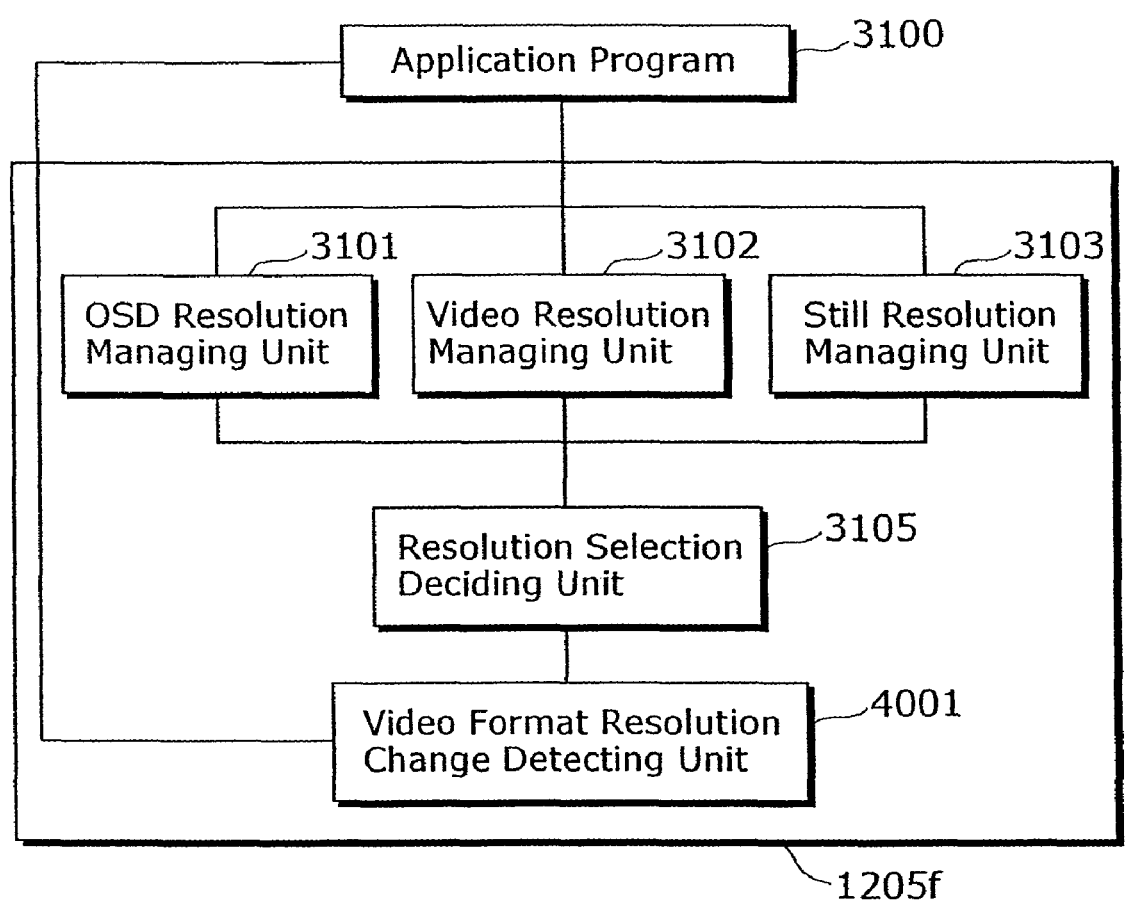
FIG. 40 is an example of a configuration diagram of a resolution switching unit 1205*f* according to the present invention.

Therefore, in the present embodiment, as shown in a configuration diagram of the video resolution switching function indicated in FIG. 40, for a case that the resolution of the video format received by the video decoder 508 is different from the resolution of the video format that has been decoded before, a video format resolution change detecting unit 4001 has a function to also notify it to the application program 3100, in addition to the function of the video format resolution change detecting unit 3104. Because other functions such as an OSD resolution managing unit 3101, a video resolution managing unit 3102, a still resolution managing unit 3103 and resolution selection deciding unit 3105, which are contained in a resolution switching unit 1205*f*, are the same as those in the first embodiment, their explanations are omitted.

By doing so, the application program 3100 can recognize the change in the video format resolution, and by making a change request along with the notified video format resolution to the video resolution managing unit 3102, it is possible to display the video with the resolution of the video format.

Third Embodiment

In the second embodiment, the application program 3100 can designate only one OSD resolution at a time, which can display the application itself in the most appropriate way, to the resolution switching unit 1205*f*.

Figure 41:
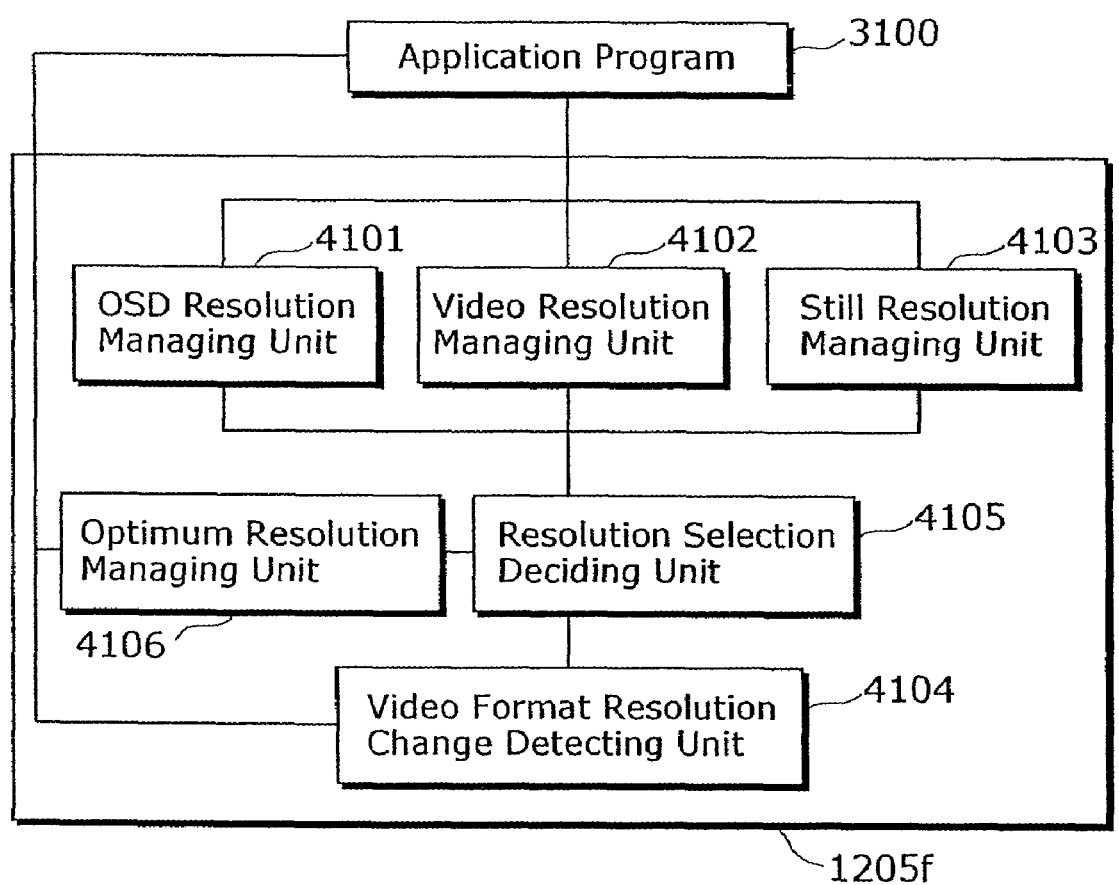
FIG. 41 is an example of a configuration diagram of the resolution switching unit 1205*f* according to the present invention.

Therefore, in the present embodiment, as shown in the configuration diagram of the video resolution switching function indicated in FIG. 41, the application program 3100 has a configuration to include the OSD resolution, which can display the application itself in the most appropriate way, and resolution can be registered in advance in an optimum resolution managing unit 4106.

The resolution switching unit 1205*f* includes an OSD resolution managing unit 4101, a video resolution managing unit 4102, a still resolution managing unit 4103, a video format resolution change detecting unit 4104, a resolution selection deciding unit 4105, and an optimum resolution managing unit 4106, and has a video resolution switching function. The OSD resolution managing unit 4101 controls the OSD plane resolution. The OSD resolution managing unit 4101 has a function to accept a change request of the current OSD plane resolution from the application program 3100 and a function to notify the change in the OSD plane resolution to the application program 3100. When the change request of the OSD plane resolution is accepted, it is notified to the resolution selection deciding unit 4105.

The video resolution managing unit 4102 controls the video plane resolution. The video resolution managing unit 4102 has a function to accept a change request of the current video plane resolution from the application program 3100 and a function to notify the change in the video plane resolution to the application program 3100. When the change request of the video plane resolution is accepted, it is notified to the resolution selection deciding unit 4105.

The still resolution managing unit 4103 controls the video plane resolution. The still resolution managing unit 4103 has a function to accept a change request of the current video still resolution from the application program 3100 and a function to notify the change in the still plane resolution to the application program 3100. When the change request of the still plane resolution is accepted, it is notified to the resolution selection deciding unit 4105.

For a case the video format resolution received by the video decoder 508 is different from the resolution of the video format that has been decoded before, the video format resolution change detecting unit 4104 notifies it to the resolution selection deciding unit 4105 and the application program 3100.

The optimum resolution managing unit 4106 has a function to register and delete the OSD resolution that the application program 3100 can display the application itself in the most appropriate way. It is possible for the application program 3100 to register more than one OSD resolution.

FIG. 42 is a flowchart of the optimum resolution managing unit 4106 for a case that the application program 3100 registers the optimum OSD resolution. The application program 3100 requests to register the optimum OSD resolution to be registered to the optimum resolution managing unit 4106 (S4201). The optimum resolution managing unit 4106 memorizes the requested optimum OSD resolution to the primary storage unit 511 (S4202).

FIG. 43 is a flowchart of the optimum resolution managing unit 4106 for a case that the application program 3100 deletes the optimum OSD resolution. The application program 3100 requests to delete the optimum OSD resolution to be deleted to the optimum resolution managing unit 4106 (S4301). The optimum resolution managing unit 4106 deletes the requested optimum OSD resolution from the primary storage unit 511 (S4302).

The resolution selection deciding unit 4105 selects resolution for each plane along with consideration of a possible combination to be displayed among each plane of the TV receiver for one of the following cases: for a case there is a request to change the current OSD plane resolution to the OSD resolution managing unit 4101; for a case there is a request to change the current video plane resolution to the video resolution managing unit 4102; for a case there is a request to change the current still plane resolution to the still resolution managing unit 4103; and for a case there is a request to change the video format resolution from the video format resolution change detecting unit 4104.

Figure 44:
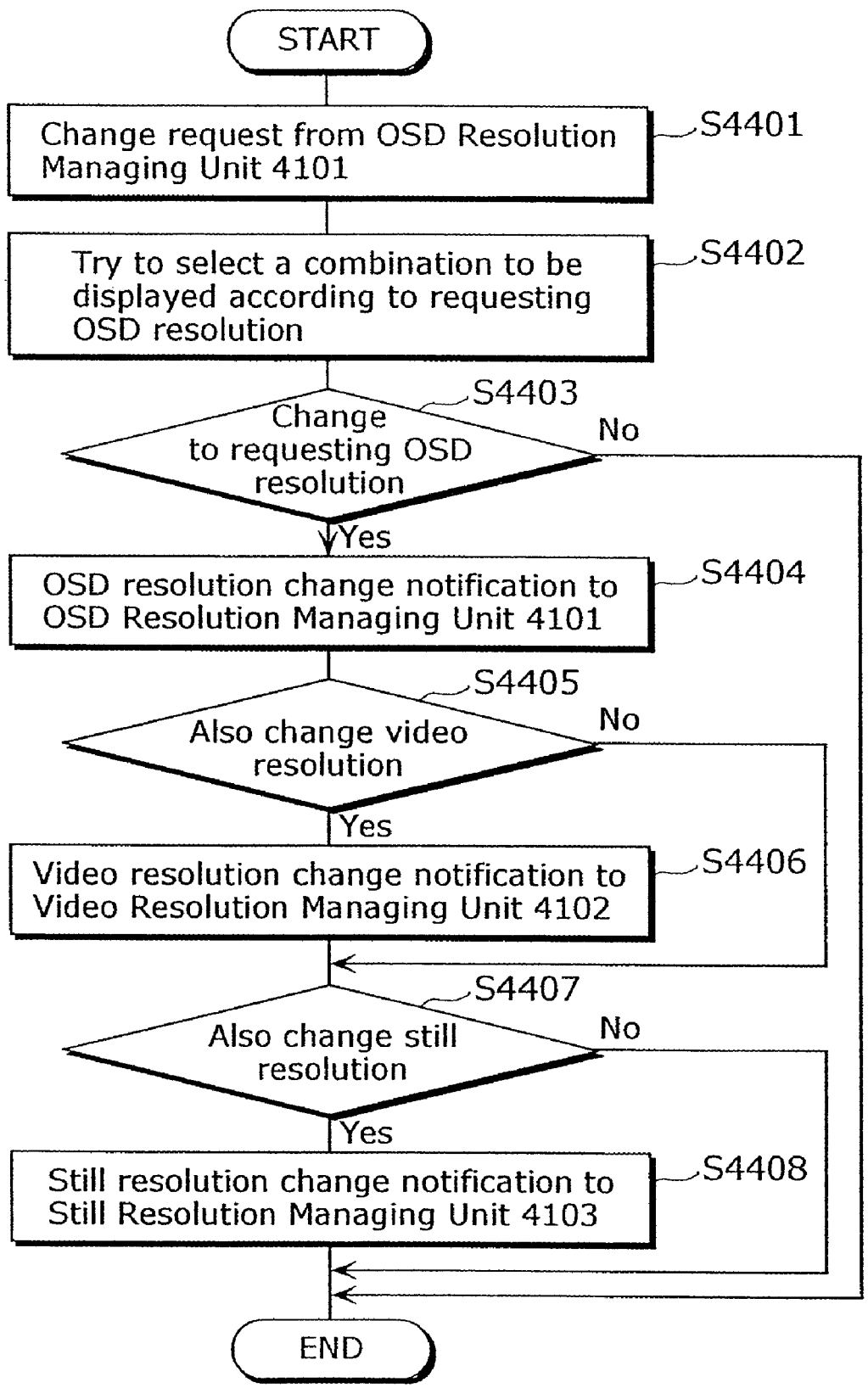
FIG. 44 is an example of a flowchart of a resolution selection deciding unit 4105 for a case there is a resolution change request for an OSD plane according to the present invention.

FIG. 44 is a flowchart of the resolution selection deciding unit 4105 for a case there is a request to change the current OSD resolution to the OSD resolution managing unit 4101. The OSD resolution managing unit 4101 provides the OSD resolution to the resolution to the resolution selection deciding unit 4105 and makes the change request (S4401). The OSD resolution managing unit 4101 tries to select a combination to be displayed according to the OSD resolution requested to be changed (S4402). As a result of it, the OSD resolution managing unit 4101 decides whether the requested OSD resolution is changed or not (S4403), and executes the OSD resolution change notification to the OSD resolution managing unit 4101 if it is changed (S4404). In accordance with this OSD resolution change, the OSD resolution managing unit 4101 decides whether the video resolution is changed (S4405), and executes the video resolution change notification to the video resolution managing unit 4102 if it is changed (S4406). In accordance with this OSD resolution change, the OSD resolution managing unit 4101 decides whether the still resolution is changed (S4407), and executes the video resolution change notification to the video resolution managing unit 4103 if it is changed (S4408).

Figure 45:
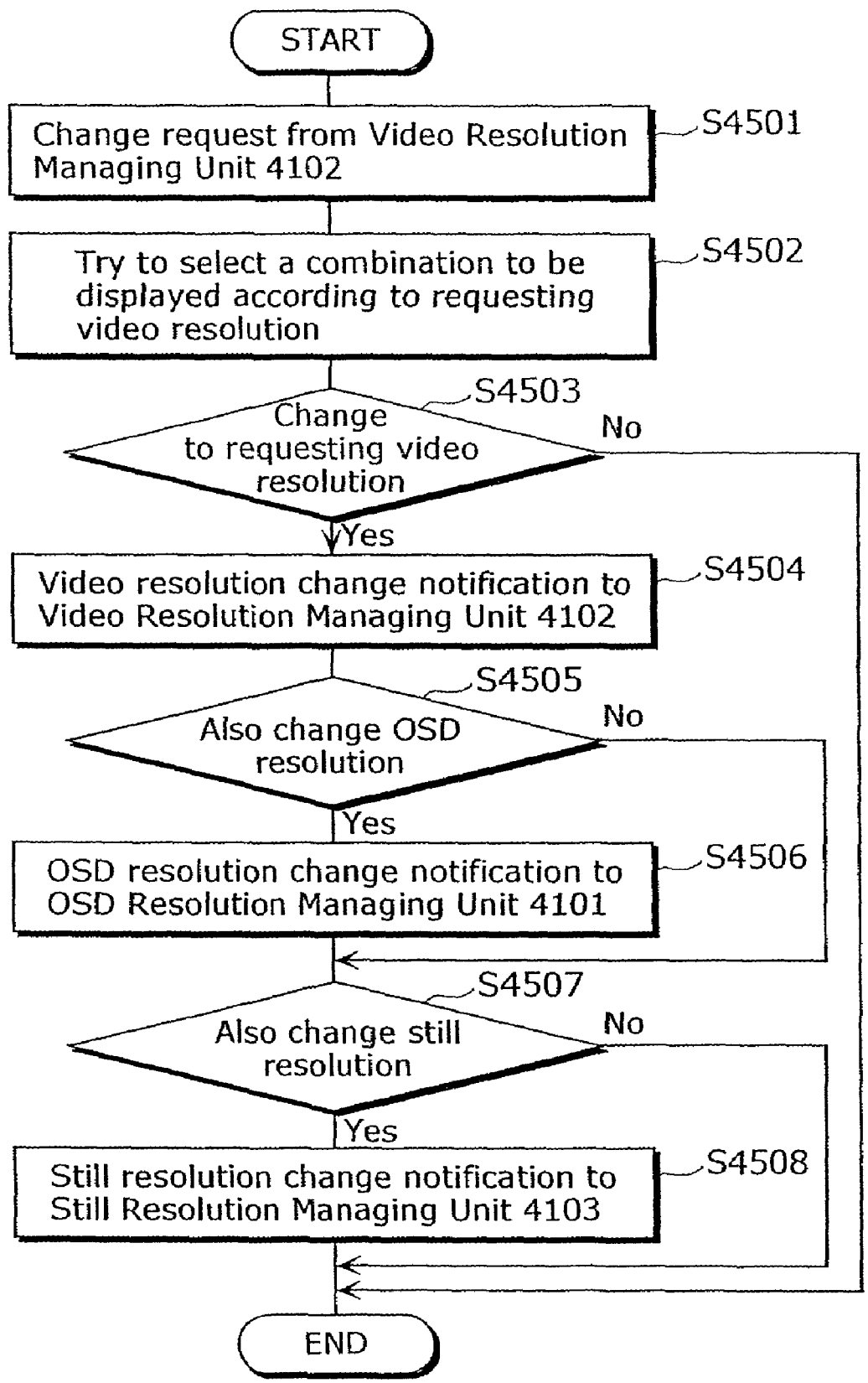
FIG. 45 is an example of a flowchart of the resolution selection deciding unit 4105 for a case there is a resolution change request for a video plane according to the present invention.

FIG. 45 is a flowchart of the resolution selection deciding unit 4105 for a case there is a request to change the current video plane resolution to the video resolution managing unit 4102. The video resolution managing unit 4102 provides the video resolution to the resolution to the resolution selection deciding unit 4105 and makes the change request (S4501). The video resolution managing unit 4102 tries to select a combination to be displayed according to the video resolution requested to be changed (S4502). As a result of it, the video resolution managing unit 4102 decides whether the requested video resolution is changed or not (S4503), and executes the video resolution change notification to the video resolution managing unit 4102 if it is changed (S4504). In accordance with this video resolution change, the video resolution managing unit 4102 decides whether the OSD resolution is changed (S4505), and executes the OSD resolution change notification to the OSD resolution managing unit 4101 if it is changed (S4506). In accordance with this video resolution change, the video resolution managing unit 4102 decides whether the still resolution is changed (S4507), and executes the video resolution change notification to the video resolution managing unit 4103 if it is changed (S4508).

Figure 46:
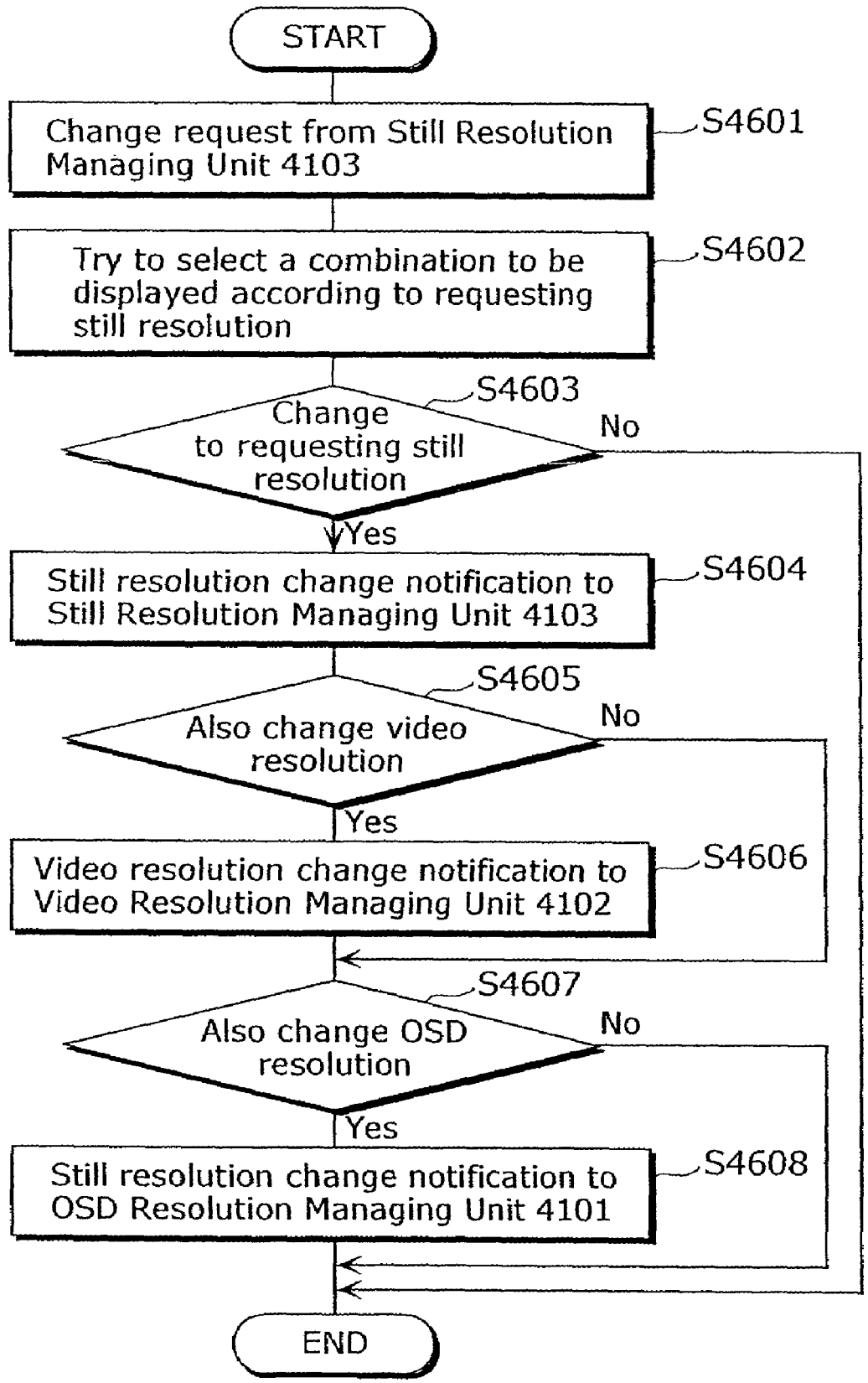
FIG. 46 is an example of a flowchart of the resolution selection deciding unit 4105 for a case there is a resolution change request for a still plane according to the present invention.

FIG. 46 is a flowchart of the resolution selection deciding unit 4105 for a case there is a request to change the current still plane resolution to the still resolution managing unit 4103. The still resolution managing unit 4103 provides the still resolution to the resolution to the resolution selection deciding unit 4105 and makes the change request (S4601). The still resolution managing unit 4103 tries to select a combination to be displayed according to the still resolution requested to be changed (S4602). As a result of it, the still resolution managing unit 4103 decides whether the requested still resolution is changed or not (S4603), and executes the still resolution change notification to the still resolution managing unit 4103 if it is changed (S4604). In accordance with this still resolution change, the still resolution managing unit 4103 decides whether the video resolution is changed (S4605), and executes the video resolution change notification to the video resolution managing unit 4102 if it is changed (S4606). In accordance with this still resolution change, the still resolution managing unit 4103 decides whether the OSD resolution is changed (S4607), and executes the OSD resolution change notification to the OSD resolution managing unit 4101 if it is changed (S4608).

Figure 47:
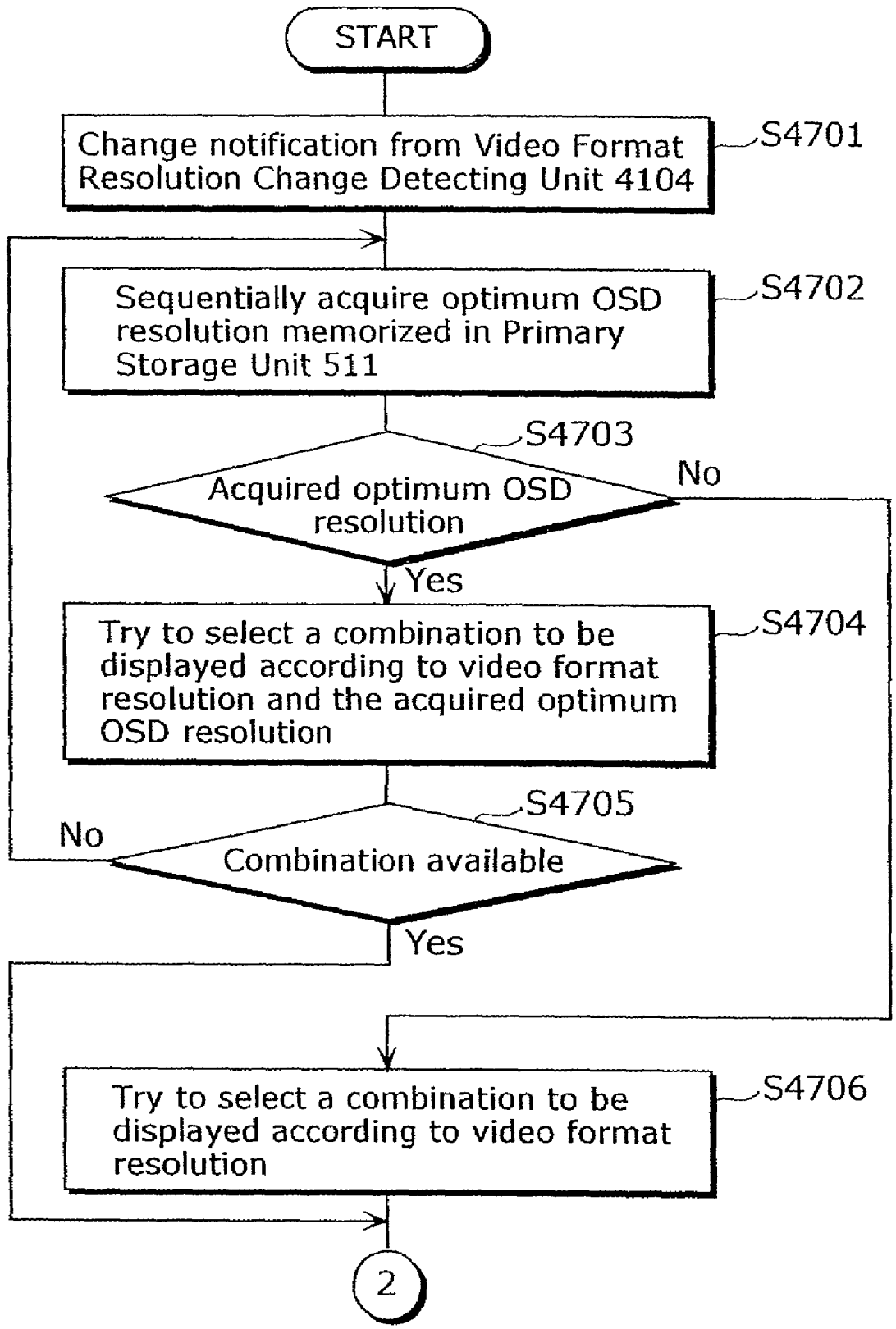
FIG. 47 is an example of a flowchart of the resolution selection deciding unit 4105 for a case resolution is different from the one of a video format that has been previously decoded according to the present invention.
Figure 48:
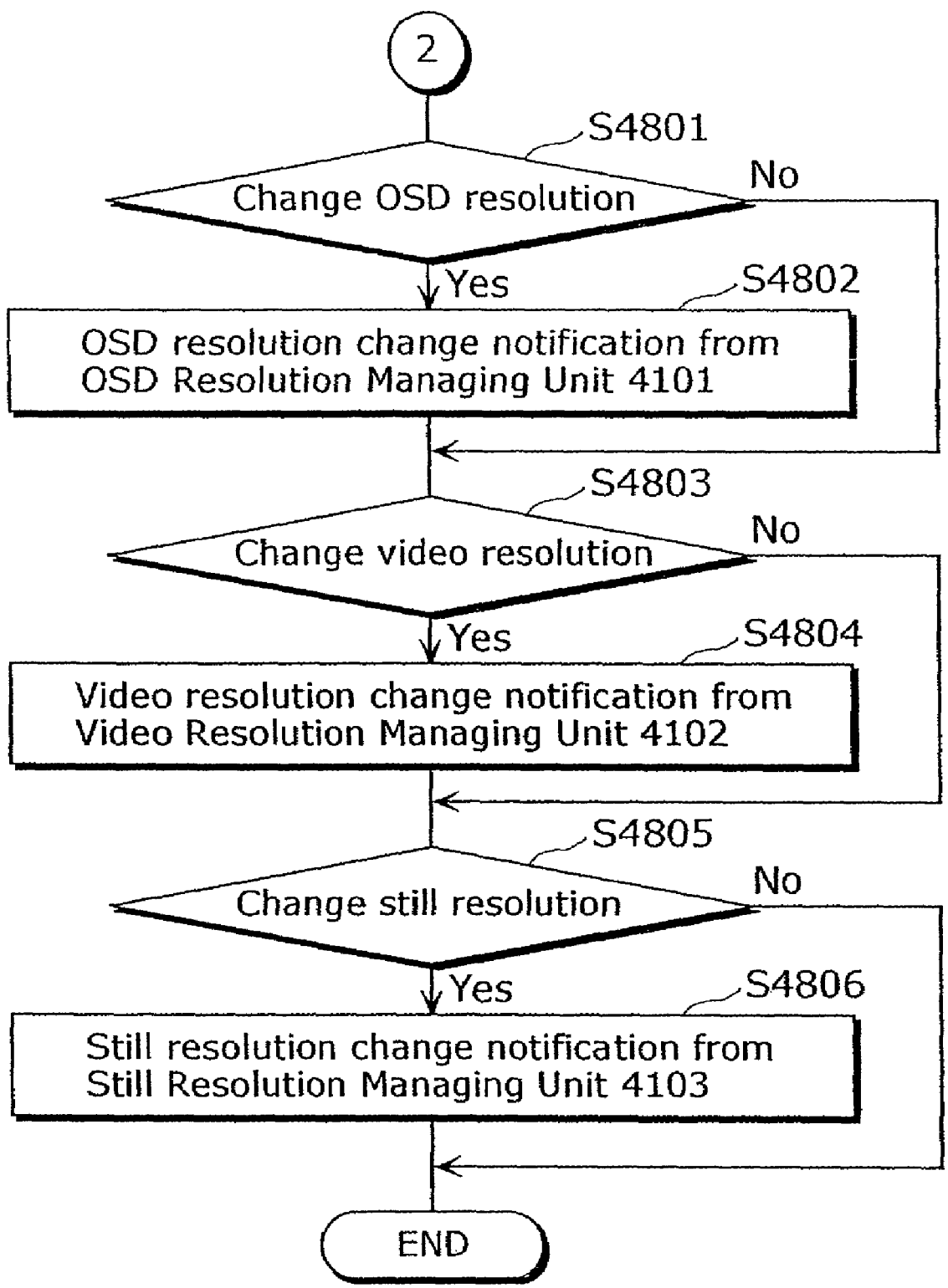
FIG. 48 is an example of a flowchart of a resolution selection deciding unit 3105 for a case a resolution is different from the one of a video format that has been previously decoded according to the present invention.

FIG. 47 and FIG. 48 are flowcharts of the resolution selection deciding unit 4105 for a case the video format resolution received by the video decoder 508 is different from the video format resolution that has been changed previously. The video format resolution change detecting unit 4104 notifies the video format resolution change to the resolution selection deciding unit 4105 (S4701). The video format resolution change detecting unit 4104 sequentially acquires the optimum OSD resolution memorized in the primary storage unit 511 (S4702). The video format resolution change detecting unit 4104 decides whether the optimum OSD resolution is acquired or not (S4703). If it is acquired in the S4703, the video format resolution change detecting unit 4104 tries to select a combination to be displayed according to the video format resolution and the acquired optimum OSD resolution (S4704). As a result of it, the video format resolution change detecting unit 4104 decides whether there is a combination to be displayed or not (S4705). If there is the combination in the S4705, it goes to S4801. If there is no combination in the S4705, it goes back to the S4702. If the optimum OSD resolution cannot be acquired in the S4703, i.e. the sequential acquirement of the optimum OSD resolution is finished, it tries to select a combination to be displayed according to the video format resolution (S4706). As a result of the S4704 or the S4706, it decides whether the OSD resolution is changed or not (S4801), and executes the OSD resolution change notification to the OSD resolution managing unit 4101 (S4802) if the OSD resolution is changed. It decides whether the video resolution is changed or not (S4803), and executes the video resolution change notification to the video resolution managing unit 4102 (S4804) if the video resolution is changed. It decides whether the still resolution has been changed or not (S4805), and executes the still resolution change notification to the still resolution managing unit 4103 (S4806) if the still resolution is changed.

By doing so, the application program 3100 is able to register a plural number of the OSD resolution, which can display the application itself in the most appropriate way, to the resolution switching unit 1205. When the application program 3100 is able to handle the plural number of resolution, it can provide more opportunities to display the video and the application without causing any distortion according to the change in the video format resolution.

Fourth Embodiment

In the third embodiment, when a plural number of applications like the application program 3100 exist and are displayed, there are some cases that it becomes uncertain which of the application programs that registers the optimum OSD resolution should be used as a basis for deciding a displayable combination.

Therefore, in the present embodiment, as shown in FIG. 49 sets (4901, 4902, 4903, etc.) of a Java program identifier 4900, which can identify an application program, and the optimum OSD resolution are registered in the optimum resolution managing unit 4106, and a priority 2005 shown in FIG. 20 is acquired from the registered sets of the Java program identifier (4901, 4902, 4903, etc.) and the optimum OSD resolution, and a combination to be displayed is decided by using the priority 2005 at the time of the decision. Other functions such as the OSD resolution managing unit 4101, the video resolution managing unit 4102, the still resolution managing unit 4103, and the video format resolution change detecting unit 4104 contained in the resolution switching unit 1205f stay the same.

The following describes processes of the optimum resolution managing unit 4106 and the resolution selection deciding unit 4105, of which functions are different.

Figure 50:
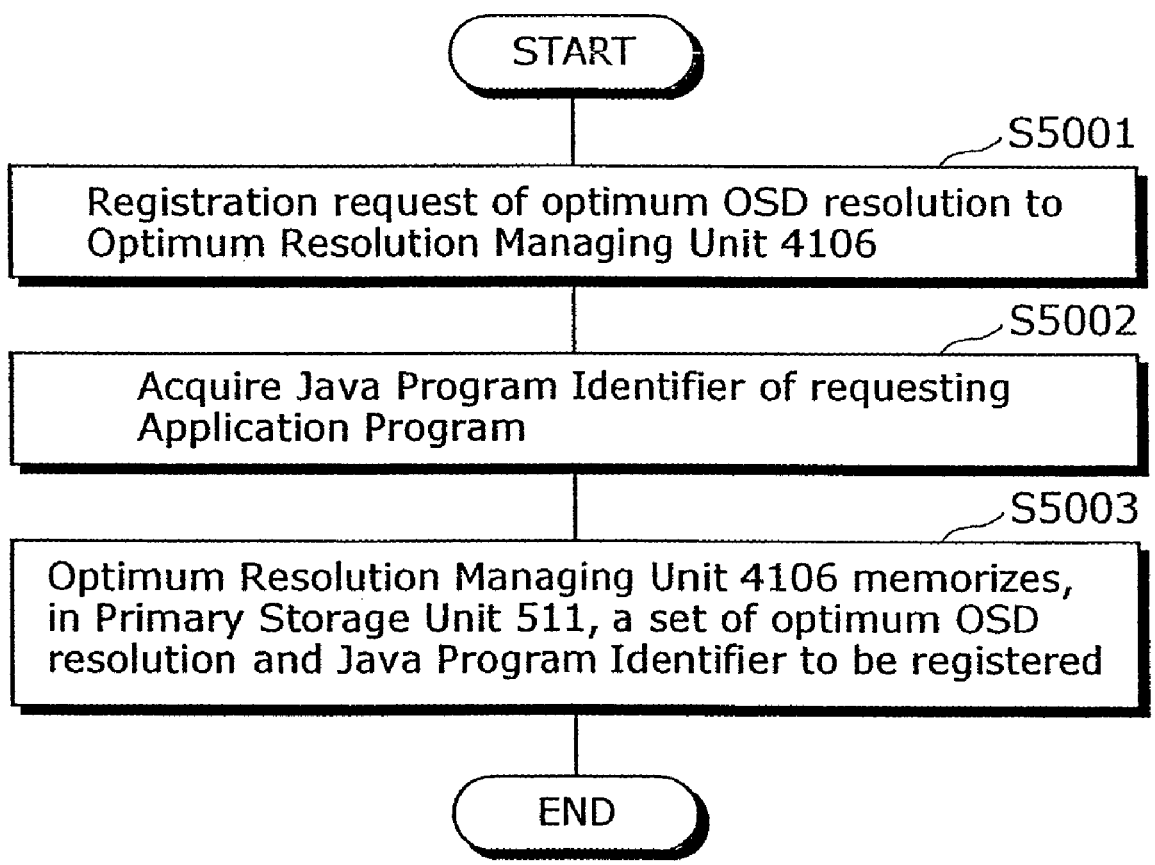
FIG. 50 is an example of a flowchart of the optimum resolution managing unit 4106 for a case optimum OSD resolution is registered according to the present invention.

FIG. 50 is a flowchart of the optimum resolution managing unit 4106 for a case that the application program 3100 registers the optimum OSD resolution. The application program 3100 requests to register the optimum OSD resolution to be registered to the optimum resolution managing unit 4100

(S5001). The optimum resolution managing unit 4106 acquires the Java program identifier of the application program requesting the registration (S5002). The optimum resolution managing unit 4106 memorizes a set of the acquired Java program identifier and the optimum requested OSD resolution in the primary storage unit 511 (S5003).

Figure 51:
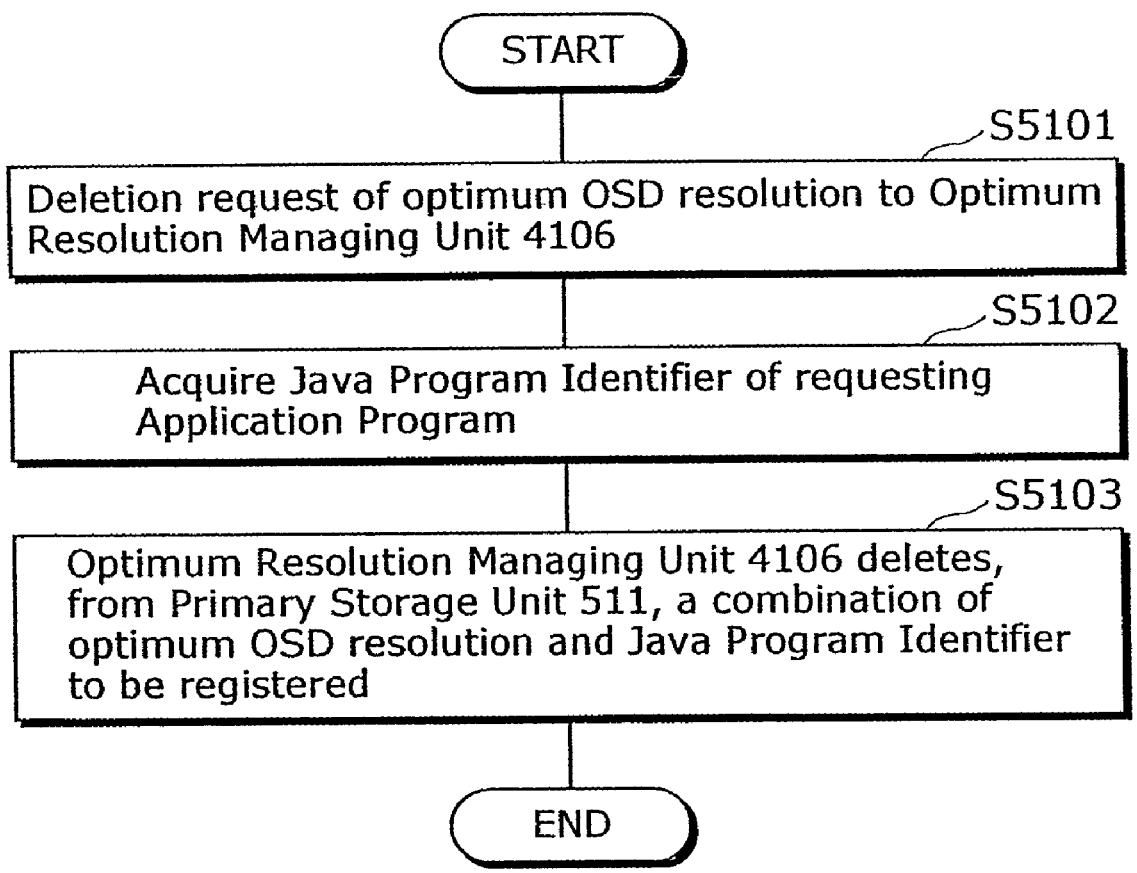
FIG. 51 is an example of a flowchart of the optimum resolution managing unit 4106 for a case optimum OSD resolution is deleted according to the present invention.

FIG. 51 is a flowchart of the optimum resolution managing unit 4106 for a case the application program 3100 deletes the optimum OSD resolution. The application program 3100 requests to register the optimum OSD resolution to be deleted to the optimum resolution managing unit 4106 (S5101). The optimum resolution managing unit 4106 acquires the Java program identifier of the application program requesting the deletion (S5102). The optimum resolution managing unit 4106 memorizes the set of the acquired Java program identifier and the deletion-requested optimum OSD resolution from the primary storage unit 511 (S5103).

Figure 52:
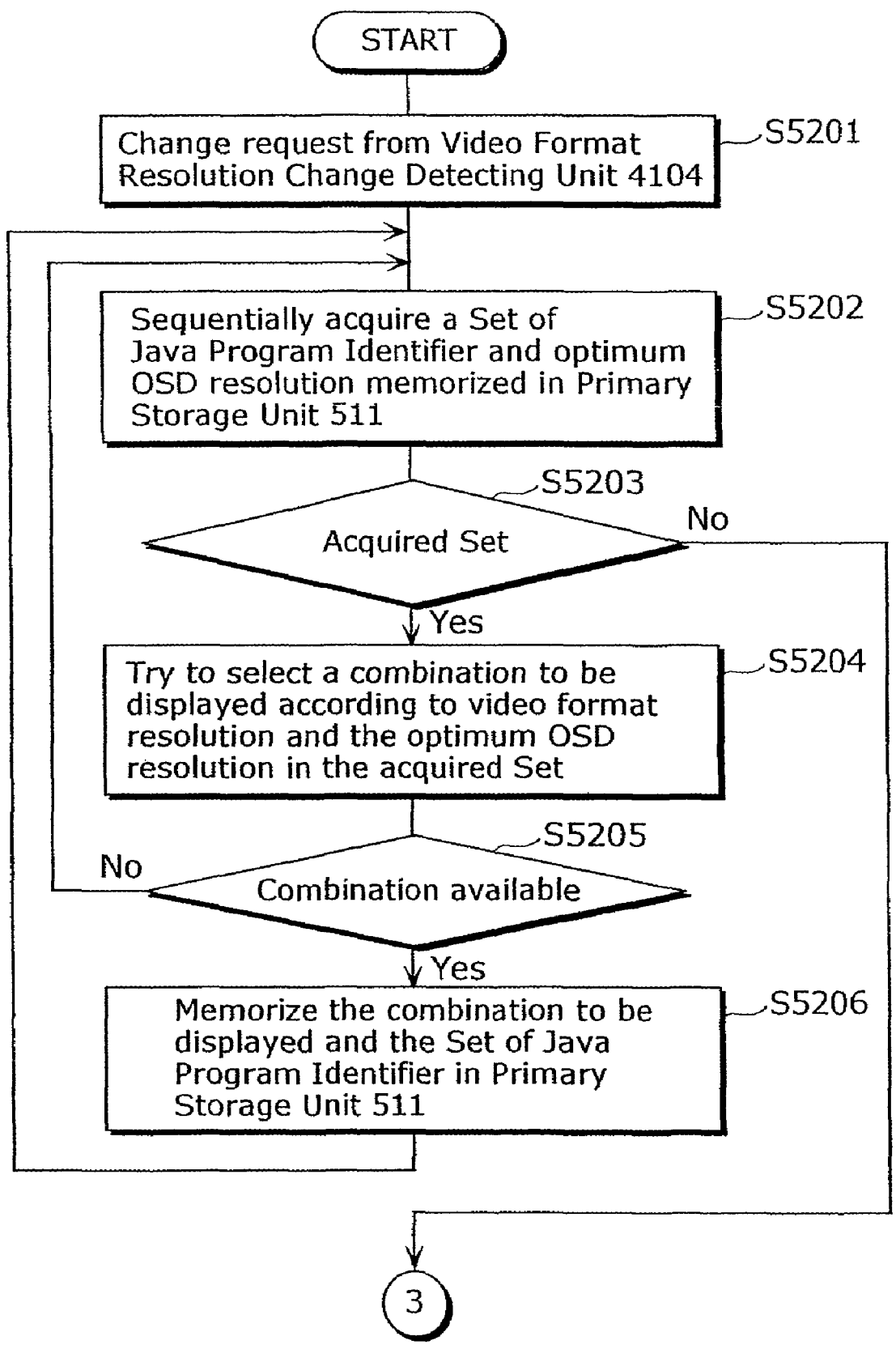
FIG. 52 is an example of a flowchart of the resolution selection deciding unit 4105 for a case resolution is different from the one of a video format that has been previously decoded according to the present invention.
Figure 53:
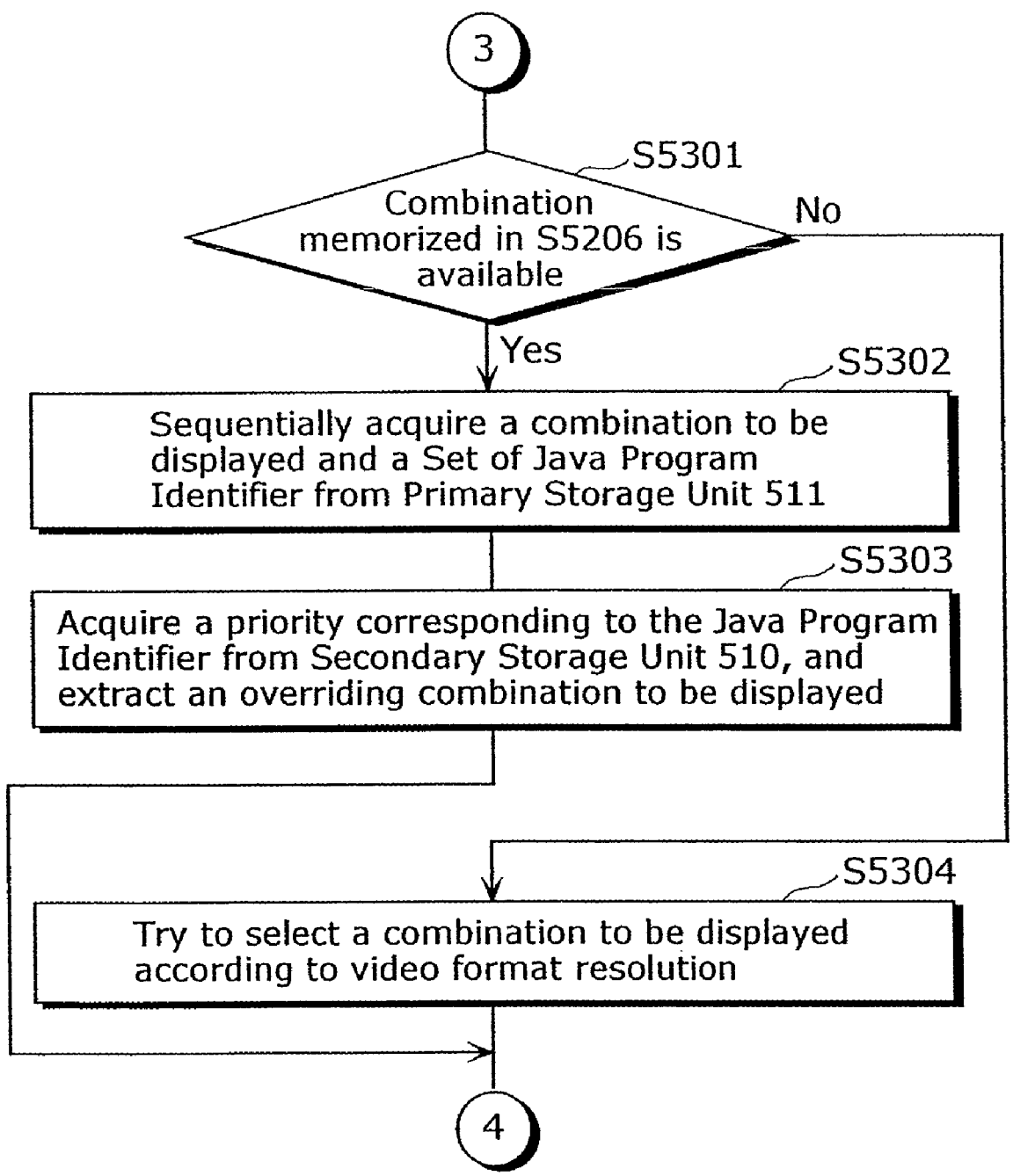
FIG. 53 is an example of a flowchart of the resolution selection deciding unit 4105 for a case resolution is different from the one of a video format that has been previously decoded according to the present invention.
Figure 54:
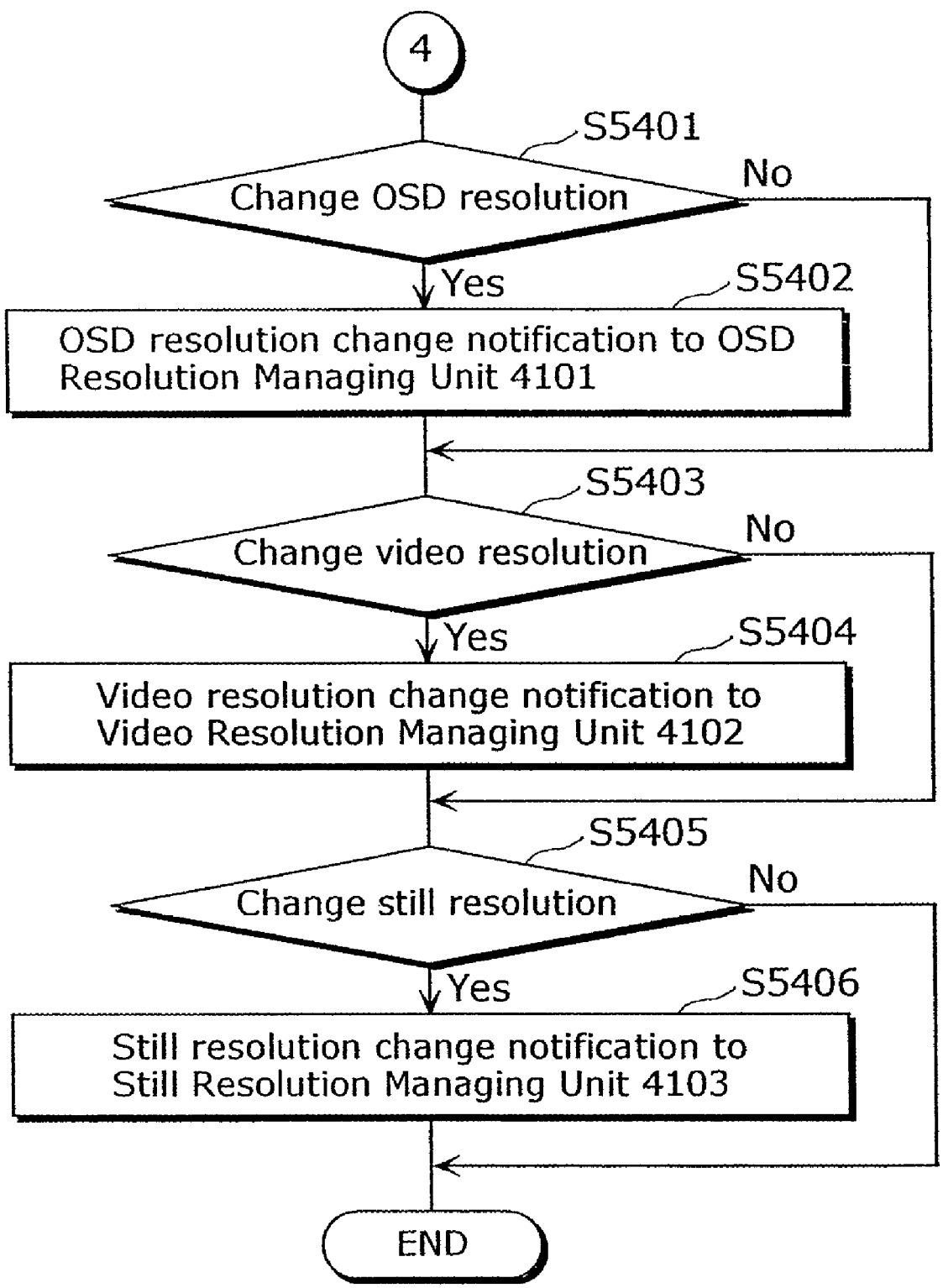
FIG. 54 is an example of a flowchart of the resolution selection deciding unit 4105 for a case resolution is different from the one of a video format that has been previously decoded according to the present invention.

FIG. 52, FIG. 53 and FIG. 54 are flowcharts of the resolution selection deciding unit 4105 for a case that the resolution of the video format received by the video decoder 508 is different from the resolution of the video format that has been previously decoded. The video format resolution change detecting unit 4104 notifies a video format resolution change to the resolution selection deciding unit 4105 (S5201). The resolution selection deciding unit 4105 sequentially acquires sets of the Java program identifier and the optimum OSD resolution memorized in the primary storage unit 511 (S5202). The resolution selection deciding unit 4105 decides whether the set of Java program identifier and the optimum OSD resolution is acquired (S5203). If it is acquired in the S5203, the resolution selection deciding unit 4105 tries to select a combination to be displayed according to the video format resolution and the optimum OSD resolution in the acquired set (S5204). As a result of the S5204, the resolution selection deciding unit 4105 decides if there is the displayable combination or not (S5205). If there is the combination in the S5205, the resolution selection deciding unit 4105 memorizes all of the displayable combination and Java program identifiers in a maintenance storage unit 511 (S5206), and goes back to the S5203. If there is no combination in the S5205, it goes back to S5202. For a case the set of the Java program identifier and the optimum OSD resolution cannot be acquired in the S5203, i.e. sequential acquirement of the optimum OSD resolution is finished, the resolution selection deciding unit 4105 decides whether there is a set of the Java program identifier and the optimum OSD resolution memorized in the S5206 (S5301). If there is the memorized set(s) in the S5301, the resolution selection deciding unit 4105 sequentially acquires the set of the displayable combination and the lava program identifier from the primary storage unit 511 (S5302), acquires a priority corresponding to the Java program identifier in each of the sets from the secondary storage unit 510, compares them, and extracts the displayable combination with the highest priority (S5303). If there is no set memorized in the S5301, the resolution selection deciding unit 4105 tries to select a displayable combination according to the video format resolution (S5304). As results of S5303 and S5304, the resolution selection deciding unit 4105 decides whether the OSD resolution is changed or not (S5401), and conducts the OSD resolution change notification to the OSD resolution managing unit 4101 if it is changed (S5402). The resolution selection deciding unit 4105 decides whether the video resolution is changed or not (S5403), and conducts the video resolution change notification to the video resolution managing unit 4102 if it is changed (S5404). The resolution selection deciding unit 4105 decides whether the still resolution is changed or not (S5405), and conducts the still resolution change notification to the still resolution managing unit 4103 if it is changed (S5406).

By doing so, even if a plural number of application programs exist and are displayed, it can decide video resolution of the displayable combination along with consideration of all of the optimum OSD resolution respectively registered by each application program.

Fifth Embodiment

Figure 55:
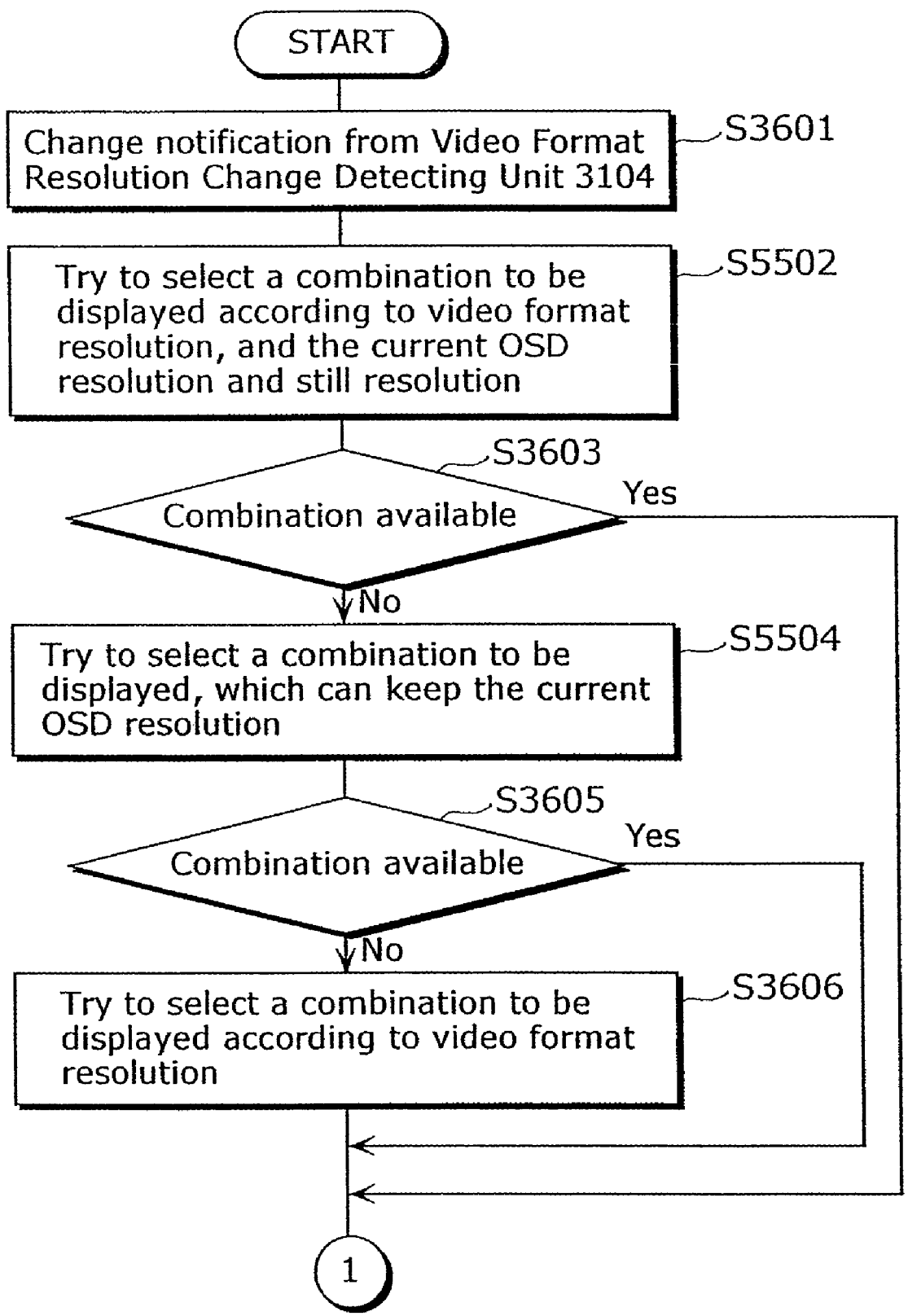
FIG. 55 is an example of a flowchart of the resolution selection deciding unit 3105 for a case resolution is different from the one of a video format that has been previously decoded according to the present invention.

In the second embodiment, action of the resolution selection deciding unit 4105 may be defined in the way described in FIG. 55 and FIG. 37. The video format resolution change detecting unit 3104 notifies the video format resolution change to the resolution selection deciding unit 3105 (S3601). The resolution selection deciding unit 4105 tries to select a combination to be displayed according to the video format resolution, the current OSD resolution and the current still resolution (S5502). As a result of it, if there is no combination to be displayed (S3603), the resolution selection deciding unit 4105 tries to select a combination to be displayed that can maintain the current OSD plane resolution (S5504). As a result of it, if there is no combination to be displayed (S3605), the resolution selection deciding unit 4105 tries to select a combination to be displayed according to the video format resolution (S3606). As a result of it, the resolution selection deciding unit 4105 decides whether the OSD resolution is change or not (S3701), and conducts the OSD resolution change notification to the OSD resolution managing unit 3101 if it is changed (S3702). The resolution selection deciding unit 4105 decides whether the video resolution is changed or not (S3703), and conducts the video resolution change notification to the video resolution managing unit 3102 if it is changed (S3704). The resolution selection deciding unit 4105 decides whether the still resolution is changed or not (S3705), and conducts the still resolution change notification to the still resolution managing unit 3103 if it is changed (S3706).

Having these actions make it possible to maintain the OSD plane resolution preferentially. In the first embodiment, as shown in FIG. 39, it is possible to realize the application that centrally keeps the OSD plane resolution. In the first embodiment, this type of the application needs to issue a request to change the desired OSD resolution to the OSD resolution managing unit 3101. However, in the present embodiment, there is no need for that. In the present embodiment where the application that prioritizes the video plane resolution, just as shown in FIG. 38, when a format of the video stored in the video decoder 508 is notified from the resolution selection deciding unit 3105. It is possible to prioritize the video plane resolution by issuing the change request of the OSD plane resolution to the OSD resolution managing unit 3101 according to the format.

In the present embodiment, the OSD plane resolution is supposed to be prioritized. However, in the flowchart of FIG. 55, it is possible to have the step S5504 be treated as a step "to try to select a combination to be displayed, which can maintain the video format resolution notified to be changed". By doing so, even though the application designates the OSD plane resolution, the video plane resolution is prioritized. As shown in FIG. 38, it can easily realize the application that prioritizes the video plane resolution.

Also, though the OSD plane resolution is supposed to be prioritized in the present embodiment, the step S5504 in the flowchart of FIG. 55 may be a step "to try to select a combination to be displayed that can maintain the current still resolution". By doing so, even though the application designates the OSD plane resolution, the still plane resolution is prioritized. As shown in FIG. 38, it can easily realize the application that prioritizes the still plane resolution.

In the present embodiment, it is also possible to add a priority plane accepting unit that accepts designation of the plane to be prioritized. The application program 3100 designates the plane to be prioritized to the priority plane accepting unit. In this case, the priority plane accepting unit memorizes the accepted plane to the primary storage unit 511. The resolution selection deciding unit 4105 makes the step S5504 in the flowchart of FIG. 55 be a step "to try to select a combination to be displayed that can maintain the plane resolution retained by the primary storage unit 511".

As a result of this, the application is easily capable of designating the plane of which resolution needs to be maintained.

In addition to this, it is possible for the priority plane accepting unit to accept the first priority plane and the second priority plane. The application program 3100 designates the first priority plane and the second priority plane to the priority plane accepting unit. At this time, the priority plane accepting unit memorizes the accepted first priority plane and the accepted second priority plane in the first storage unit 511. The resolution selection deciding unit 4105 shall have the step S5504 in the flowchart of FIG. 55, which "tries to select a combination to be displayed that can maintain the resolutions in the first priority plane and the second priority plane retained by the first storage unit 511, and tries to select a combination to be displayed that can maintain the resolution of the first priority plane if both of them cannot be compossible".

Sixth Embodiment

Figure 56:
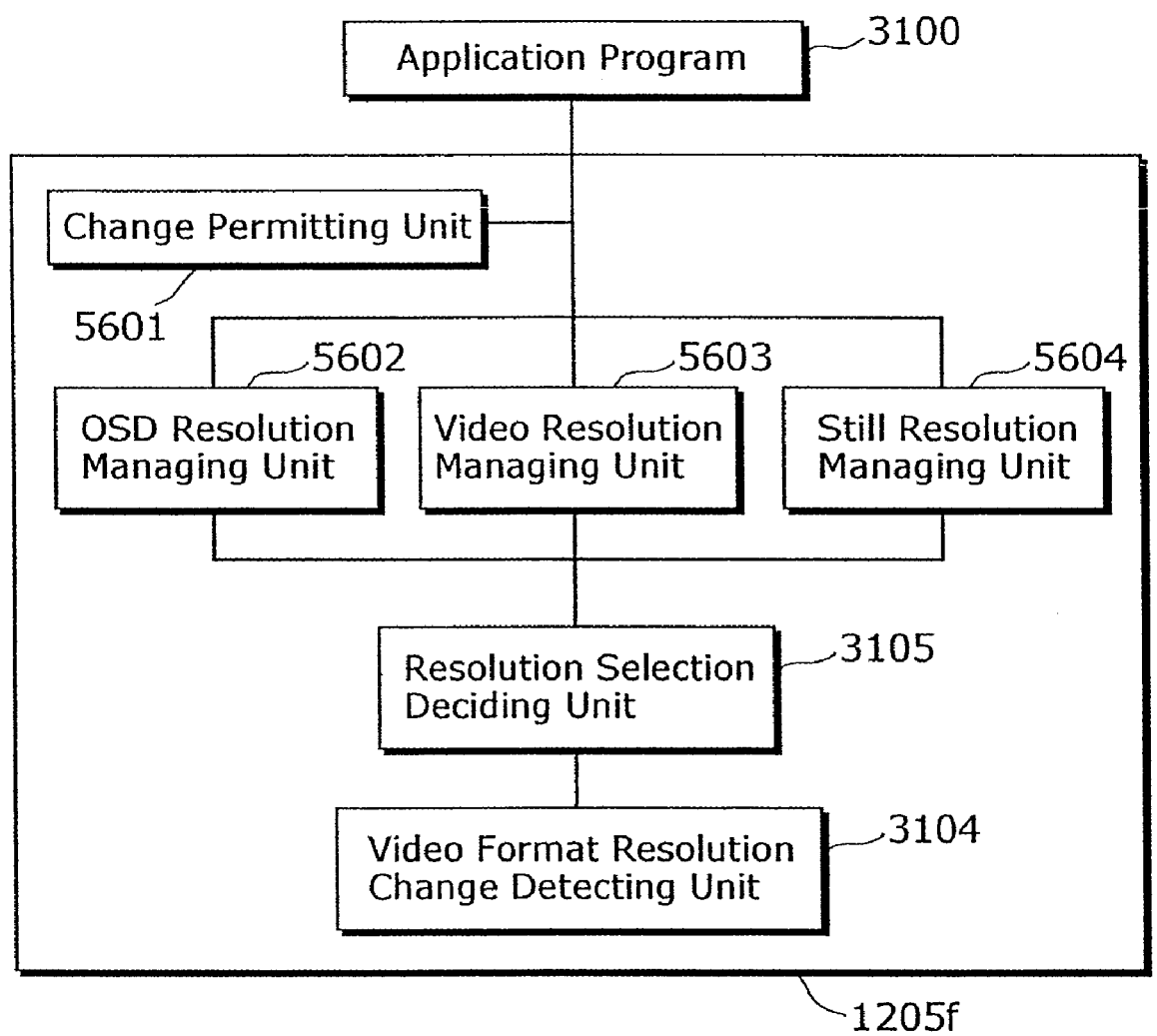
FIG. 56 is an example of a configuration diagram of the resolution switching unit 1205f according to the present invention.

In the first embodiment, when two applications indicated in FIG. 38 and FIG. 39 are being executed at the same time, it is necessary to decide which of the applications should be prioritized. In the present embodiment, the structure of the resolution switching unit 1205f in the first embodiment shall be the structure in FIG. 56. Since the structural components having the same number as those in the FIG. 31 have the same function, their explanation is omitted here. A change permitting unit 5601 permits a change request of the application program 3100. The application program 3100 obtains change permission from the change permitting unit 5601 before making a change request of the resolution to the OSD resolution managing unit 5602, the video resolution managing unit 5603, and the still resolution managing unit 5604. After the permission is obtained, it makes the necessary change request. If the change request becomes unnecessary, it notifies that the permission is no longer necessary to the change permitting unit 5601. When other application makes a permission request after the permission is issued, the change permitting unit 5601 compares which of two applications has a higher priority and decides which of the applications is permitted. In terms of the priorities of applications, the change permitting unit 5601 may refer to the priorities pre-assigned to the applications, which is as explained in the example of FIG. 20 in the first embodiment, or the application program 3100 may provide such information to the change permitting unit 5601. The OSD resolution managing unit 5602, the video resolution managing unit 5603 and the still resolution managing unit 5604, in addition to functions of the OSD resolution managing unit 3101, the video resolution managing unit 3102 and the still resolution managing unit 3103, do not accept a request from the application program 3100, which is not permitted by the change permitting unit 5601. By realizing the present embodiment, it becomes possible to clarify whether requests from multiple applications are accepted or not so that multiple applications can be operated at the same time.

Seventh Embodiment

With reference to diagrams, the following describes embodiment of a cable TV system according to the present invention. FIG. 1 is a block diagram that shows a relationship of an apparatus comprising a cable system, which includes a head end 101 and three terminal apparatuses A101, B112 and C113. In the present embodiment, three terminal apparatuses are connected to one head end. However, the present invention may also be embodied by having a designated number of terminal apparatuses that are connected to the head end.

The head end 101 sends a broadcasting signal of video, audio and data, etc. to a plural number of terminal apparatuses, and also receives data sent from the terminal apparatus. In order to realize this, a frequency bandwidth used for transmission between the head end 101 and terminal apparatuses A111, B112 and C113 is divided for use. FIG. 2 is a chart that shows an example of the divided frequency bandwidth. The bandwidth can be roughly divided into two types; Out Of Band (so-called OOB) and In-Band. 5 to 130 MHz are assigned to OOB, and mainly used for data communication between the head end 101 and terminal apparatuses A111, B112 and C113. 130 MHz to 864 MHz are assigned to the In-Band, and mainly used for a broadcasting channel that includes video and audio. A QPSK modulation method is used for OOB, and a QAM64 modulation method is used for In-Band. The modulation technology is a publicly known technology, which is not so closely tied up with the present invention, so that its detailed explanation is omitted here. FIG. 3 is an example of further detailed use of the OOB frequency bandwidth. 70 MHz to 74 MHz are used for data transmission from the head end 101, and all of the terminal apparatuses A111, B112 and C113 are supposed to receive the same data from the head end 101. On the other hand, 10.0 MHz to 10.1 MHz are used for data transmission from the terminal apparatus A111 to the head end 101, 10.1 MHz to 10.2 MHz are used for data transmission from the terminal apparatus B112 to the head end 101, and 10.2 MHz to 10.3 MHz are used for data transmission from the terminal apparatus C113 to the head end 101. By doing so, unique data in each terminal apparatus can be individually sent from each of the terminal apparatuses A111, B112 and C113 to the head end 101. FIG. 4 is an example showing how a frequency bandwidth of the In-Band is used. 150 to 156 MHz and 156 to 162 MHz are respectively assigned to a TV channel 1 and a TV channel 2, and following frequency bandwidths at intervals of 6 MHz are assigned to each corresponding TV channel. A frequency bandwidth of 310 MHz and bigger are respectively assigned to radio channels by each 1 MHz unit. Each of these channels may also used for analogue broadcasting or for digital broadcasting. For a case of the digital broadcasting, data is transmitted in a transport packet format based on MPEG 2 specifications, and also data for various data broadcasting can be sent in addition to audio and video.

The head end 101 contains a QPSK modulation unit and a QAM modulation unit, etc. for sending an appropriate broadcasting signal to these frequency bandwidths. Also, it is considered that the head end 101 has various devices related to these modulation units and demodulation units. However, because the present invention mainly relates to terminal apparatuses, its detailed explanation is omitted here.

The terminal apparatus A111, the terminal apparatus B112 and the terminal apparatus C113 receive and reproduce the broadcasting signal from the head end 101. Also, these apparatuses send unique data of each terminal apparatus to the head end 101. These three terminal apparatuses have the same structure in the present embodiment.

FIG. 5 is a block diagram that shows a hardware configuration of the terminal apparatus. 500 is a terminal apparatus that includes a QAM demodulation unit 501, a QPSK demodulation unit 502, a QPSK modulation unit 503, a TS decoder 505, an audio decoder 506, a speaker 507, a video decoder 508, a display 509, a secondary storage unit 510, a primary storage unit 511, a ROM 512, an input unit 513, a CPU 514, a still decoder 515, an OSD controlling unit 516, a video buffer 517, a still buffer 518, an OSD buffer 519, a video enlargement and reduction unit 520, a still enlargement and reduction unit 521, an OSD enlargement and reduction unit 522, a composing unit 523. Also, a POD 504 is installed to and detached from the terminal apparatus 500.

FIG. 6 is a thin shaped television as one of the examples for an outlook of the terminal apparatus 500.

601 is a steel case of the thin shaped television, which has all of structural components of the terminal apparatus 500 in it with an exception of the POD 504.

602 is a display, which is equivalent to the display 509 shown in FIG. 5.

603 is a front panel unit combining of a plural number of buttons, which is equivalent to the input unit 513 in FIG. 5.

604 is a signal input terminal that connects a cable for sending and receiving a signal to/from the head end 101. The signal input terminal is connected to the QAM demodulation unit 501, the QPSK demodulation unit 502 and the QPSK modulation unit 503.

605 is a POD card, which is equivalent to the POD 504 in FIG. 5. Just like the POD card 605 in FIG. 6, the POD 504 has an independent configuration from the terminal apparatus 500 and is attached to and detached from the terminal apparatus 500. Details of the POD 504 will be explained later.

606 is an insertion slot to which the POD card 605 is inserted.

With reference to FIG. 5, the QAM demodulation unit 501 demodulates a signal which has been QAM-modulated in and sent by the head end 101 according to tuning information containing a frequency designated from the CPU 514, and passes it to the POD 504.

The QPSK demodulation unit 502 demodulates a signal which has been QPSK-modulated in and sent by the head end 101 according to tuning information containing a frequency designated from the CPU 514, and passes it to the POD 504.

The QPSK modulation unit 503 QPSK-modulates a signal sent by the POD 504 according to modulation information containing a frequency designated from the CPU 514, and passes it to the head end 101.

The POD 504 has a configuration that is detachable from the terminal apparatus body 500 as shown in FIG. 6. A connection interface between the terminal body 500 and the POD 504 is defined in OpenCable™ HOST-POD Interface Specification (OC-SP-HOSTPOD-IF-I12-030210) and a specification document referred by this specification document. Here, its detail is omitted, and only the part concerned for the present invention is explained.

FIG. 7 is a block diagram that shows an internal configuration of the POD 504. The POD 504 includes a first descrambler unit 701, a second descrambler unit 702, a scrambler unit 703, a first storage unit 704, a second storage unit 705 and a CPU 706.

The first descrambler unit 701 receives a signal scrambled from the QAM demodulation unit 501 of the terminal apparatus 500 and descrambles it according to an instruction from the CPU 706. Then, the signal descrambled is sent to the TS decoder 505 of the terminal apparatus 500. Information necessary for decoding, such as a key, is provided from the CPU 706 as needed. To be more specific, the head end 101 broadcasts several paid channels. If a user subscribes this paid channel, the first descrambler unit 701 receives necessary information, such as a key, and descrambles its content so that the user can view the paid channel. If the necessary information, such as a key, is not provided, the first descrambler unit 701 does not execute the descrambling process, and sends the received signal as it is to the TS decoder 505.

According to an instruction from the CPU 706, the second descrambler unit 702 receives a signal scrambled from the QPSK demodulation unit 502 of the terminal apparatus 500 and descrambles it. Then, the second descrambler unit 702 passes the descrambled data to the CPU 706.

According to an instruction from the CPU 706, the scrambler unit 703 scrambles the data received from the CPU 706 and sends it to the QPSK modulation unit 503 of the terminal apparatus 500.

The first storage unit 704 is made up of a primary memory, which is specifically something like a RAM, etc. and is used for temporarily storing data when the CPU 706 executes a process.

The second storage unit 705 is made up of a secondary memory, which is specifically something like a flash ROM, etc., and is used for storing a program executed by the CPU 706, and also for saving data that should not be deleted even if its power is turned off.

The CPU 706 executes a program memorized in the second storage unit 705. The program is made up of a plural number of subprograms. FIG. 8 is a sample program memorized in the second storage unit 705. In FIG. 8, the program 800 is made up of a main program 801 and a plural number of subprograms such as an initialization subprogram 802, a network subprogram 803, a reproduction subprogram 804, a PPV subprogram 805, etc.

The PPV here is an acronym of Pay Per View, which is a service to allow specific programs such as movies to be viewed with a certain charge. When a user enters a personal identification number, his subscription is notified to the head end 101, and its scramble is removed for viewing. The user will pay the subscription fee later for this view.

The main program 801 is a subprogram started at first by the CPU 706 when the power is turned on, and controls other subprograms.

The initialization subprogram 802 is started by the main program 801 when the power is turned on, exchanges information, etc. with the terminal apparatus 500 and executes an initialization process. Details of the initialization process are defined in OpenCable™, HOST-POD Interface Specification (OC-SO-HOSTPOD-IF-I12-030210) and a specification document referred by this specification document. Also, an initialization process that is not defined in the specification is also executed. Here, a part of it is introduced. When the power is turned on, the initialization subprogram 802 notifies a first frequency memorized in the second storage unit 705 to the QPSK demodulation unit 502 through the CPU 514 of the terminal apparatus 500. The QPSK demodulation unit 502 executes a tuning process with the first frequency provided, and sends a signal to the second descrambler unit 702. Also, the initialization subprogram 802 provides descramble information such as a first key memorized in the second storage unit 705 to the second descrambler unit 702. As a result of it, the second descrambler unit 702 executes descrambling and passes the outcome to the CPU 706 that executes the initialization subprogram 802. Therefore, the initialization subprogram 802 can receive the information. In the present embodiment, the initialization subprogram 802 is supposed to receive the information via the network subprogram 803. Its detail will be explained later.

Additionally, the initialization subprogram 802 notifies the second frequency memorized in the second storage unit 705 to the QPSK demodulation unit 503 via the CPU 514 of the terminal apparatus 500. The initialization subprogram 802 provides scramble information memorized in the second storage unit 705 to the scrambler unit 703. When the information to be sent by the initialization subprogram 802 is provided to the scrambler unit 703 via the network subprogram 803, the scrambler unit 703 scrambles the data using the scramble information provided and passes it to the QPSK demodulation unit 503 of the terminal apparatus 500. The QPSK demodulation unit 503 demodulates the scrambled information provided and sends it to the head end 101.

As a result of this, the initialization subprogram 802 is capable of conducting interactive communications with the head end 101 through the terminal apparatus 500, the second descrambler unit 702, the scrambler unit 703 and the network subprogram 803.

The network subprogram 803 is a subprogram for conducting interactive communications with the head end 101, which is used by a plural number of subprograms such as the main program 801 and the initialization subprogram 802. To be more specific, it acts like having interactive communications with the head end 101 through TCP/IP for other subprograms that use the network subprogram 803. TCP/IP is a well known technology that stipulates a protocol for information exchanges between a plural number of apparatuses, and its detail explanation is omitted here. The initialization subprogram 802 is started when the power is turned on, and the network subprogram 803 notifies a MAC address (an acronym of Media Access Control address), which is an identifier identifying POD 504 memorized by the second storage unit 705 in advance, and request to obtain the IP address. The head end 101 notifies the IP address to the POD 504 via the terminal apparatus 500, and the network subprogram 803 memorizes the IP address in the first storage unit 704. From this point, the head end 101 and the POD 504 use this IP address as an identifier of the POD 504, and conducts communications.

The reproduction subprogram 804 provides descramble information such as a second key, etc., which is memorized in the second storage unit 705, and descramble information such as a third key, etc., which is provided from the terminal apparatus 500, to the first descrambler unit 701, and enables a descrambling process. Also, it receives via the network subprogram 803 information that the signal entered in the first descrambler unit 701 is a PPV channel. When it recognizes that it is PPV channel, it starts the PPV subprogram 805.

When the PPV subprogram 805 is started, it displays a message to prompt subscription of a program on the terminal apparatus 500, and receives the user's input. To be more specific, when information to be displayed on a screen is sent to the CPU 514 of the terminal apparatus 500, a program that activates on the CPU 514 of the terminal apparatus 500 displays a message on the display 509 of the terminal apparatus 500. When the user enters a personal identification number through the input unit 513 of the terminal apparatus 500, the CPU 514 of the terminal apparatus 500 receives it and notifies it to the PPV subprogram 815 that activates on the CPU 706 of the POD 504. The PPV subprogram 805 sends the received personal identification number to the head end 101 via the network subprogram 803. When the personal identification number is correct, the head end 101 notifies descramble information such as a fourth key, which is necessary for descramble, to the PPV subprogram via the network subprogram 803. The PPV subprogram 805 provides the received the descramble information such as the fourth key to the first descrambler unit 701, and the first descrambler unit 701 descrambles the entered signal.

With reference to FIG. 5, the TS decoder 505 filters the signal received from the POD 504, and provides necessary data to the audio decoder 506, the video decoder 508 and the CPU 514. The signal coming from the POD 504 here is an MPEG2 transport stream. Details of the MPEG2 transport stream are described in the IOS/IEC13818-1 as an MPEG standard document, and their explanation is omitted here in the present embodiment. The MPEG 2 transport stream is made up of a plural number of fixed length packets, and a packet ID is assigned to each packet. FIG. 9 is a packet configuration diagram. 900 is a packet structured in a fixed length of 188 bytes. The first 4 bytes are a header 901 that stores packet identification information, and the remaining 184 bits are a payload 902 that contains information to be sent. 903 is a breakdown of the header 901. The packet ID is contained in 13 bits from the 12th bit to the 24th bit. FIG. 10 is a pattern diagram that expresses a plural number of packet columns to be sent. A packet 1001 has a packet ID "1" in its header and a payload contains first information of video A. A packet 1002 has a packet ID "2" in its header and a payload contains first information of audio A. A packet 1003 has a packet ID "3" in its header and the payload contains first information of audio B.

A packet 1004 has a packet ID "1" in its header, a payload contains second information of the video A, which is the subsequent information of the packet 1001. In a similar way to this, packets 1005, 1026 and 1027 contain subsequent data of other packets. In a way like this, when contents of the packet payloads containing the same packet ID are concatenated, continued video or audio can be reproduced.

With reference to FIG. 10, when the CPU 514 designates the packet ID "1" and a "video decoder 508" as an output destination to the TS decoder 505, the TS decoder 505 extracts a packet with the packet ID "1" from the MPEG 2 transport stream received from the POD 504, and passes it to the video decoder 508. In FIG. 10, only the video data is passed to the video decoder 508. At the same time, when the CPU 514 designates the packet ID "2" and the "audio decoder 506" to the TS decoder 505, the TS decoder 505 extracts a packet with the packet ID "2" from the MPEG2 transport stream received from the POD 504, and passes it to the audio decoder 506. In FIG. 10, only the audio data is passed to the audio decoder 506.

A process to extract only a necessary packet according to this packet ID is a filtering process conducted by the IS decoder 505. The TS decoder 505 can executes a plural number of filtering processes designated from the CPU 514 at the same time.

With reference to FIG. 5, the audio decoder 506 concatenates audio data embedded in the packets of MPEG2 transport stream provided from the TS decoder 505, executes digital-analog conversion, and outputs it to a speaker 507.

The speaker 507 outputs a signal provided from the audio decoder 506 as audio.

The video decoder 508 decodes the video data, which is embedded in the packet of the MPEG2 transport stream provided from the TS decoder 505, using the provided video resolution, and stores the decoded video data into the video buffer 517. Here, the provided video resolution is passed from the video resolution managing unit 3102 to be described later to the video decoder 508, which then stores the received video resolution into the video buffer 517.

Furthermore, when no video resolution is provided to the video decoder 508, a default video resolution is used.

It is also possible that the video resolution managing unit 3102 stores the video resolution into the video buffer 517 and the video decoder 508 refers to such video resolution stored in the video buffer 517 so as to decode it at the time of decoding.

Also, the video decoder 508 reads video information such as the resolution of video data and a ratio of height and width of the video, e.g. 4 to 3 or 16 to 9, and detects any changes in the video information. The information detected is notified to the video format resolution change detecting unit 3104, which is explained later.

The still decoder 515 decodes MPEG-I frame data (also referred to as still data), which is designated from the CPU 514, using the provided still resolution, and stores the decoded still data into the still buffer 518. Here, the provided still resolution is passed from the still resolution managing unit 3103 to be described later to the still decoder 515, which then stores the received still resolution into the still buffer 518. When no still resolution is provided to the still decoder 515, a default still resolution is used.

It is also possible that the still resolution managing unit 3103 stores the still resolution into the still buffer 518, and the still decoder 515 refers to such still resolution stored in the still buffer 518 so as to decode it at the time of decoding. Because details of the MPEG2-I frame are described in ISO/IEC13818-2 as an MPEG standard document, its detailed explanation is omitted here in the present embodiment.

The OSD controlling unit 516 stores, into the OSD buffer 519, OSD data (also referred to as graphics data) which is designated from the CPU 514, using the provided OSD resolution. Alternatively, the OSD controlling unit 516 transfers, to the OSD buffer 519, the contents of the off-screen buffer of the primary storage unit 511 at high speed in which characters and graphics are drawn while performing alpha blending. Refer to DVB-MHP specification for details on alpha blending. Here, the provided OSD resolution is passed from the OSD resolution managing unit 3101 to be described later to the OSD controlling unit 516, which then stores the received OSD resolution into the OSD buffer 519. When no OSD resolution is provided to the OSD controlling unit 516, a default OSD resolution is used.

Furthermore, it is also possible that the OSD resolution managing unit 3101 stores the OSD resolution into the OSD buffer 519.

Also, the components of the OSD controlling unit 516 may be implemented as software and components implemented as hardware may be deleted.

The video buffer 517, a concrete constituent element of which is a memory and the like, is a buffer for storing a video resolution provided to the video decoder 508 as well as video data decoded by the video decoder 508. Note that the video resolution is provided from the video resolution managing unit 3102 to be described later.

The still buffer 518, a concrete constituent element of which is a memory and the like, is a buffer for storing a still resolution provided from the still decoder 515 as well as still data decoded by the still decoder 515. Note that the still resolution is provided from the still resolution managing unit 3103 to be described later.

The OSD buffer 519, a concrete constituent element of which is a memory and the like, is a buffer for storing an OSD resolution provided from the OSD controlling unit 516 as well as OSD data transferred from the OSD controlling unit 516. Note that the OSD resolution is provided from the OSD resolution managing unit 3101 to be described later.

According to a provided enlargement/reduction ratio, the video enlargement and reduction unit 520 enlarges or reduces the video data stored in the video buffer 517, and passes the resultant to the composing unit 523. Here, such enlargement/reduction ratio is passed from the video resolution managing unit 3102 to be described later. When no enlargement/reduction ratio is provided, a default enlargement/reduction ratio is used.

According to a provided enlargement/reduction ratio, the still enlargement and reduction unit 521 enlarges or reduces the still data stored in the still buffer 518, and passes the resultant to the composing unit 523. Here, such enlargement/reduction ratio is passed from the still resolution managing unit 3103 to be described later. When no enlargement/reduction ratio is provided, a default enlargement/reduction ratio is used.

According to a provided enlargement/reduction ratio, the OSD enlargement and reduction unit 522 enlarges or reduces the OSD data stored in the OSD buffer 519, and passes the resultant to the composing unit 523. Here, such enlargement/reduction ratio is passed from the OSD resolution managing unit 3101 to be described later. When no enlargement/reduction ratio is provided, a default enlargement/reduction ratio is used.

The composing unit 523 follows a Z order of each buffer designated from the CPU 514, and superposes the video data passed from the video enlargement and reduction unit 520, the still data passed from the still enlargement and reduction unit 521 and the OSD data passed from the OSD enlargement and reduction unit 522, and outputs the resultant to the display 509. In order to explain the Z order of each buffer designated from the CPU 514, a general TV receiver has three layered structure, which has an OSD buffer displaying characters and graphics, a video buffer displaying video, and a still buffer displaying a still image, and its order of the superposition is called as Z order. For example, with reference to FIG. 57, if 5701 is a first buffer viewed at a front side from a viewer, 5702 is a second buffer that is located at a back side of 5701, and 5703 is a third buffer that is located at the furthest back, there are six possible combinations as described in FIG. 58.

The display 509 is, to be more specific, made up of a cathode-ray tube, a liquid crystal display, etc., which outputs a video signal provided from the video decoder 508, and displays a message designated from the CPU 514.

The secondary memory 510, to be more specific, is made up of a flash memory, hard disk, etc., which stores and deletes data or programs designated from the CPU 514. Also, the data the programs stored are referred to by the CPU 514. The data and the programs stored remain to be stored even if the power of the terminal apparatus 500 is turned off.

The primary storage unit 511 is, to be more specific, made up of RAM, etc., which temporarily stores and deletes data and programs designated by the CPU 514. Additionally, the data and the programs stored are referred by the CPU 514. The data and the programs stored are cleared when the power of the terminal apparatus 500 is turned off.

ROM 512 is a memory device that cannot be rewritten, which is, to be more specific, made up of ROM, CD-ROM, DVD, etc. The ROM 512 stores a program executed by the CPU 514.

The input unit 513 is, to be more specific, made up of a front panel and a remote controller, which accepts an input from the user. FIG. 11 is an example for a case that the input unit 513 is made up of the front panel. 1100 is a front panel, which is equivalent to the front panel 603 in FIG. 6. The front panel 1100 includes 7 buttons, an up cursor button 1101, a down cursor button 1102, a left cursor button 1103, a right cursor button 1104, an OK button 1105, a cancel button 1106 and an EPG button 1107. When the user presses one of the buttons, an identifier of the pressed button is notified to the CPU 514.

The CPU 514 executes a program memorized in the ROM 512. According to the program executed, the CPU 514 controls the QAM demodulation unit 501, the QPSK demodulation unit 502, the QPSK modulation unit 503, the POD 504, the TS decoder 505, the display 509, the secondary storage unit 510, the primary storage unit 511 and the ROM 512.

FIG. 12 is an example of a configuration diagram for the program memorized in the ROM 512 and executed by the CPU 514.

A program 1200 is made up of a plural number of subprograms, which is, to be more specific, made up of an OS 1201, an EPG 1202, a lava VM 1203, a service manager 1204 and a Java library 1205.

The OS 1201 is a subprogram that is started by the CPU 514 when the power of the terminal apparatus 500 is turned on. The OS 1201 is an abbreviation of Operation System, and its example is Linux, etc. The OS 1201 is a generic name for a publicly well-known technology made up of a kernel 1201a, which concurrently executes other subprograms, and a library 1201b, and its detailed explanation is omitted here. In the present embodiment, the kernel 1201a of the OS 1201 executes the EPG 1202 and the Java VM 1203 as a subprogram. Also, the library 1201b provides a plural number of functions for controlling structural elements held by the terminal apparatus 500 for these subprograms.

As one of the functions, a tuning function is introduced here. With the tuning function, tuning information that includes a frequency is received from other subprograms, and passed to the QAM demodulation unit 501. Accordingly, it becomes possible for the QAM demodulation unit 501 to execute a demodulation process based on the provided tuning information, and to pass the demodulated data to the POD 504. As a result of this, other subprogram can control the QAM demodulator via the library 1201b.

The EPG is made up of a program display unit 1202a that displays a list of programs to the user and accepts an input from the user, and a reproduction unit 1202b that select a channel. The EPG stated here is an acronym of Electric Program Guide.

When the power of the terminal apparatus 500 is turned on, the EPG 1202 is started by the kernel 1201a. Within the EPG 1202 started, the program display unit 1202a waits for an input from the user via the input unit 513 of the terminal apparatus 500. When the input unit 513 is made up of a front panel indicated in FIG. 11 and the user presses the EPG button 1107 of the input unit 513, an identifier of the EPG button is notified to the CPU 514. The program display unit 1202a of the EPG 1202, which is a subprogram activated on the CPU 514, receives this identifier, and displays program information on the display 509. FIG. 13 (1) and FIG. 13 (2) are examples of program charts displayed on the display 509. With reference to FIG. 13 (1), the display 509 displays the program information in a grid pattern. Time schedule information is displayed in a column 1301. A channel name "Channel 1" and a program shown in a time zone corresponding to the time schedule in the column 1301 are displayed in a column 1302. It shows that a program called "News 9" is televised from 9:00 to 10:30 and a program called "Movie AAA" is televised from 10:30 to 12:00 on the "Channel 1". In the same way as the column 1302, a channel name "Channel 2" and a program shown in a time zone corresponding to the time schedule in the column 1301 are shown in a column 1303. It shows that a program called "Movie BBB" is televised from 9:00 to 11:00 and a program called "News 11" is televised from 11:00 to 12:00. 1330 is a cursor. The cursor 1330 is moved by pressing the left cursor 1103 and the right cursor 1104 on the front panel 1100. In a situation of FIG. 13 (1), the cursor 1330 is moved to a right side when the right cursor 1104 is pressed down, which is as shown in FIG. 13 (2). Also, in a situation of FIG. 13 (2), the cursor 1330 is moved to a left side when the left cursor 1103 is pressed down, which is as shown in FIG. 13 (1).

In a situation of FIG. 13 (1), when an OK button 1105 of the front panel 1100 is pressed down, the program display unit 1202a notifies an identifier of the "Channel 1" to the reproduction unit 1202b. In a situation of FIG. 13 (2), when the OK button 1105 of the front panel 1100 is pressed down, the program display unit 1202a notifies an identifier of the "Channel 2" to the reproduction unit 1202b.

Also, the program display unit 1202a memorizes the displaying program information in the primary storage unit 511 from the head end 101 on a regular basis via the POD 504. Generally speaking, acquirement of the program information from the head end takes time. When the EPG button 1107 of the input unit 513 is pressed down, a program chart can be quickly displayed by displaying the program information pre-stored in the primary storage unit 511.

The reproduction unit 1202b reproduces a channel using the received identifier of the channel. Relationship between the channel identifier and the channel is pre-stored in the secondary storage unit 510 as channel information. FIG. 14 is an example of channel information stored in the secondary storage unit 510. The channel information is stored in a tabular form. A column 1401 is a channel identifier. A column 1402 is a channel name. A column 1403 is tuning information. The tuning information here includes frequencies, transmission rates, coding rates, etc., which are values provided to the QAM demodulation unit 501. A column 1404 is a program number. The program number here is a number that identifies PMT stipulated in the MPEG2 standard. PMT will be explained later. Each line from the line 1411 to the line 1414 is a set of each channel identifier, channel name and tuning information. The line 1411 is a set that includes "1" as the identifier, "Channel 1" as the channel name, a frequency "150 MHz" for the tuning information and "101" as the program number. For reproducing the channel, the reproduction unit 1202b passes the received channel identifier to the service manager as it is.

Also, when the user presses down the up cursor 1101 and the down cursor 1102 during reproduction, the reproduction unit 1202b receives the pressed notification via the CPU 514 from the input unit 513 and changes the channel being reproduced. At first, the reproduction unit 1202b memorizes, in the primary storage unit 511, an identifier of the channel currently being reproduced. FIG. 15 (1), FIG. 15 (1) and FIG. 15 (3) are examples of identifiers of channels stored in the primary storage unit 511. FIG. 15 (1) shows an identifier "3" is memorized, and with reference to FIG. 14, it shows that a channel of a channel name called "TV 3" is being reproduced. In a situation of FIG. 15 (1), when the user presses down the up cursor 1101, the reproduction unit 1202b refers to the channel information of FIG. 14 and passes an identifier "2" of a channel name "Channel 2" to the service manager for switching the channel to reproduce a channel name called "Channel 2", which is a previous channel in the chart. At the same time, the channel identifier "2" memorized in the primary storage unit 511 is rewritten. FIG. 15 (2) shows a situation that the channel identifier is rewritten. Also, in a state of FIG. 15 (1), when the user presses down the down cursor 1102, the reproduction unit 1202b refers to channel information in FIG. 14, and passes an identifier "4" of a channel name called "TV Japan" to the service manage for switching the channel to reproduce the channel name called "TV Japan", which is a next channel in the chart. At the same time, the channel identifier "4" memorized in the primary storage unit 511 is rewritten. FIG. 15 (3) shows a state when the channel identifier is rewritten.

Java VM 1203 is a Java virtual machine that consecutively analyzes and executes a program described in a Java™ language. The program described in the Java language is compiled into intermediate codes called as byte codes, which are not depended on hardware. The Java virtual machine is an interpreter that executes these byte codes. Also, a part of the Java virtual machine translates the byte codes into an execution format, which is comprehensive to the CPU 514, and passes it to the CPU 514, which executes it. Java VM 1203 is started when the kernel 1201a specifies the Java program to be executed. In the present embodiment, the kernel 1201a specifies the service manager 1204 as a Java program to be executed. Details of the Java language are described in many books such as a book called "Java Language Specification (ISBN 0-201-63451-1)". Its details are omitted here. Also, detailed actions taken by Java VM itself are described in many books such as a book called "Java Virtual Machine Specification (ISBN 0-201-63451-X). Its details are omitted here.

The service manager 1204 is a Java program written in the Java language, and consecutively executed by the Java VM 1203. It is possible for the service manager 1204 to call up or to be called by other subprograms that are not described in the Java language, via JNI (Java Native Interface). JNI is also described in many books such as a book called "Java Native Interface". Its details are omitted here.

The service manager 1204 receives a channel identifier from the reproduction unit 1202b via the JNI.

The service manager 1204 at first passes the channel identifier to a tuner 1205c located in the Java library 1205 and requests for tuning. The tuner 1205c refers to channel information memorized in the secondary storage unit 510 and acquires tuning information. Now, when the service manager 1204 passes a channel identifier "2" to the tuner 1205c, the tuner 1205c refers to a line 1412 in FIG. 14, and acquires corresponding tuning information "156 MHz". The tuner 1205c passes the tuning information to the QAM demodulation unit 501 via the library 1201b of the OS 1201. According to the provided tuning information, the QAM demodulation unit 501 demodulates a signal sent from the head end 101, and passes it to the POD 504.

Next, the service manager 1204 requests descrambling to CA 1205d in the Java library 1205. The CA 1205d provides information necessary for descramble to the POD 504 via the library 1201b of OS 1201. Based on the information provided, the POD 504 descrambles the signal provided from the QAM demodulation unit 501 and passes it to the TS decoder 505.

Next, the service manager 1204 provides an identifier of the channel to JMF 1205a in the Java library 1205, and requests reproduction of video and audio.

At first, the JMF 1205a acquires a packet ID from PAT and PMT for specifying the video and the audio to be reproduced. PAT and PMT are tables describing program structure in the MPEG2 transport stream, which is stipulated in the MPEG2 standards. They are embedded in the payload of the packet included in the MPEG2 transport stream, and sent with the audio and the video. Please see the standard manual for its details. Only the outline is explained here. PAT is an acronym of Program Association Table, stored in the packet of the packet ID "0" and sent. To acquire PAT, the JMF 1205a designates the packet ID "0" and the CPU 514 to the TS decoder 505 via the library 1201b of OS 1201. The JMF 1205a collects packets of PAT by having the TS decoder 505 execute a filtering process with the packet ID "0" and pass it to the CPU 514. FIG. 16 is a table describing a typical example of PAT information collected. A column 1601 is a program number. A column 1602 is a packet ID. The packet ID in the column 1602 is used to acquire PMT. Lines 1611 to 1613 are a set of a program number of the channel and its corresponding packet ID. Three channels are defined here in this table. A set of a program number "101" and a packet ID "501" is defined in a line 1611. Suppose the channel identifier provided to the JMF 1205a is "2", the JMF 1205a acquires "102" as its corresponding program number with reference to a line 1412 in FIG. 14, and then acquires a packet ID "502" corresponding to the program number "102" with reference to the line 1612 in the PAT described in FIG. 14. The PMT is an abbreviation of Program Map Table, which is stored in the packet of the packet ID stipulated by the PAT and sent. To acquire the PMT, the JMF 1205a designates the packet ID and the CPU 514 to the TS decoder 505 via the library 1201b of OS 1201. Suppose the packet ID designated here is "502". The JMF 1205a collects packets of PMT by having the TS decoder 505 execute a filtering process with the packet ID "502" and pass it to the CPU 514. FIG. 17 is a table describing a typical example of PMT information collected. A column 1701 is a stream type, and a column 1702 is a packet ID. In a packet of the packet ID designated by the column 1702, information designated by the stream type is stored in a payload and sent. A column 1703 is supplemental information. Columns 1711 to 1714 are a set of a packet ID called as an elementary stream and a type of information being sent. The column 1711 is a set of a stream type "audio" and a packet ID "5011", which shows that audio is stored in a payload of the packet ID "5011". The JMF 1205a acquires packet IDs of video and audio reproduced from the PMT. With reference to FIG. 17, the JMF 1205a acquires a packet ID "5011" for audio from the line 1711, and a packet ID "5012" for video from the line 1712.

Next, the JMF 1205a provides a set of the acquired audio packet ID and an audio decoder 506 as its output destination and the acquired video packet ID and a video decoder 508 as its output destination to the TS decoder 505 via the library 1201b of the OS 1201. The TS decoder 505 executes a filtering process based on the provided packet IDs and their output destinations. Here, the packet of the packet ID "5011" is provided to the audio decoder 506, and the packet of the packet ID "5012" is provided to the video decoder 508. The audio decoder 506 executes digital-analogue conversion for the packet provided, and reproduces the audio via a speaker 507. The video decoder 508 stores the video data, which is embedded in the packet of the MPEG2 transport stream provided from the TS decoder 505, into a video buffer 517.

According to an enlargement and reduction command directed from the CPU 514, the video enlargement and reduction unit 520 enlarges or reduces the data stored in the video buffer 517 and passes it to the composing unit 523.

According to the Z order directed from the CPU 514, the composing unit 523 superposes the data provided from the video enlargement and reduction unit 520, the data provided from the still enlargement and reduction unit 521, and the data provided from the OSD enlargement and reduction unit 522, and outputs it to the display 509.

Finally, the service manager 1204 provides a channel identifier to the AM 1205b located in the Java library 1205, and requests data broadcasting reproduction. The data broadcasting reproduction here means to extract a Java program contained in the MPEG2 transport stream and to have the JavaVM 1203 execute the program. Regarding a method to embed a Java program into the MPEG2 transport stream, a method called as DSMCC described in an MPEG standard document ISO/IEC 13818-6 is used. Its detailed explanation for DSMCC is omitted here. The DSMCC method stipulates a method for encoding a file system, which is made up of a directory and a file used in a computer, into a packet of the MPEG2 transport stream. Also, the information of the Java program executed in a style called AIT is embedded into the packet of the MPEG2 transport stream and sent. The AIT is an abbreviation of Application Information Table, which is defined in Chapter 10 of DVB-MHP standard (formally, ETSI TS 101 812 DVB-MHP specifications V1.0.2).

The AM 1205*b* at first acquires the PAT and the PMT in the same way as the JMF 1205*a* for acquiring the AIT, and then acquires the packet ID of the packet where the AIT is stored. Suppose an identifier of the provided channel is "2" now, and the PAT in FIG. 16 and the PMT in FIG. 17 are sent, it acquires the PMT in FIG. 17 in the same procedures as the one for the JMF 1205*a*. The AM 1205*b* extracts a packet ID, which has "data" as its stream type and "AIT" as its supplemental information, from the elementary stream. With reference to FIG. 17, the AM 1205*b* acquires the packet ID "5013" since the elementary stream in the line 1713 is applicable.

The AM 1205*b* provides the packet ID of the AIT and the CPU 514 as its output destination to the TS decoder 505 via the library 1201*b* of the OS 1201. A filtering process is executed with the TS decoder 505 and the provided packet ID, and a processed outcome is passed to the CPU 514. As a result of this, the AM1205*b* can collect the packet of the AIT. FIG. 18 is a table, which describes a typical example of the AIT information collected. A column 1801 is an identifier of the Java program. A column 1802 is control information of the Java program. There are "autostart", "present", "kill", etc. as the control information. The "autostart" means that a terminal apparatus 500 automatically and immediately executes this program, the "present" means that the terminal apparatus 500 does not automatically execute the program, and the "kill" means that the terminal apparatus 500 stops the program. A column 1803 is a DSMCC identifier for extraction a packet ID containing the Java program in a DSMCC method. A column 1804 is a program name of the Java program. The lines 1811 and 1812 are a set of the Java program information. The Java program defined in the line 1811 is a set of an identifier "301", control information "autostart", a DSMCC identifier "1", and a program name "a/TopXlet". The Java program defined in the line 1812 is a set of an identifier "302", control information "present", a DSMCC identifier "1", and a program name "b/GameXlet". These Java programs here contain the same DSMCC identifier. It means that two Java programs are contained in a file system that is encoded in one DSMCC method. Although only four types of information are stipulated for the Java program here, there will be more information defined in practice. Please see DVB-MHP standards for details.

The AM 1205*b* finds out the Java program of "autostart" within the AIT, and extracts its corresponding DSMCC identifier and Java program name. With reference to FIG. 18, the AM 1205*b* extracts the Java program in the line 1811, and acquires the DSMCC identifier "1" and the Java program name "a/TopXlet".

Next, the AM 1205*b* acquires the packet ID of the packet, which stores the Java program in the DSMCC method, from the PMT using the DSMCC identifier acquired from the AIT. To be more specific, the AM 1205*b* acquires the packet ID of the elementary stream, which has "data" as its stream type and a matching DSMCC identifier in the supplemental information.

Suppose that the DSMCC identifier is now "1", and the PMT is just as described in FIG. 17, the elementary stream in a line 1714 is matched with the condition so that the packet ID "5014" is extracted.

The AM 1205*b* designates a packet ID of the packet, where data is embedded into the TD decoder 505 in the DSMCC method, and the CPU 514 as its output destination via the library 1201*b* of the OS 1201. The packet ID "5014" is provided here. A filtering process is executed with the TS decoder 505 and the provided packet ID and its processed outcome is passed to the CPU 514. As a result of this, the AM 1205*b* can collect necessary packets. The AM 1205*b* restores a file system according to the DSMCC method from the collected packets, and stores it in the primary storage unit 511. Hereinafter, actions to take out the data such as file systems from the packet in the MPEG2 transport stream and to store it in a memorizing mean such as the primary storage unit 511 are referred to as "download".

FIG. 19 is an example of a file system downloaded. In the figure, a circle indicates a directory, a square indicates a file, 1901 is a root directory, 1902 is a directory "a", 1903 is a directory "b", 1904 is a file "TopXlet.class", and 1905 is a file "GameXlet.class".

Next, the AM 1205*b* passes the Java program executed from the file system downloaded to the primary storage unit 511 to the JavaVM 1203. Suppose the Java program name executed now is "a/TopXlet", a file "a/TopXlet.class" where ".class" is added to an end of the Java program name is the file to be executed. "/" is a delimiter of a directory and/or a file name, which is the Java program that should be executed by the file 1904 with reference to FIG. 19. Next, the AM 1205*b* provides the file 1904 to the Java VM 1203.

The Java VM 1203 executes the provided Java program.

Once the service manager 1204 receives an identifier of another channel, it stops execution of the Java program and video and audio, which are being reproduced through each library contained in the Java library 1205, and via each library contained in the same Java library 1205, conducts the Java program and reproduced video and audio based on the newly received channel identifier.

The Java library 1205 is a set of a plural number of Java libraries stored in a ROM 512. In the present embodiment, the Java library 1205 here contains JMF 1205*a*, AM 1205*b*, Tuner 1205*c*, CA 1205*d*, POD Lib 1205*e*, a resolution switching unit 1205*f*, AWT 1205*g*, STL 1205*h*, etc.

The POD Lib 1205*e* provides functions to acquire information from the POD 504 and to control the POD 504 via the library 1201*b* and the CPU 514.

The resolution switching unit 1205*f* provides a function to control the video decoder 508, the video enlargement and reduction unit 520, the still decoder 515, the still enlargement and reduction unit 521, the OSD enlargement and reduction unit 516, and the OSD enlargement and reduction unit 522 through the CPU 514. Details are described later.

The AWT 1205*g* accepts a rendering instruction from the Java program. Based on the accepted instruction, the AWT 1205*g* draws characters and graphics in the OSD buffer by sending necessary information to the OSD controlling unit 516. As a specific example for a rendering process, there is a process for rendering a line or rendering a square, which is a publicly known technology realized in a class and interface specifications stipulated in a Java.awt package. Therefore, its detailed explanation is omitted here. Note that when drawing characters and graphics, the AWT 1205*g* may once obtain the off-screen memory from the primary storage unit 511, and transfer the contents of the off screen to the OSD controlling unit 516 after drawing characters and graphics in the obtained off-screen buffer.

The STL 1205h accepts MPEG-I frame data displayed from the Java program and its display position. The STL 1205h passes the accepted MPEG-I frame data and its display position to the still decoder 515. The still decoder 515 decodes the MPEG-I frame data to the provided display position, and stores it into the still buffer 518. By doing so, the Java program can draw pictures in the still buffer.

FIG. 24 is a flowchart related to a video display process. The TS decoder 505 transfers video data to the video decoder 508 (S2401). The video decoder 508 decodes the transferred video data, and stores its outcome into the video buffer 517 (S2402). The video decoder 508 decides whether there is an instruction of enlargement and reduction regarding the video display from the CPU 514 or not (S2403). If there is the instruction of enlargement and reduction, the video enlargement and reduction unit 520 executes the enlargement and reduction process to the data being stored in the video buffer 517 (S2404), and transfers it to the composing unit 523 (S2405). If there is no instruction of enlargement and reduction, the video enlargement and reduction unit 520 transfers the data being stored in the video buffer 517 to the composing unit 523 (S2405).

FIG. 25 is a flowchart related to a still display process. MPEG2-I frame data is provided from the CPU 514 to the still decoder 515 (S2501). The still decoder 515 decodes the provided MPEG2-I frame data, and stores the outcome into the still buffer 518 (S2502). The still decoder 515 decides whether there is an instruction of enlargement and reduction regarding the still display from the CPU 514 (S2503). When there is the instruction of enlargement and reduction, the still enlargement and reduction unit 521 executes the enlargement and reduction process to the data being stored in the still buffer 518 (S2504), and it transfers it to the composing unit 523 (S2505). When there is no instruction of enlargement and reduction, the still enlargement and reduction unit 521 transfers the data being stored in the still buffer 518 to the composing unit 523.

FIG. 26 is a flowchart related to the display process of OSD. Character and graphics data is provided from the CPU 514 to the OSD controlling unit 516 (S2601). The OSD controlling unit 516 builds up the video in the OSD buffer 519 based on the provided characters and graphics data (S2602). The OSD controlling unit 516 decides whether there is an instruction of enlargement and reduction related to the display of OSD from the CPU 514 (S2603). If there is the instruction of enlargement and reduction, the OSD enlargement and reduction unit 522 executes the enlargement and reduction process to the data being stored in the OSD buffer 519 (S2604), and transfers it to the composing unit 523 (S2605). If there is no instruction of enlargement and reduction, the OSD enlargement and reduction unit 522 transfers the data being stored in the OSD buffer 519 to the composing unit 523.

Here, the image of enlargement and reduction is explained with reference of an example. Like 2801 of FIG. 28, when data of 720 pixels in width and 480 pixels in height is enlarged in size, i.e. enlarged to 960 pixels in width and 540 pixels in height, it becomes just as shown in 2802 of FIG. 28.

Figures 57, 58:
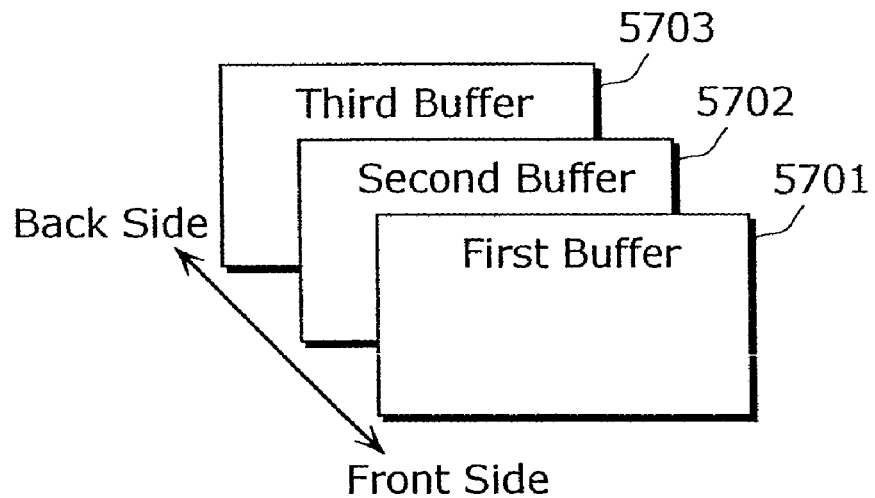
FIG. 57 is a diagram showing a positional relationship among the first, second, and third buffers.
FIG. 58 is a diagram showing an exemplary pattern of combinations related to the Z order of the first to third buffers.
Figure 59:
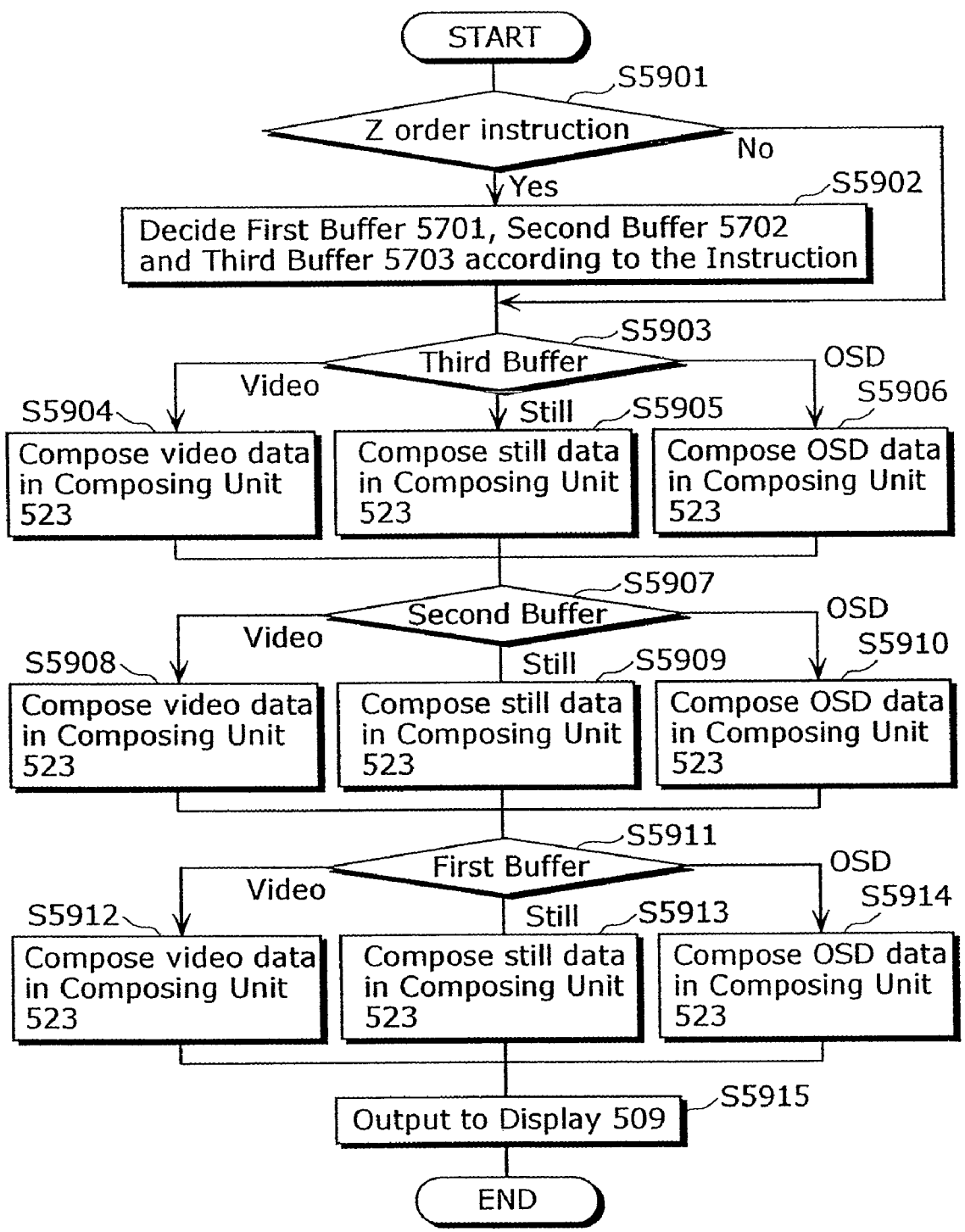
FIG. 59 is a flowchart related to processing of composing the video generated according to the flowchart in FIG. 24, the still generated according to the flowchart in FIG. 25, and the OSD generated according to the flowchart in FIG. 26.

FIG. 59 is a flowchart related to a composing process for the video generated in the flowchart shown in FIG. 24, the still generated in the flowchart shown in FIG. 25 and the OSD generated in the flowchart shown in FIG. 26. The composing unit 523 decides whether there is a change instruction of Z order from the CPU 514 (S5901) or not. If there is a change instruction, it decides which of buffers, the video buffer 517, the still buffer 518 or the OSD buffer 519 is applicable to the first buffer 5701, the second buffer 5702 and the third buffer 5703 according to the change instruction (S5902). If there is no change instruction, the previous Z order is followed. A combination of the Z order is one of fix pattern combinations as indicated in FIG. 58. Next, the composing unit 523 decides which of the buffers, the video buffer 517, the still buffer 518 or the OSD buffer 519 is applicable to the buffer relevant to the third buffer, which is located at the furthest back (S5903). When the buffer is the video buffer 517, video data is composed in the composing unit 523 (S5904). When the buffer is the still buffer 518, still data is composed in the composing unit 523 (S5905). When the buffer is the OSD buffer 519, OSD data is composed in the composing unit 523 (S5906). For example, for a case that the image of composed data is 2901 of FIG. 29, the image after the composing process is just as 3001 of FIG. 30. Next, the composing unit 523 decides which of the buffers, the video buffer 517, the still buffer 518 or the OSD buffer 519 is applicable to the buffer relevant to the second buffer (S5907). When the buffer is the video buffer 517, video data is composed in the composing unit 523 (S5908). When the buffer is the still buffer 518, still data is composed in the composing unit 523 (S5909). When the buffer is the OSD buffer 519, OSD data is composed in the composing unit 523 (S5910). For example, when the image of the composed data is 2902 of FIG. 29, the image after the composing process is just as shown in 3002 of FIG. 30. Next, the composing unit 523 decides which of the buffers, the video buffer 517, the still buffer 518 or the OSD buffer 519 is applicable to the buffer relevant to the first buffer, which is located at the foreground (S5911). When the buffer is the video buffer 517, video data is composed in the composing unit 523 (S5912). When the buffer is the still buffer 518, still data is composed in the composing unit 523 (S5913). When the buffer is the OSD buffer 519, OSD data is composed in the composing unit 523 (S5914). For example, for a case that the image of composed data is 2903 of FIG. 29, the image after the composing process is just as shown in 3003 of FIG. 30. Finally, a result of the composing process is output and displayed on the display 509 (S5915).

The following explains downloading and saving the Java program as well as display actions of the Java program.

The service manager 1204 conducts interactive communications with the head end 101 through the POD Lib 1205e contained in the Java library 1205. This interactive communication is realized by using the QPSK demodulation unit 502 and the QPSK modulation unit 503 via the library 1201b and the POD 504 of the OS 1201.

The service manager 1204 receives Java program information, which should be saved by the terminal apparatus 500 in the secondary storage unit 510, from the head end 101 by using this communication. This information called as XAIT information. The XAIT information is sent in a discretional form between the head end 101 and the POD 504. Whatever the sending form is chosen, the present invention is executable as long as the information necessary for the XAIT is contained.

FIG. 20 is a chart describing a typical example of the XAIT information obtained from the head end 101. A column 2001 is a Java program identifier. A column 2002 is control information of the Java program. There is "autoselect", "present" and so on as the control information, and "autoselect" means to execute this program automatically when the terminal apparatus 500 is powered on, and "present" means not to execute this program. A column 2003 is a DSMCC identifier for extracting a packet ID containing the Java program in the DSMCC method. A column 2004 is a program name of the Java program. A column 2005 is a priority of the Java program. Lines 2011 and 2012 are a set of Java program information. The Java program defined in the line 2011 is a set of the identifier "701", the control information "autoselect", the DSMCC identifier "1", the program name "a/Banner1Xlet". Here, there are five types of information stipulated for the Java program. However, the present invention is executable even if more information is defined.

When the service manager 1204 receives the XAIT information, it saves a file system in the primary storage unit 511 from the MPEG2 transport stream in the same procedure as the procedure to download the Java program from the AIT information. And then, the file system saved is copied to the secondary storage unit 510. However, it is also possible to download the file system directly to the secondary storage unit 510 without having the process done through the primary storage unit 511. Next, the service manager 1204 saves XAIT information in the secondary storage unit 510 by linking it to a storage location of the downloaded file system. FIG. 21 shows an example of how the XAIT information and the downloaded file system are linked and saved in the secondary storage unit 510. Explanation for elements in FIG. 21 having the same number as those elements in FIG. 20 is omitted here. A column 2101 stores a saving location of the corresponding file system downloaded. In the diagram, the saving location is indicated with a column. 2110 is the downloaded file system, which internally holds a top directory 2111, a directory "a" 2112, a directory "b" 2113, a file "Banner1Xlet.class" 2114 and a file "Banner2Xlet.class" 2115.

Here, the XAIT information is saved after the Java program is saved. However, the XAIT information may be saved before the Java program is saved.

After the terminal 500 is turned on, the OS 1201 designates the service manager 1204 to the JavaVM 1203. After the JavaVM 1203 activates the service manager 1204, the service manager 1204 at first refers to the XAIT information saved in the secondary storage unit 510. Here, the service manager 1204 refers to the control information of each Java program, provides the program of "autoselect" to the JavaVM 1203 and activates it. With reference to FIG. 21, the Java program "Banner1Xlet" defined in the line 2011 is activated.

Once the Java program "Banner1Xlet" is activated, the Java program "Banner1Xlet" designates to display an OSD to the CPU 514 when the Java program "Banner1Xlet" displays characters and graphics. The CPU 514 provides the characters and the graphics to the OSD controlling unit 516, and the OSD display process is executed, and finally the OSD buffer 519 is composed with the video buffer 517 and the still buffer 518, and the resultant is displayed on the display 509.

Next, the following describes a video resolution switching function, which is the main function of the present invention. FIG. 31 is a configuration diagram of the video resolution switching function.

An application program 3100 is, for example, an application such as a Java program called "Banner1Xlet".

A resolution switching unit 1205f contains an OSD resolution managing unit 3101, a video resolution managing unit 3102, a still resolution managing unit 3103, a video format resolution change detecting unit 3104 and a resolution selection deciding unit 3105, and serves as a video resolution switching function.

The OSD resolution managing unit 3101 manages the resolution of the OSD buffer 519. The OSD resolution managing unit 3101 has a function to accept a change request of the current resolution of the OSD buffer 519 from the application program 3100, and a function to notify a change in the resolution of the OSD buffer 519 to the application program 3100. When the change request of the resolution of the OSD buffer 519 is accepted, the OSD resolution managing unit 3101 notifies it to the resolution selection deciding unit 3105.

The video resolution managing unit 3102 manages the resolution of the video buffer 517. The video resolution managing unit 3102 has a function to accept a change request of the current resolution of the video buffer 517 from the application program 3100, and a function to notify a change in the resolution of the video buffer 517 to the application program 3100. When the change request of the resolution of the video buffer 517 is accepted, the video resolution managing unit 3102 notifies it to the resolution selection deciding unit 3105.

The still resolution managing unit 3103 manages the resolution of the still buffer 518. The still resolution managing unit 3103 has a function to accept a change request of the current resolution of the still buffer 518 from the application program 3100, and a function to notify a change in the resolution of the still buffer 518 to the application program 3100. When the change request of the resolution of the still buffer 518 is accepted, the still resolution managing unit 3103 notifies it to the resolution selection deciding unit 3105.

When the resolution of the video format received by the video decoder 508 is different from the resolution of the video format previously decoded, the video format resolution change detecting unit 3104 notifies it to the resolution selection deciding unit 3105.

The resolution selection deciding unit 3105 selects the resolution of each buffer considering a combination of buffers that can be displayed on the TV receiver when one of the following cases occurs: a case there is a change request for the current resolution of the OSD buffer 519 to the OSD resolution managing unit 3101; a case there is a change request for the current resolution of the video buffer 517 to the video resolution managing unit 3102; a case there is a change request for the current resolution of the still buffer 518 to the still resolution managing unit 3103; or a case there is a change request of the resolution of the video format from the video format resolution change detecting unit 310. The following explains the combinations that can be displayed. The TV receiver is in three layered structure, i.e. the OSD buffer 519 that displays characters and graphics, the video buffer 517 that displays video, and the still buffer 518 that displays still images, and there are displayable combinations of these buffers. For example, combinations such as those described in FIG. 60 and FIG. 61 are available. While the TV receiver displays each of the buffers in a combination of 2 (6002) indicated in FIG. 60, the video resolution of the video format received by the video decoder 508 may be changed to 1920 pixels in width and 1080 pixels in height and the screen ratio of that may be changed to 16:9. If that is the case, the resolution of each buffer may be changed to a combination 4 (6004) according to the video format. The combinations of each buffer indicated in FIG. 60 and FIG. 61 are memorized in the secondary storage unit 510, the primary storage unit 511 or the ROM 512. Suppose that the combinations of each buffer are now stored in the ROM 512, it means that the resolution selection deciding unit 3105 refers to the ROM 512 when considering the best combination to be displayed, and selects the most optimum combination according to a specific set of rules from the available combinations.

Figure 62:
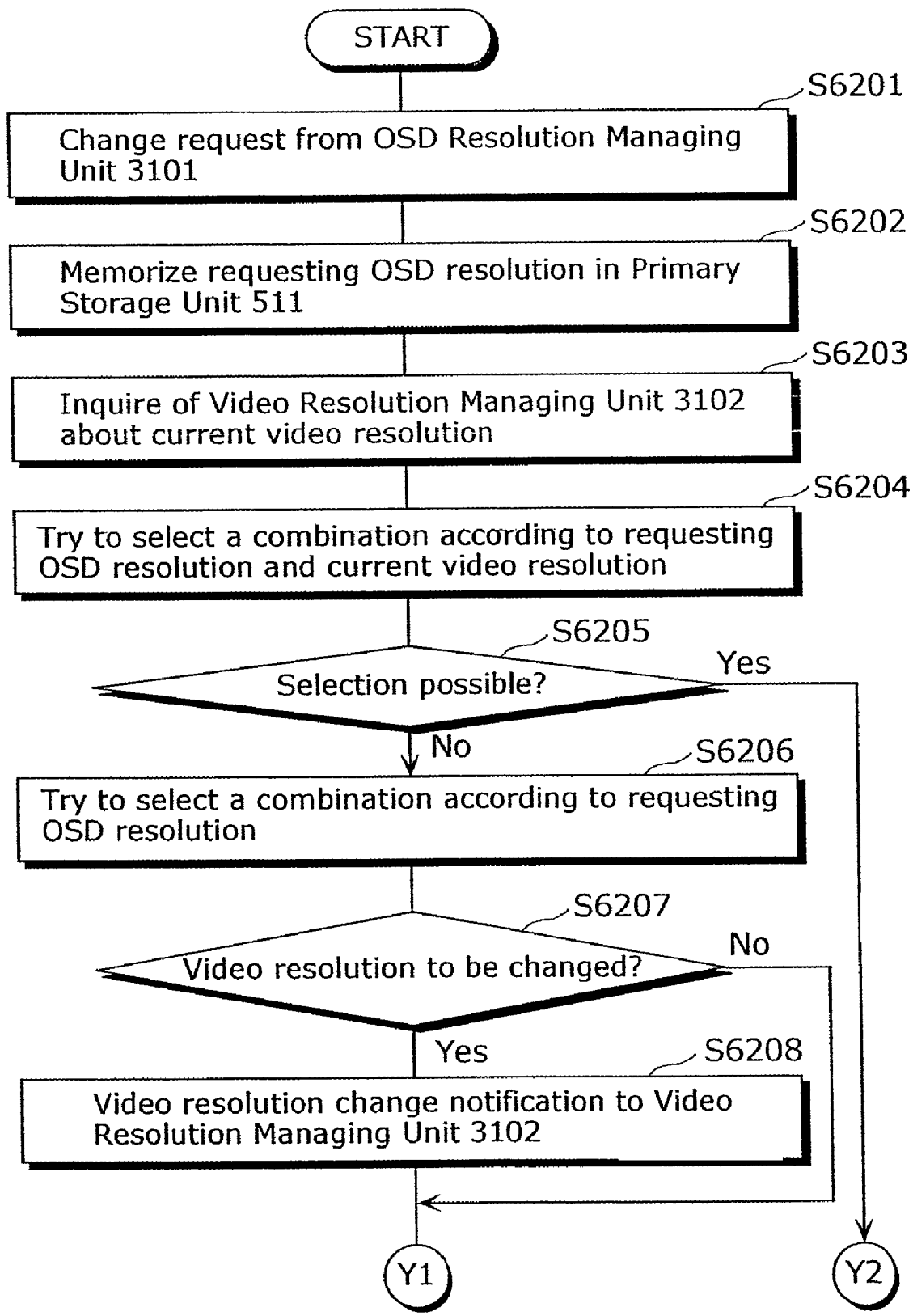
FIG. 62 is a flowchart showing processing performed by the resolution selection deciding unit in the case where the OSD resolution managing unit receives a resolution change request of the current OSD buffer.
Figure 63:
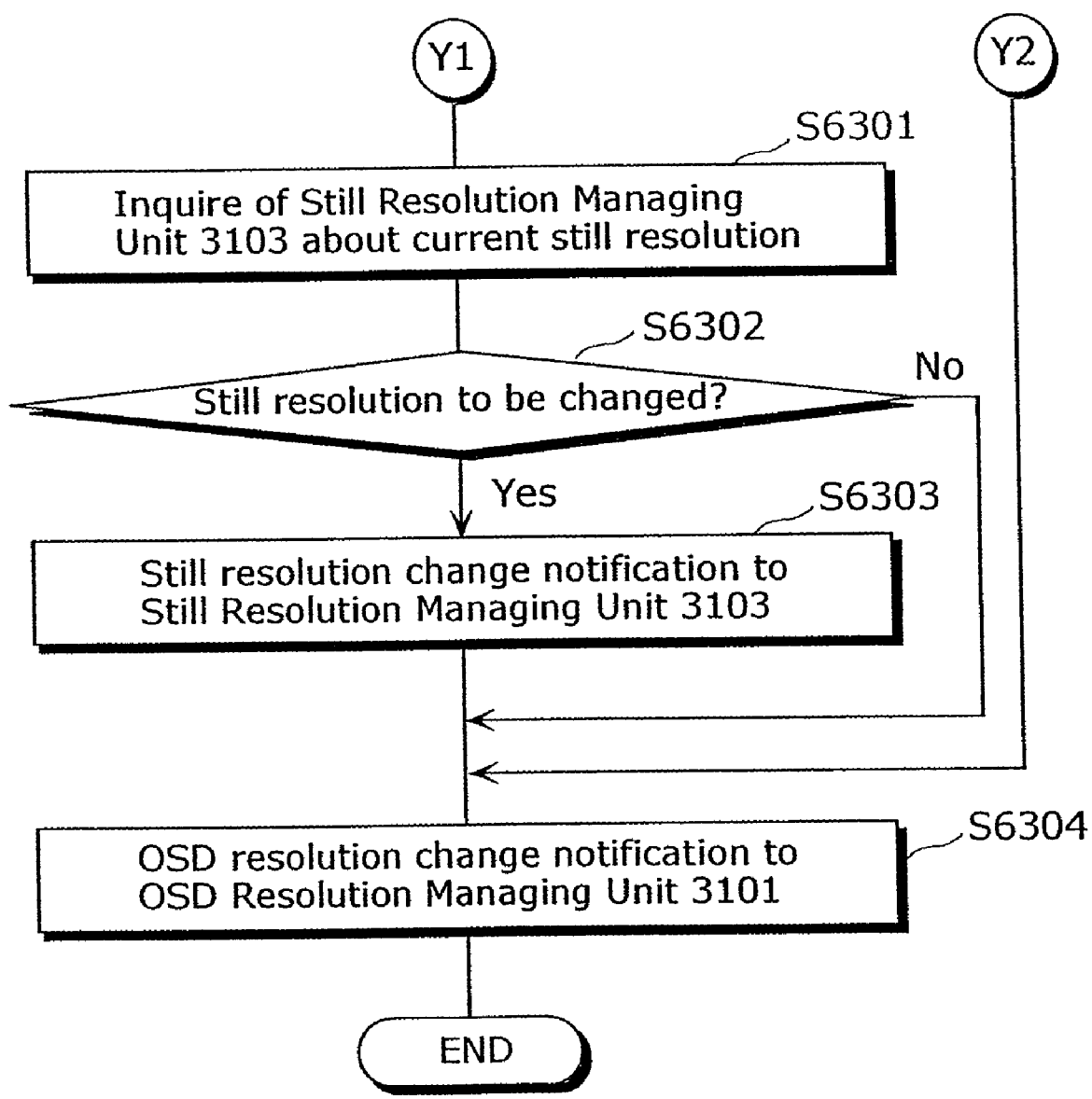
FIG. 63 is a flowchart showing processing performed by the resolution selection deciding unit in the case where the OSD resolution managing unit receives a resolution change request of the current OSD buffer (continued from FIG. 62)

FIG. 62 and FIG. 63 are flowcharts showing the operation of the resolution selection deciding unit 3105 in the case where the OSD resolution managing unit 3101 receives a change request for changing the current resolution of the OSD buffer 519. The OSD resolution managing unit 3101 passes the OSD resolution to the resolution selection deciding unit 3105 to make a change request (S6201). The resolution selection deciding unit 3105 stores, into the primary storage unit 511, the OSD resolution which is requested to be changed (S6202). Next, the resolution selection deciding unit 3105 inquires of the video resolution managing unit 3102 about the current video resolution so as to obtain it (S6203). Then, the resolution selection deciding unit 3105 tries to select, from plural combinations of OSD buffer resolution and video buffer resolution shown in FIG. 60 and FIG. 61, a set that matches the OSD resolution requested to be changed and the current video resolution (S6204). Then, the resolution selection deciding unit 3105 decides whether the selection in S6204 is possible or not (S6205).

When deciding in S6205 that the selection is possible, the resolution selection deciding unit 3105 conducts an OSD resolution change notification to the OSD resolution managing unit 3101 (S6304).

Meanwhile, when deciding in S6205 that the selection is not possible, the resolution selection deciding unit 3105 tries to select, from plural combinations shown in FIG. 60 and FIG. 61, a set that matches the resolution of the OSD buffer and the OSD resolution requested to be changed (S6206). Next, the resolution selection deciding unit 3105 compares the video resolution in the selected set with the current video resolution to see if they match or not, and decides whether the video resolution is to be changed or not (S6207). Only when deciding in S6207 that the video resolution is to be changed, the resolution selection deciding unit 3105 conducts a video resolution change notification to the video resolution managing unit 3102 (S6208). Next, the resolution selection deciding unit 3105 inquires of the still resolution managing unit 3103 about the current still resolution so as to obtain it (S6301). Then, the resolution selection deciding unit 3105 compares the still resolution in the selected set with the current still resolution to see if they match or not, and decides whether the still resolution is to be changed or not (S6302). Only when deciding in S6301 that the still resolution is to be changed, the resolution selection deciding unit 3105 conducts a still resolution change notification to the still resolution managing unit 3103 (S6303). Then, the resolution selection deciding unit 3105 conducts an OSD resolution change notification to the OSD resolution managing unit 3101 (S6304).

Here, when the changed resolution of the video buffer 517 is different from the resolution of the video decoded by the video decoder 508, the video decoder 508 enlarges or reduces the video in accordance with the changed resolution of the video buffer 517, and stores the resultant into the video buffer 517.

According to the resolution of the OS buffer, the video enlargement and reduction unit 520 enlarges or reduces the video data stored in the video buffer 517. Assuming that a set that includes the changed resolutions is a combination 8 (6104) shown in FIG. 61, for example, the resolution of the OSD buffer 519 is 960*540, and the resolution of the video buffer 517 and the resolution of the still buffer 518 are 1920*1080. Therefore, the video enlargement and reduction unit 520 reduces the video data stored in the video buffer 517 from 1920*1080 to 960*540, and the still enlargement and reduction unit 521 reduces the still data stored in the still buffer 518 from 1920*1080 to 960*540. As a result, the resolutions of video, still, and OSD become the same, making it possible for the composing unit 523 to perform composing processing.

Note that, in the above examples, although the video enlargement and reduction unit 520 and the still enlargement and reduction unit 521 perform enlargement or reduction processing in accordance with the resolution of the OSD buffer 519, it is also possible that the still enlargement and reduction unit 521 and the OSD enlargement and reduction unit 522 perform enlargement or reduction processing in accordance with the resolution of the video buffer 517, or that the video enlargement and reduction unit 520 and the OSD enlargement and reduction unit 522 perform enlargement or reduction processing in accordance with the resolution of the still buffer 518.

As described above, the displayable combinations of resolutions for the video buffer 517, the still buffer 518 and the OSD buffer 519 contain enlargement and reduction information that stipulates actions of the video enlargement and reduction unit 520, the still enlargement and reduction unit 521 and the OSD enlargement and reduction unit 522. Or, the enlargement and reduction information may be memorized explicitly in the secondary storage unit 510, the primary storage unit 511, the ROM 512, etc. by associating the information to the displayable combinations of resolutions for the video buffer 517, the still buffer 518, and the OSD buffer 519. The enlargement and reduction information may be specifically defined respectively for each of the video enlargement and reduction unit 520, the still enlargement and reduction unit 521 and the OSD enlargement and reduction unit 522. Or, it may be stipulated as common resolution that should be output to the composing unit 523 by the video enlargement and reduction unit 520, the still enlargement and reduction unit 521 and the OSD enlargement and reduction unit 522. Also, by adding a common resolution designating unit that designates this common resolution, the resolution of the video, the OSD and the still, which are output to the composing unit 523, may be easily changed. For the common resolution designating unit here, the resolution may be designated by an application program or designated by the resolution selection deciding unit 3105.

Also, the resolution selection deciding unit 3105 directs enlargement and reduction to the video enlargement and reduction unit 520, the still enlargement and reduction unit 521 and the OSD enlargement and reduction unit 522.

Figure 64:
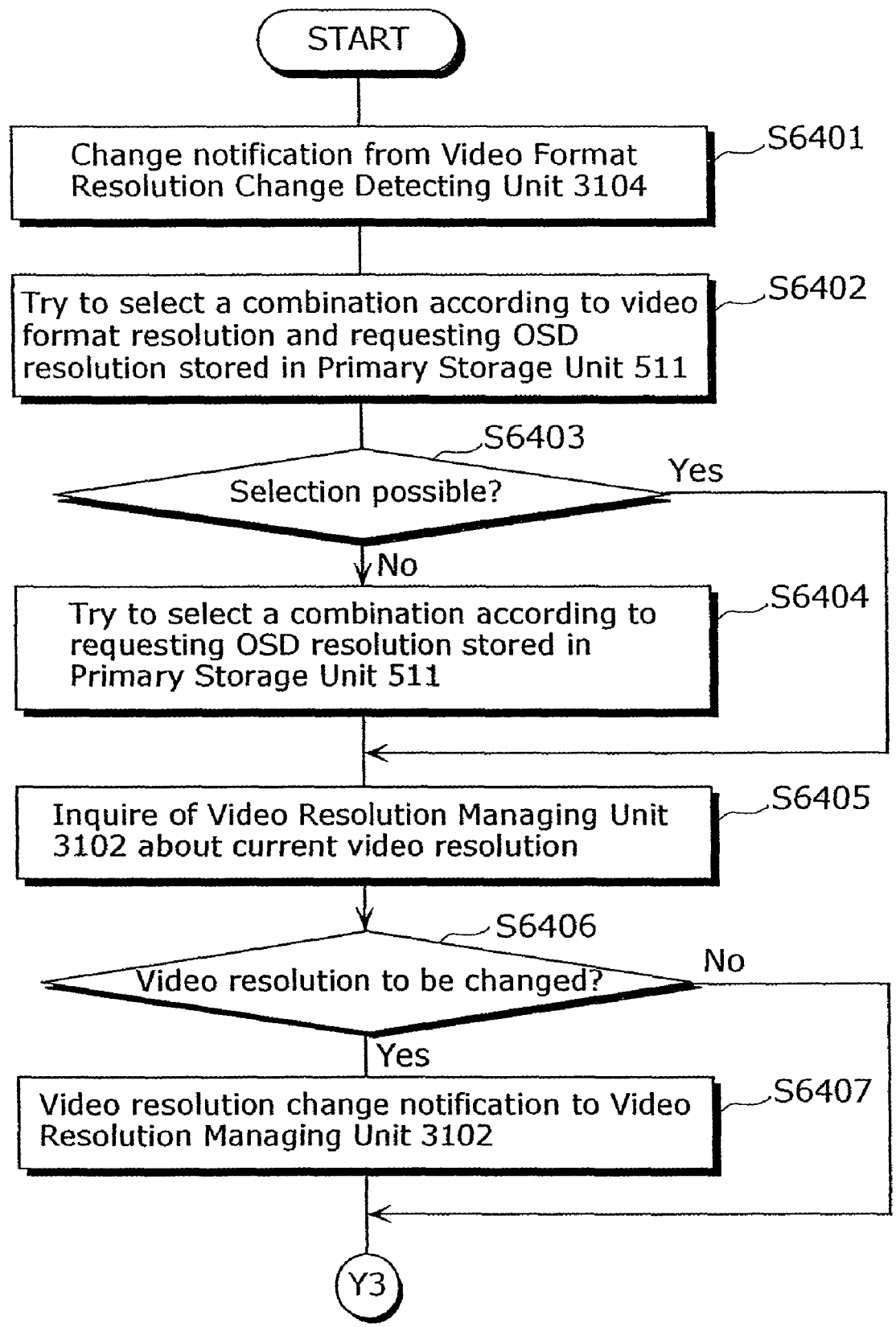
FIG. 64 is a flowchart showing processing performed by the resolution selection deciding unit in the case where the resolution of the video format received by the video decoder is different from the resolution of the previously decoded video format.
Figure 65:
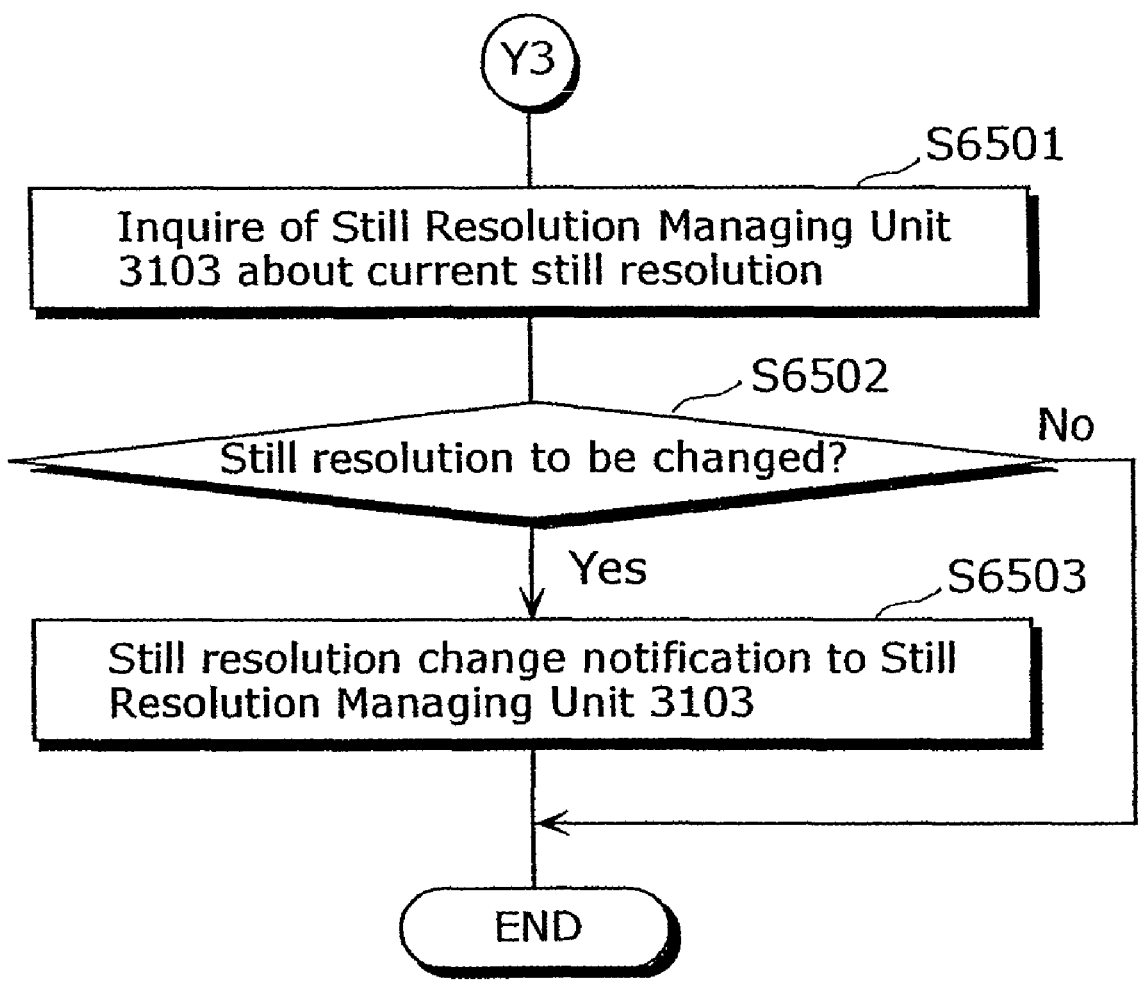
FIG. 65 is a flowchart showing processing performed by the resolution selection deciding unit in the case where the resolution of the video format received by the video decoder is different from the resolution of the previously decoded video format (continued from FIG. 64)

FIG. 64 and FIG. 65 are flowcharts of the resolution selection deciding unit 3105 for a case that the resolution of the video format received by the video decoder 508 is different from the resolution of the video format that has been decoded before. The video format resolution change detecting unit 3104 notifies the video format resolution change to the resolution selection deciding unit 3105 (S6401).

The resolution selection deciding unit 3105 tries to select, from plural combinations of OSD buffer resolution and video buffer resolution shown in FIG. 60 and FIG. 61, a set that matches the notified video format resolution and the OSD resolution that is requested to be changed and that is stored in the primary storage unit 511 (S6402). Then, the resolution selection deciding unit 3105 decides whether the selection in S6402 is possible or not (S6403), and only when deciding in S6403 that the selection is not possible, the resolution selection deciding unit 3105 tries to select, from the combinations shown in FIG. 60 and FIG. 61, a set that matches the resolution of the OSD buffer and the OSD resolution that is requested to be changed and that is stored in the primary storage unit 511 (S6404).

Next, the resolution selection deciding unit 3105 inquires of the video resolution managing unit 3102 about the current video resolution so as to obtain it (S6405). Then, the resolution selection deciding unit 3105 compares the video resolution in the selected set with the current video resolution to see if they match or not, and decides whether the video resolution is to be changed or not (S6406). Only when deciding in S6406 that the video resolution is to be changed, the resolution selection deciding unit 3105 conducts a video resolution change notification to the video resolution managing unit 3102 (S6407).

Next, the resolution selection deciding unit 3105 inquires of the still resolution managing unit 3103 about the current still resolution so as to obtain it (S6501). Then, the resolution selection deciding unit 3105 compares the still resolution in the selected set with the current still resolution to see if they match or not, and decides whether the still resolution is to be changed or not (S6502). Only when deciding in S6502 that the still resolution is to be changed, the resolution selection deciding unit 3105 conducts a still resolution change notification to the still resolution managing unit 3103 (S6503).

Figure 66:
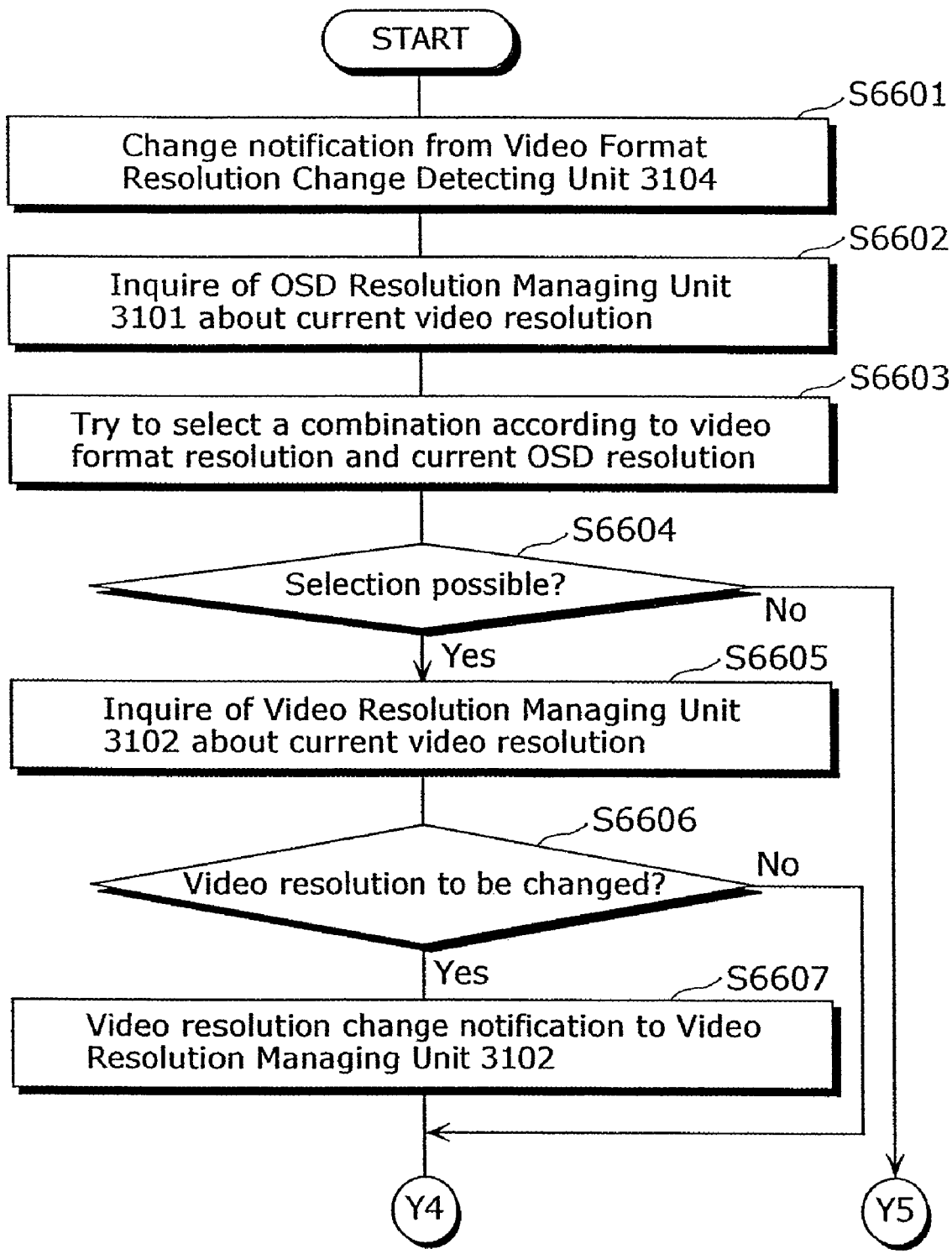
FIG. 66 is another flowchart showing processing performed by the resolution selection deciding unit in the case where the resolution of the video format received by the video decoder is different from the resolution of the previously decoded video format.
Figure 67:
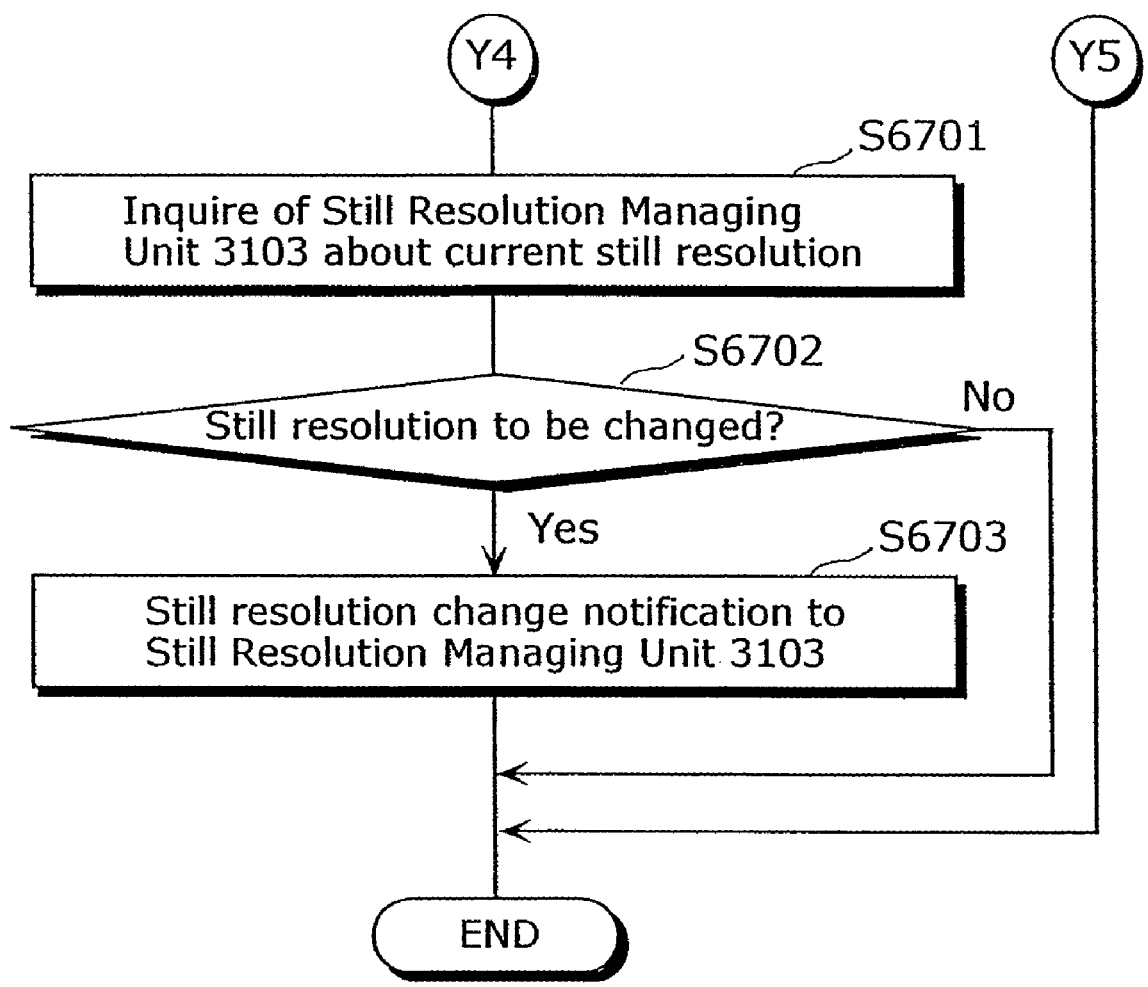
FIG. 67 is another flowchart showing processing performed by the resolution selection deciding unit in the case where the resolution of the video format received by the video decoder is different from the resolution of the previously decoded video format (continued from FIG. 66)

Furthermore, as the operation of the resolution selection deciding unit 305 in the case where the resolution of the video format received by the video decoder 508 is different from the resolution of the previously decoded video format, the contents of the flowcharts shown in FIG. 66 and FIG. 67 may be employed.

The video format resolution change detecting unit 3104 conducts a video resolution change notification to the resolution selection deciding unit 3105 (S6601).

The resolution selection deciding unit 3105 inquires of the OSD resolution managing unit 3101 about the current OSD resolution so as to obtain it (S6602). Then, the resolution selection deciding unit 3105 tries to select, from plural combinations of OSD buffer resolution and video buffer resolution shown in FIG. 60 and FIG. 61, a set that matches the notified video format resolution and the current OSD resolution (S6603). Then, the resolution selection deciding unit 3105 decides whether the selection in S6603 is possible or not (S6604).

When deciding in S6604 that the selection is possible, the resolution selection deciding unit 3105 inquires of the video resolution managing unit 3102 of the current video resolution so as to obtain it (S6605). Next, the resolution selection deciding unit 3105 compares the video resolution in the selected set with the current video resolution to see if they match or not, and decides whether the video resolution is to be changed or not (S6606). Only when deciding in S6606 that the video resolution is to be changed, the resolution selection deciding unit 3105 conducts a video resolution change notification to the video resolution managing unit 3102 (S6607). Next, the resolution selection deciding unit 3105 inquires of the still resolution managing unit 3103 about the current still resolution so as to obtain it (S6701). Then, the resolution selection deciding unit 3105 compares the still resolution in the selected set with the current still resolution to see if they match or not, and decides whether the still resolution is to be changed or not (S6702). Only when deciding in S6702 that the still resolution is to be changed, the resolution selection deciding unit 3105 conducts a still resolution change notification to the still resolution managing unit 3103 (S6703).

Figure 68:
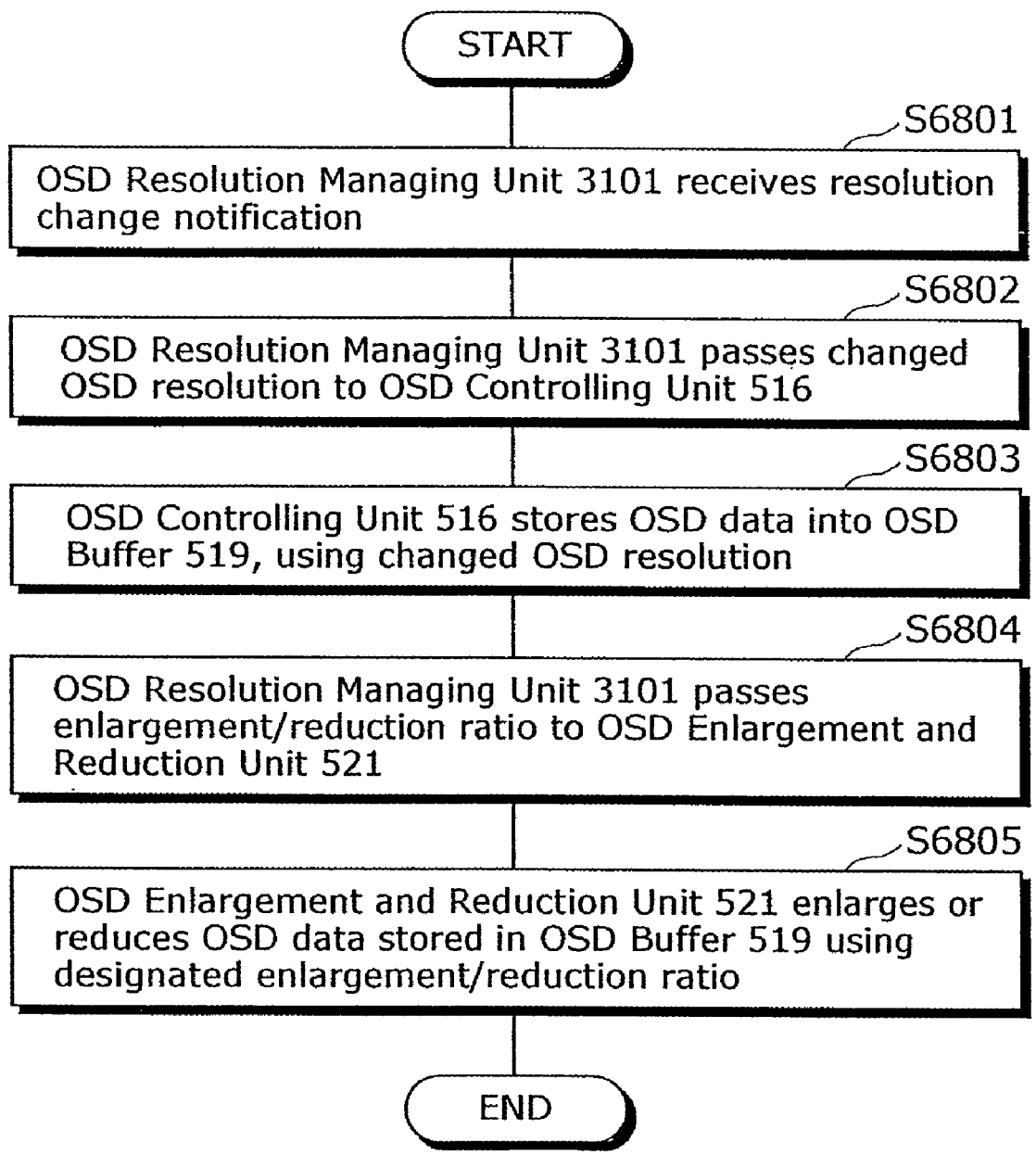
FIG. 68 is a flowchart in the case where the OSD resolution managing unit receives a resolution change notification.

FIG. 68 is a flowchart in the case where the OSD resolution managing unit 3101 receives a resolution change notification. The OSD resolution managing unit 3101, upon receipt of a resolution change notification (S6801), passes the changed OSD resolution to the OSD controlling unit 516 (S6802). The OSD controlling unit 516 stores such changed OSD resolution into the OSD buffer 519, and transfers the OSD data to the OSD buffer 519, which stores it (S6803). In order to compose the OSD buffer 519, the video buffer 517 and the still buffer 518, the OSD resolution managing unit 3101 passes an enlargement/reduction ratio to the OSD enlargement and reduction unit 522 (S6804). The OSD enlargement and reduction unit 522 enlarges or reduces the OSD data stored in the OSD buffer 519 using the passed enlargement/reduction ratio (S6805). Note that it is also possible that the OSD resolution managing unit 3101 stores the changed OSD resolution into the OSD buffer 519, and the OSD controlling unit 516 refers to the OSD resolution stored in the OSD buffer 519 so as to transfer the OSD data.

Figure 69:
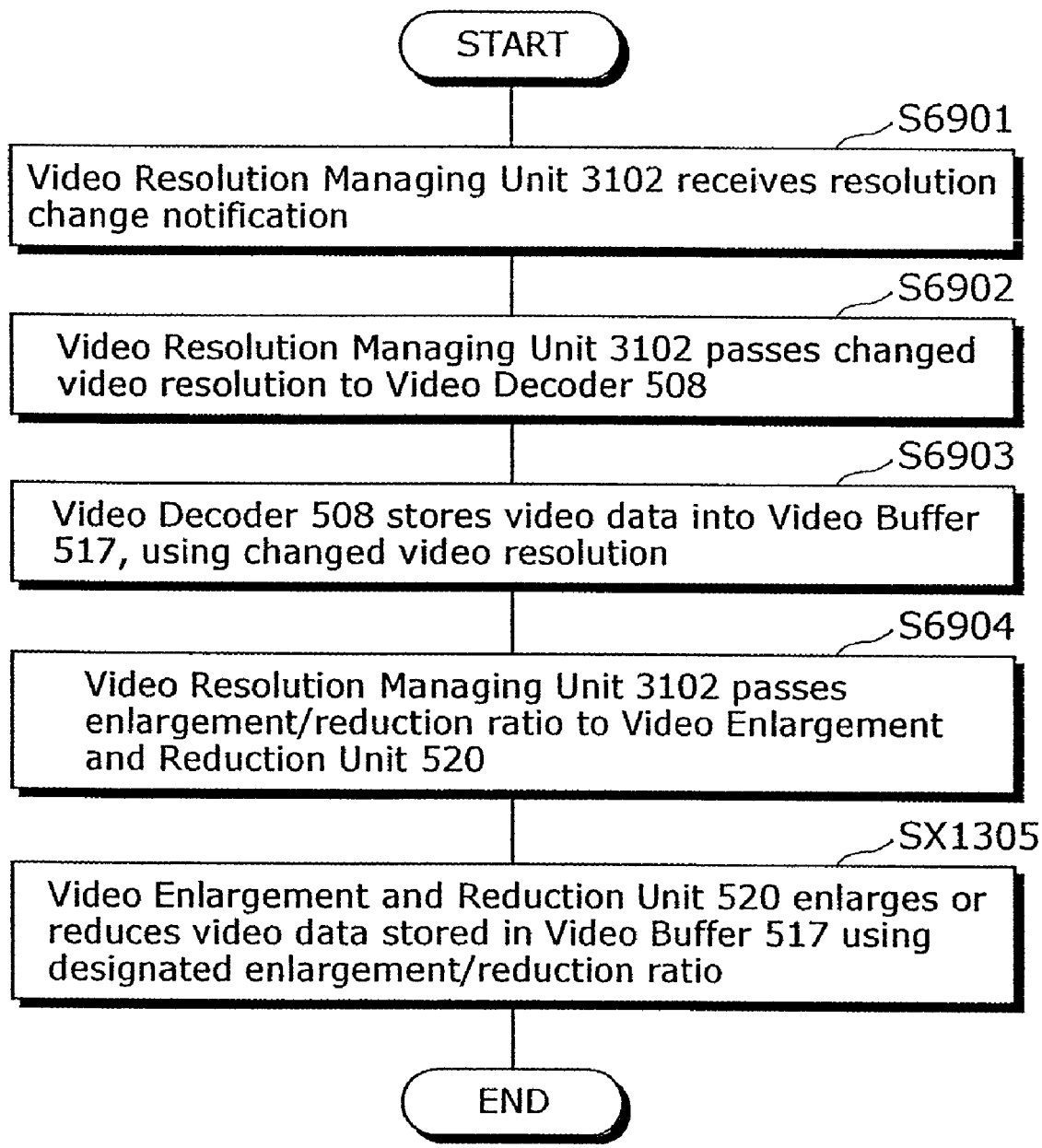
FIG. 69 is a flowchart in the case where the video resolution managing unit receives a resolution change notification.

FIG. 69 is a flowchart in the case where the video resolution managing unit 3102 receives a resolution change notification. The video resolution managing unit 3102, upon receipt of a resolution change notification (S6901), passes the changed video resolution to the video decoder 508 (S6902). The video decoder 508 stores, into the video buffer 517, such changed video resolution as well as video data that has been decoded using the changed video resolution (S6903). In order to compose the OSD buffer 519, the video buffer 517 and the still buffer 518, the video resolution managing unit 3102 passes an enlargement/reduction ratio to the video enlargement and reduction unit 520 (S6904). The video enlargement and reduction unit 520 enlarges or reduces the video data stored in the video buffer 517 using the passed enlargement/reduction ratio (S6905). Note that it is also possible that the video resolution managing unit 3102 stores the changed video resolution into the video buffer 517, and the video decoder 508 refers to such video resolution stored in the video buffer 517 so as to decode the video data.

FIG. 70 is a flowchart in the case where the still resolution managing unit 3103 receives a resolution change notification. The still resolution managing unit 3103, upon receipt of a resolution change notification (S7001), passes the changed still resolution to the still decoder 515 (S7002). The still decoder 515 stores, into the still buffer 518, such changed still resolution as well as still data which it has decoded using the changed still resolution (S7003). In order to compose the OSD buffer 519, the video buffer 517 and the still buffer 518, the still resolution managing unit 3103 passes an enlargement/reduction ratio to the still enlargement and reduction unit 521 (S7004). The still enlargement and reduction unit 521 enlarges or reduces the still data stored in the still buffer 518 using the passed enlargement/reduction ratio (S7005). Note that it is also possible that the still resolution managing unit 3103 stores the changed still resolution into the still buffer 518, and the still decoder 515 refers to such still resolution stored in the still buffer 518 so as to decode the still data.

For example, suppose that the application program 3100 is an application that displays a video display in a small area and displays an application display in its entire display area. To be more specific, JMF 1205*a* provides functions to enlarge and reduce the video and designate its display location, and the application program 3100 uses these functions. In this case, as shown in FIG. 39, an OSD display area 3901, which is the display of the application, occupies the major portion of a display screen 3900, and a video display area 3902 is small. The size and ideographic location of the video display area 3902 are decided according to the functions provided by the JMF 1205*a*. In this case, when the video format is changed, it is desirable that the resolution selection deciding unit 3105 changes the combination according to the currently displayed OSD resolution. The reason is because the video has already been reduced and displayed in the application of which video quality is apparently deteriorated. Even if the resolution of the OSD buffer 519 is changed according to the change in the video plane resolution, it is inevitable to deteriorate the quality of the video. On the other hand, it is necessary for the application program 3100 to redraw the OSD display area 3901 according to the change in the resolution of the OSD buffer 519. In general, a rendering process for a larger display area takes time. Also, it is necessary to prepare a plural number of characters and graphics information according to the resolution of the OSD buffer 519, which requires a lot of memories. In addition to it, the application program 3100 must be well-functioned to deal with complicated processes. Therefore, if the application program 3100 explicitly issues a change request of desired OSD resolution to the OSD resolution managing unit 3101, it means that the OSD resolution is prioritized. As a result of this, there would be issues such as complications of the application program 3100 and how to retain extra characters and graphics data. Also, when the resolution of the OSD buffer 519 is prioritized, the video enlargement and reduction unit 520 enlarges and reduces the video stored in the video buffer 517 to meet with the resolution retained.

Eighth Embodiment

In the seventh embodiment, when two applications indicated in FIG. 38 and FIG. 39 are being executed at the same time, it is necessary to decide which of the applications should be prioritized. In the present embodiment, the structure of the resolution switching unit 1205*f* shall be the structure in FIG. 56. Since the structural components having the same number as those in the FIG. 31 have the same function, their explanation is omitted here. A change permitting unit 5601 permits a change request of the application program 3100. The application program 3100 obtains change permission from the change permitting unit 5601 before making a change request of the resolution to the OSD resolution managing unit 5602, the video resolution managing unit 5603, and the still resolution managing unit 5604. After the permission is obtained, it makes the necessary change request. If the change request becomes unnecessary, it notifies that the permission is no longer necessary to the change permitting unit 5601. When other application makes a permission request after the permission is issued, the change permitting unit 5601 compares which of two applications has a higher priority and decides which of the applications is permitted. In terms of the priorities of applications, the change permitting unit 5601 may refer to the priorities pre-assigned to the applications, which is as explained in the example of FIG. 20 in the seventh embodiment, or the application program 3100 may provide such information to the change permitting unit 5601. The OSD resolution managing unit 5602, the video resolution managing unit 5603 and the still resolution managing unit 5604, in addition to functions of the OSD resolution managing unit 3101, the video resolution managing unit 3102 and the still resolution managing unit 3103, do not accept a request from the application program 3100, which is not permitted by the change permitting unit 5601. By realizing the present embodiment, it becomes possible to clarify which application a request is coming from, and therefore to run plural applications concurrently.

The following practical use becomes possible through the embodiments 1, 2, 3, 4, 5, 6, 7, and 8.

The present invention is applicable if it is used in any information apparatuses such as a personal computer or a portable telephone.

Also, the POD 504 is detachable in the embodiments, but it is also possible to have a built-in configuration. When it is built in, the CPU 706 of the POD 504 may be detached and the CPU 514 may also serve as the CPU 706.

The Java program registered in the POD Lib 1205*e* can be executed not only in the Java program downloaded, but also in the Java program, which is built in advance. Also, a slot unit may also be catered for a detachable memory media such as an SD memory card so that it is possible to install the Java program from there. Also, it is possible to install a network unit connected to the network, and obtain the Java program from the network.

Additionally, by having the second storage unit 510 store the contents stored in the ROM 512, it is possible to eliminate the ROM 512. Also, the secondary storage unit 510 can be made up of multiple sub secondary storage units, and may have each of individual multiple sub secondary storage units store different information. For example, it is possible to divide the information into pieces as follows. One of the sub secondary storage units stores tuning information only, and another sub secondary storage unit stores the library 1201*b* of the OS 1201, and additionally other sub secondary storage unit stores the Java program downloaded.

Also, though the registered Java program is stored in the secondary storage unit 510 in the embodiments, it is possible to have it stored in the primary storage unit 511. When it is stored in the primary storage unit 511, the information stored is completely deleted when the power is turned off.

Furthermore, the video enlargement and reduction unit 520, and the still enlargement and reduction unit 521 and the OSD enlargement and reduction unit 520 are supposed to pass the result of enlargement and reduction processes as it is to the composing unit 523, however it is possible to add a secondary video enlargement and reduction unit buffer, a secondary still buffer and a secondary OSD buffer, and have the video enlargement and reduction unit 520, the still enlargement and reduction unit 521 and the OSD enlargement and reduction unit 522 store the result of enlargement and reduction processes in the secondary video enlargement and reduction unit buffer, the secondary still buffer and the secondary OSD buffer, and the composing unit 523 read and compose the contents from the secondary video enlargement and reduction unit buffer, the secondary still buffer and the secondary OSD buffer.

According to the resolution switching apparatus of the present invention, the resolution switching apparatus comprises: a graphics generating unit operable to generate graphics; a video generating unit operable to output received video; a video resolution detecting unit operable to detect resolution of the received video; a resolution set storage unit operable to memorize a resolution set having resolution of the graphics and resolution of the video as a set; a resolution set selecting unit operable to select, from the resolution set storage unit, the resolution set based on the video resolution detected by the video resolution detecting unit; and a composing unit operable to compose the graphics and the received video based on the resolution set selected by the resolution set selecting unit, and output the composed outcome, and thereby it is possible to compose the video and the graphics and to display in into one.

Additionally, the resolution switching apparatus further comprises a video resolution change detecting unit operable to detect a change in the received video resolution, wherein the resolution set selecting unit selects the resolution set when the video resolution change detecting unit detects the change in the received video resolution, and thereby a decision process for the resolution does not have to be done anytime and a volume of processes can be reduced.

Also, the present invention is the resolution switching apparatus wherein the resolution set storage unit memorizes only a resolution set that can be composed by the composing unit, and thereby it is possible to avoid any situation that a composing process cannot be pursued.

Furthermore, the present invention is the resolution switching apparatus wherein the resolution set selecting unit selects, from the resolution set storage unit, a resolution set including video resolution detected by the video resolution detecting unit, and thereby it can maintain a beautiful display by displaying the video as it is.

In addition, the present invention is the resolution switching unit wherein the resolution set selecting unit selects a resolution set whose graphics resolution does not change, and thereby it is possible to avoid some situation where graphics is reduced too much to see due to a change in the resolution or some distortion occurs due to a change in a ration of length and width, and a beautiful graphics display can be maintained.

Moreover, the resolution switching unit further comprises: an application executing unit operable to execute an application; and a rendering execution accepting unit operable to accept a rendering instruction from the application, wherein the graphics generating unit generates graphics according to the rendering instruction accepted by the rendering execution accepting unit, and thereby the graphics and video generated by the application can be composed and output.

Also, the resolution switching apparatus further comprises a resolution set change notifying unit operable to notify a change in the resolution set to the application when the resolution set selecting unit selects the resolution, and thereby the application can recognizes the change in the resolution so that it can redisplay the graphics according to the resolution.

And, the resolution switching apparatus further comprises a graphics resolution change notifying unit operable to notify a change in the graphics resolution to the application in a case where the graphics resolution is changed when the resolution set selecting unit selects the resolution, and thereby the application can recognizes only the change in the graphics resolution. Therefore, it can efficiently redisplay the graphics according to the resolution.

Furthermore, the resolution switching apparatus further comprises a video resolution change notifying unit operable to notify a change in the video resolution to the application for a case the video resolution is changed when the resolution set selecting unit selects the resolution, and thereby the application can execute a process, etc. to display the video better, which is enlarged or reduced by using the Java class library.

In addition to it, the resolution switching apparatus further comprises a graphics resolution change request accepting unit operable to accept a change request of the graphics resolution from the application, wherein the resolution set selecting unit selects the resolution set based on the graphics resolution accepted by the graphics resolution change request accepting unit, thereby it can display with the graphics resolution desired by the application.

Also, the present invention is the resolution switching apparatus wherein the resolution set selecting unit selects the resolution set including the graphics resolution accepted by the graphics resolution change request accepting unit, and thereby it can display with the graphics resolution desired by the application.

Additionally, the resolution switching apparatus further comprises a video resolution change request accepting unit operable to accept a change request for the video resolution from the application, and wherein the resolution set selecting unit selects the resolution set based on the video resolution accepted by the video resolution change request accepting unit, and thereby it can display the video with the resolution desired by the application.

Also, the present invention is the resolution switching apparatus wherein the resolution set selecting unit selects the resolution set including the video resolution accepted by the video resolution change request accepting unit, and thereby it can display the video with the resolution desired by the application.

Moreover, the resolution switching apparatus further comprises: a graphics enlargement and reduction unit operable to enlarge or reduce graphics generated by the graphics generating unit; and a video enlargement and reduction unit operable to enlarge or reduce the video output by the video generating unit, wherein the composing unit composes the graphics and the video enlarged or reduced by the graphics enlargement and reduction unit and the video enlargement and reduction unit, and thereby the graphics and the video can be composed to have the same resolution and displayed beautifully.

Also, the resolution switching apparatus further comprises an enlargement and reduction resolution designating unit operable to designate resolution of the graphics and of the video generated by enlargement or reduction through the graphics enlargement and reduction unit and the video enlargement and reduction unit, and thereby the graphics and the video can be converted into the desired resolution and composed and displayed beautifully.

In addition, the present invention is the resolution switching apparatus wherein the resolution set storage unit retains resolution, which is realized by enlargement or reduction by the graphics enlargement and reduction unit and the video enlargement and reduction unit, by corresponding the resolution to the resolution set, and thereby it is possible to clearly designate resolution before conversion and resolution after conversion. As a result of it, an enlargement and reduction process with less deterioration, e.g. enlargement and reduction of an integral multiple, and beautiful composed results and display are achieved.

Also, the resolution switching apparatus further comprises a priority resolution set storage unit operable to memorize a priority resolution set, which is a preferable combination of the graphics and the video, wherein the priority set selecting unit selects the resolution set based on the priority resolution set memorized in the priority resolution set storage unit, and thereby a combination of more beautifully displayable resolution is prioritized and displayed.

Also, the resolution switching apparatus further comprises a priority resolution set storage unit operable to memorize a priority resolution set, which is a preferable combination of the graphics and the video, wherein the resolution set selecting unit selects the resolution set based on the priority resolution set memorized in the priority resolution set storage unit in a case where the resolution set including the video resolution detected by the resolution detecting unit cannot be selected from the resolution set storage unit, and thereby resolution of the video should be maintained. However, if it is not possible, a beautiful display can be achieved by using the combination of the resolution registered as a backup.

And, the resolution switching apparatus further comprises a priority resolution set storage unit operable to memorize a priority resolution set, which is a preferable combination of the graphics and the video, wherein the resolution set selecting unit selects the resolution set based on the priority resolution set memorized in the priority resolution set storage unit in a case where the resolution set that does not change the graphics resolution cannot be selected, and thereby resolution of the video should be maintained. However, if it is not possible, a beautiful display can be achieved by using the combination of the resolution registered as a backup.

Also, the resolution switching apparatus further comprises a video resolution change detecting unit operable to detect a change in the received video resolution, wherein the resolution set selecting unit, when the video resolution change detecting unit detects the change in the received video resolution, selects the resolution set including the graphics resolution accepted by the graphics resolution change request accepting unit right before the video resolution change detecting unit detects the change, and thereby it is possible to maintain the resolution of the graphics previously designated by the application, and also automatically maintain the graphics display of the application.

And, the resolution switching apparatus further comprises a video resolution change detecting unit operable to detect a change in the received video resolution, wherein the resolution set selecting unit selects the resolution set including the received video resolution when the video resolution change detecting unit detects a change in the received video resolution and the graphics resolution change request accepting unit does not accept a request to change the graphics resolution, and thereby resolution of the video is considered to be prioritized since the application does not designate resolution of the graphics. A beautiful display can be automatically maintained by outputting the video resolution with the resolution of the video which is input.

Also, the resolution switching apparatus comprises: a graphics generating unit operable to generate graphics; a video generating unit operable to output received video; a still generating unit operable to output a still image; a video resolution detecting unit operable to detect resolution of the received video; a resolution set storage unit operable to memorize a resolution set having resolution of the graphics, resolution of the video and resolution of the still image as a set; a resolution set selecting unit operable to select the resolution set from the resolution set storage unit based on the video resolution detected by the video resolution detecting unit; and a composing unit operable to compose the graphics, the received video and the still image based on the resolution set selected by the resolution set selecting unit, and output the composed outcome, and thereby it is possible to compose the video, the graphics and the still image, and display it.

Additionally, the resolution switching unit further comprises: an application executing unit operable to execute an application; and a rendering execution accepting unit operable to accept a rendering instruction from the application, wherein the graphics generating unit generates graphics according to the rendering instruction accepted by the rendering executing accepting unit, and thereby plane resolution, which is the main entity of the display, can be maintained, and a beautiful display can be kept.

And, the resolution switching unit further comprises: an application executing unit operable to execute an application; and a rendering execution accepting unit operable to accept a rendering instruction from the application, wherein the graphics generating unit generates graphics according to the rendering instruction accepted by the rendering executing accepting unit, and thereby the graphics, the video and the still image generated by the application can be composed and displayed.

Also, the resolution switching unit further comprises a still image resolution change request accepting unit operable to accept a change request of the still image resolution from the application, and wherein the resolution set selecting unit selects the resolution set based on the still image resolution accepted by the still image resolution change request accepting unit, and thereby resolution of the still image can be kept, and a beautiful still image can be maintained.

Moreover, the present invention is the resolution switching unit wherein the resolution set selecting unit selects the resolution set including the still image resolution accepted by the still image resolution change request accepting unit, and thereby resolution of the still image can be kept, and a beautiful still image can be maintained.

Also, the resolution switching unit further comprises a still image change request permitting unit operable to permit the change request of the still image resolution, wherein the still image resolution change request accepting unit accepts the change request of the still image resolution only from the application for which a change request is permitted by the still image change request permitting unit, and thereby acceptance of requests from a plural number of applications can be exclusively controlled. By doing so, it is possible to avoid a flicker of the display screen caused by the plural number of applications that frequently switch resolution of the still image.

Additionally, the resolution switching unit further comprises a graphics change request permitting unit operable to permit the change request of the graphics resolution, wherein the graphics resolution change request accepting unit accepts the change request of the graphics resolution only from the application for which a change request is permitted by the graphics change request permitting unit, and thereby it is possible to avoid a flicker of the display screen caused by a plural number of applications that frequently switch resolution of the still image.

Also, the resolution switching unit further comprises a video change request permitting unit operable to permit the change request of the video resolution, wherein the video resolution change request accepting unit accepts the change request of the video resolution from the application for which a change request is permitted by the video change request permitting unit, and thereby it is possible to avoid a flicker of the display screen caused by a plural number of applications that frequently switch resolution of the still image.

Also, the present invention is a computer readable recording medium in which a program is recorded to perform each function of: a graphics generating unit operable to generate graphics; a video generating unit operable to output received video; a video resolution detecting unit operable to detect resolution of the received video; a resolution set storage unit operable to memorize a resolution set having resolution of the graphics and resolution of the video as a set; a resolution set selecting unit operable to select the resolution set from the resolution set storage unit based on the video resolution detected by the resolution detecting unit; and a composing unit operable to compose the graphics and the received video based on the resolution set selected by the resolution set selecting unit, and output the composed outcome, and thereby enhances its portability.

As the industrial applicability of the present invention, it is possible to use the present invention as an apparatus and the like that displays video and graphics, e.g. a television receiver terminal and the like that receives an interactive program thorough a digital broadcasting, and more particularly as an apparatus and the like that displays video, graphics, and a still image, changing their resolutions appropriately.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A display processing method used in a receiving terminal including a list indicating combinations of permitted graphics resolutions and video resolutions, the display processing method comprising:
   receiving video through a digital broadcast;
   holding the received video with a video resolution which is indicated in the list;
   enlarging or reducing graphics with a graphics resolution corresponding to the video resolution which is indicated in the list, so that the received video and the graphics can be composed;
   composing the enlarged or reduced graphics and the received video, and outputting a result of the composition;
   notifying an application when the video resolution of the received video is changed during the outputting of the result of the composition;
   accepting, from the application, a resolution change request for changing the graphics resolution to a graphics resolution corresponding to the changed video resolution which is indicated in the list;
   changing the graphics resolution in response to the graphics resolution change request; and
   notifying the application that the graphics resolution is changed,
   wherein the graphics is enlarged or reduced by a processor with the changed graphics resolution corresponding to the changed video resolution which is indicated in the list, so that the received video with the changed video resolution and the graphics with the changed graphics resolution can be composed.

2. A receiving terminal, comprising:
   a storage unit which stores a list indicating combinations of permitted graphics resolutions and video resolutions;
   a receiving unit which receives video through a digital broadcast;
   a holding unit which holds the received video with a video resolution which is indicated in the list; and
   a processor programmed to perform the functions of:
      a graphics enlarging and reducing unit which enlarges or reduces graphics with a graphics resolution corresponding to the video resolution which is indicated in the list, so that the received video and the graphics can be composed;
      a composing and outputting unit which composes the enlarged or reduced graphics and the received video, and outputs a result of the composition;
      a first notifying unit which notifies an application when the video resolution of the received video is changed during outputting of the result of the composition;
      a graphics resolution change request accepting unit which accepts, from the application, a resolution change request for changing the graphics resolution to a graphics resolution corresponding to the changed video resolution which is indicated in the list;
      a graphics resolution changing unit which changes the graphics resolution in response to the graphics resolution change request; and
      a second notifying unit which notifies the application that the graphics resolution is changed by the graphics resolution changing unit,
   wherein the graphics enlarging and reducing unit enlarges or reduces the graphics with the changed graphics resolution corresponding to the changed video resolution which is indicated in the list, so that the received video with the changed video resolution and the graphics with the changed graphics resolution can be composed.

* * * * *